(12) United States Patent
Ukita et al.

(10) Patent No.: US 8,683,236 B2
(45) Date of Patent: Mar. 25, 2014

(54) OUTLET EXPANSION APPARTUS CONTAINING A DELEGATE AUTHENTICATION UNIT TO PERFORM AUTHENTICATION OF AN ELECTRONIC APPLIANCE WITH A POWER MANAGEMENT APPARATUS

(75) Inventors: Masakazu Ukita, Kanagawa (JP); Yu Tanaka, Tokyo (JP); Asami Yoshida, Kanagawa (JP); Tomoyuki Asano, Kanagawa (JP); Shiho Moriai, Kanagawa (JP); Masanobu Katagi, Kanagawa (JP); Yohei Kawamoto, Tokyo (JP); Seiichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 496 days.

(21) Appl. No.: 13/008,187

(22) Filed: Jan. 18, 2011

(65) Prior Publication Data

US 2011/0185197 A1 Jul. 28, 2011

(30) Foreign Application Priority Data

Jan. 25, 2010 (JP) ................................ P2010-013586

(51) Int. Cl.
*G06F 1/00* (2006.01)
*G05D 9/00* (2006.01)

(52) U.S. Cl.
USPC ........................... 713/300; 700/286; 700/295

(58) Field of Classification Search
USPC .................................. 713/300; 700/286, 295
See application file for complete search history.

(56) References Cited

U.S. PATENT DOCUMENTS

| 2007/0143864 A1* | 6/2007 | Cabana et al. ................. 726/36 |
| 2010/0145542 A1* | 6/2010 | Chapel et al. ................. 700/295 |
| 2010/0280674 A1* | 11/2010 | Jalili ............................. 700/295 |
| 2011/0015795 A1* | 1/2011 | Boyer et al. ................. 700/286 |

FOREIGN PATENT DOCUMENTS

JP 2008-109849 5/2008

* cited by examiner

*Primary Examiner* — Thomas Lee
*Assistant Examiner* — Terrell Johnson
(74) *Attorney, Agent, or Firm* — Sony Corporation

(57) ABSTRACT

There is provided an outlet expansion apparatus including a first connection outlet to which an electronic appliance is to be connected, a second connection outlet that is for connecting to a power supply outlet that is to be a supply source of power, and a delegate authentication unit that carries out, in a case the electronic appliance not having a function of carrying out authentication with a power management apparatus managing an amount of power to be supplied to the electronic appliance is connected to the first connection outlet and the power supply outlet is connected to the second connection outlet, authentication to be carried out on the power management apparatus by the electronic appliance connected to the first connection outlet on behalf of the electronic appliance.

14 Claims, 46 Drawing Sheets

FIG. 6
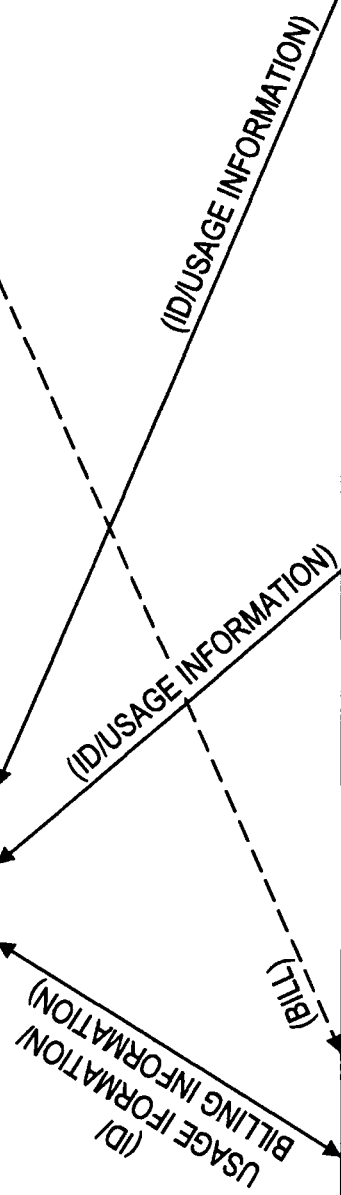
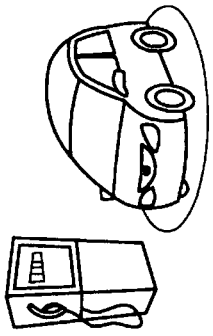
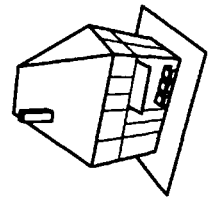
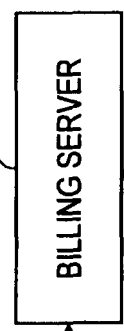
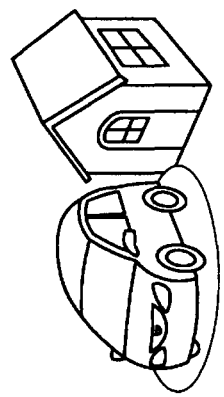

FIG. 9

| COMPONENT | OVERVIEW OF MAIN FUNCTIONS |
|---|---|
| APPLIANCE MANAGEMENT UNIT 1121 | APPLIANCE REGISTRATION, APPLIANCE AUTHENTICATION, ID MANAGEMENT OF APPLIANCES, MANAGEMENT OF OPERATION SETTINGS/SERVICE SETTINGS OF APPLIANCES, GRASPING OF OPERATION STATE/USAGE STATE OF APPLIANCES, GATHERING OF ENVIRONMENTAL INFORMATION, GRASPING OF USAGE STATE (IN UNITS OF APPLIANCES, ENTIRE SYSTEM, OR SPECIFIC BLOCKS), ETC. |
| POWER TRADING UNIT 1122 | ACQUISITION OF MARKET TRADING DATA/INDIVIDUAL TRADING DATA, TIMING CONTROL OF SELL ORDERS/BUY ORDERS, EXECUTION OF SELL ORDERS/BUY ORDERS, MANAGEMENT OF TRADE LOG, ETC. |
| INFORMATION ANALYZING UNIT 1123 | ANALYSIS OF POWER GENERATION DATA, ANALYSIS OF POWER STORAGE DATA, LEARNING OF LIFE PATTERN, ANALYSIS OF POWER CONSUMPTION DATA (IN UNITS OF APPLIANCES, ENTIRE SYSTEM, OR SPECIFIC BLOCKS), ESTIMATION OF POWER CONSUMPTION PATTERN, ESTIMATION OF POWER STORAGE PATTERN, ESTIMATION OF POWER DISCHARGE PATTERN, ESTIMATION OF POWER GENERATION PATTERN, CALCULATION OF PRESENT $CO_2$ EMISSIONS, ESTIMATION OF FUTURE $CO_2$ EMISSIONS, CALCULATION OF POWER SAVING PATTERN, CALCULATION OF LOW $CO_2$ EMISSIONS PATTERN, CALCULATION OF APPLIANCE CONFIGURATION/APPLIANCE ARRANGEMENT TO PRODUCE POWER SAVING/LOW $CO_2$ EMISSIONS, ETC. |
| DISPLAY INFORMATION GENERATING UNIT 1124 | GENERATION OF INFORMATION RELATING TO APPLIANCES, INFORMATION RELATING TO POWER, INFORMATION RELATING TO ENVIRONMENT, INFORMATION RELATING TO TRADING DATA, INFORMATION RELATING TO ANALYSIS RESULTS, ETC. |
| SYSTEM MANAGEMENT UNIT 1125 | MANAGEMENT/UPDATE OF FIRMWARE VERSION, ACCESS RESTRICTIONS, ANTIVIRUS MEASURES, ETC. |

(※) SAME FOR ELECTRIC VEHICLE (124)/CONTROL-COMPLIANT OUTLET (123)/
OUTLET EXPANSION APPARATUS (127)

EXAMPLE CIRCUIT CONFIGURATION OF IMPEDANCE MEASURING CIRCUIT (1253)

(REGISTRATION PROCESS B BY APPLIANCE MANAGEMENT UNIT 1121)

(※) SAME FOR ELECTRIC VEHICLE (124)/CONTROL-COMPLIANT OUTLET (123)/ OUTLET EXPANSION APPARATUS (127)

SWITCHING OF TARGETS TO BE MEASURED

BILLING TO APPLIANCE OWNED BY ANOTHER

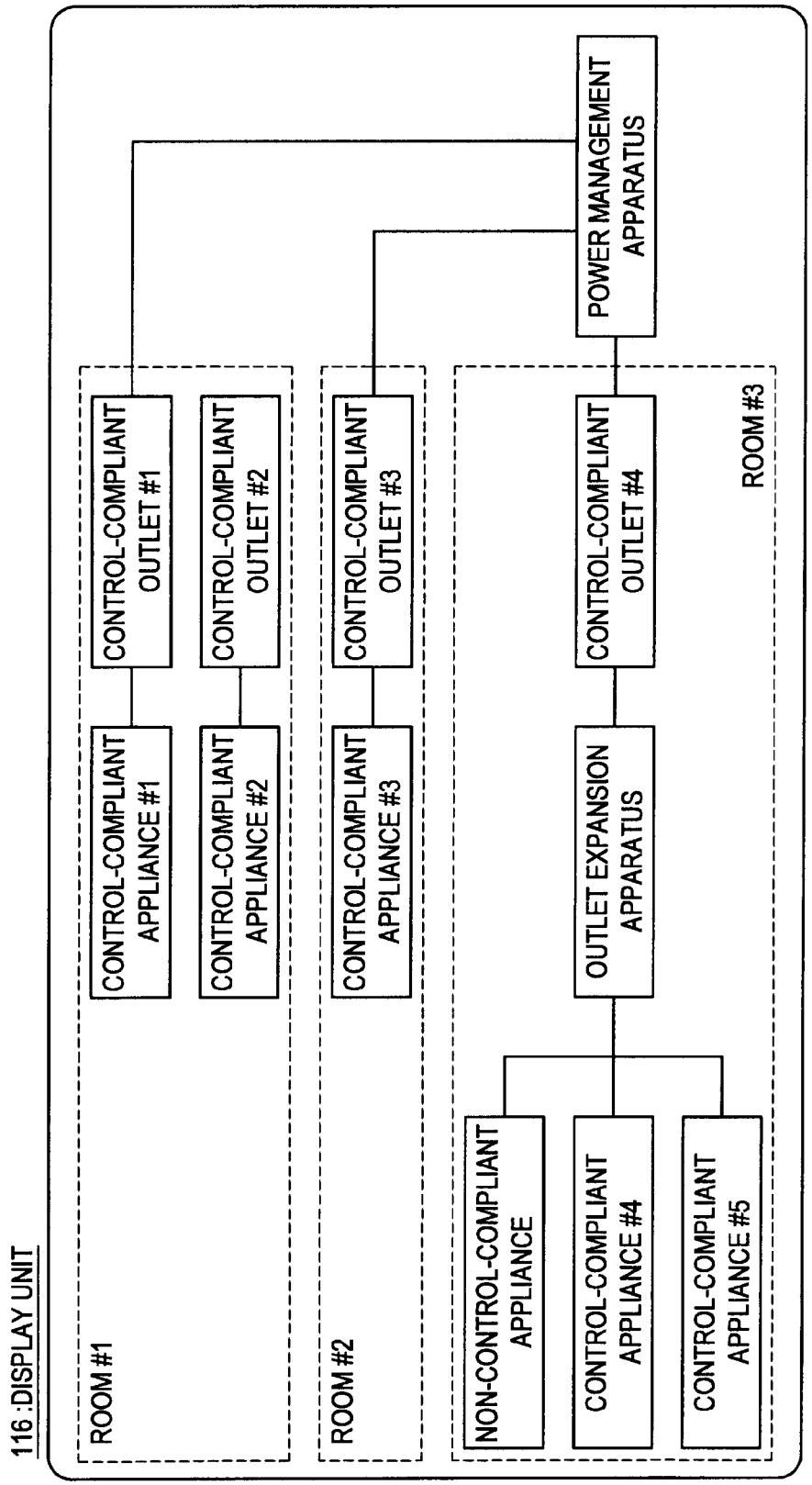

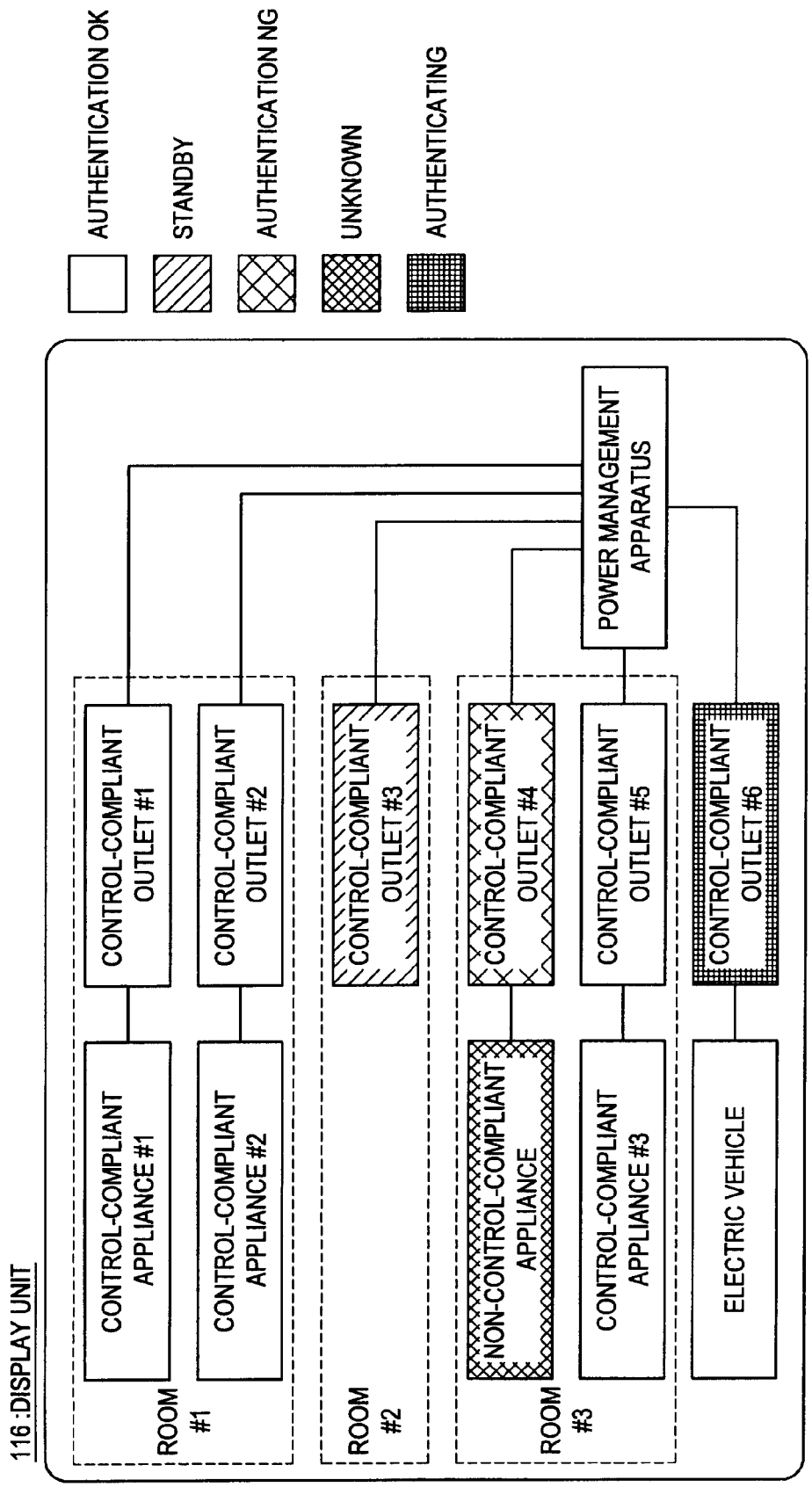

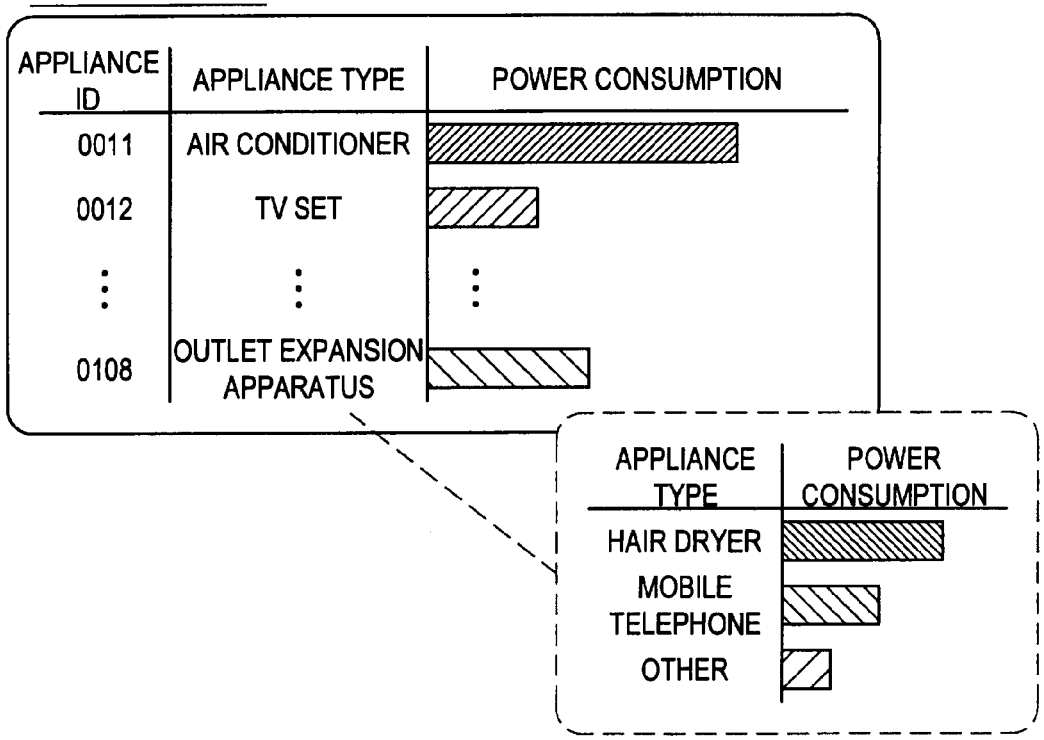

FIG. 45
116 : DISPLAY UNIT
| USAGE LOCATION | POWER CONSUMPTION | BILLED AMOUNT |
|---|---|---|
| LOCATION#1 | * * * kW | * * * YEN |
| LOCATION#2 | * * * kW | * * * YEN |
| LOCATION#3 | * * * kW | * * * YEN |
FIG. 46
116 : DISPLAY UNIT
| APPLIANCE ID | APPLIANCE TYPE | POWER CONSUMPTION |
|---|---|---|
| 0011 | AIR CONDITIONER | ▨▨▨ |
| 0012 | TV SET | ▨ |
| ⋮ | ⋮ | ⋮ |
| 0003 | ELECTRIC VEHICLE | ▨▨▨▨▨▨▨▧▧ |
 POWER USED OUTSIDE BELONGING SYSTEM
 POWER USED WITHIN BELONGING SYSTEM

OUTLET EXPANSION APPARTUS CONTAINING A DELEGATE AUTHENTICATION UNIT TO PERFORM AUTHENTICATION OF AN ELECTRONIC APPLIANCE WITH A POWER MANAGEMENT APPARATUS

BACKGROUND OF THE INVENTION

1. Field of the Invention

The present invention relates to an outlet expansion apparatus, and a delegate authentication method.

2. Description of the Related Art

In recent years, a technology called smart grid has been gaining attention. The smart grid is a technological framework to realize efficient power usage by constructing a new transmission network having a communication channel along with the transmission network and using this intelligent transmission network. The background idea of the smart grid is to realize efficient management of the amount of power use, swift handling of an incident when such an incident occurs, remote control of the amount of power use, distributed power generation using power generation facilities outside the control of a power company, or charging management of an electric vehicle. Particularly, effective utilization of in-house power generating stations using renewable energy by ordinary households or operators other than power companies and charging management of various electric vehicles typically including electric cars have been attracting considerable attention. Incidentally, renewable energy is energy generated without using fossil fuel.

Power generated by ordinary households or operators other than power companies is used by power generation operators. Remaining power after use by the power generation operators is currently purchased by power companies. However, purchasing power supplied from power generation facilities outside the control of a power company is a heavy burden to the power company. For example, amount of power supplied from photovoltaic power generation facilities depends on the weather. Moreover, amount of power supplied from in-house power generating stations of ordinary households depends on power use of ordinary households that largely changes day by day. Thus, it is difficult for power companies to receive stable power supply from power generation facilities outside the control of power companies. For the above reason, it may become difficult for power companies to purchase power in the future.

Thus, a home battery initiative that uses power generated by power generation facilities outside the control of power companies after temporarily storing the power in batteries has recently been gaining attention. For example, a method of using power generated by photovoltaic power generation facilities by storing such power in batteries and making up for shortages in the night or when the weather is bad is considered. Furthermore, a method of limiting amount of power received from a power company in accordance with the battery storage amount or using power stored in batteries in the daytime when power rates are higher by storing power, in batteries, supplied by a power company in the night when power rates are lower are considered. Also, batteries can store power as DC, which makes DC/AC conversion or AC/DC conversion during transmission unnecessary so that losses during conversion can be reduced.

Thus, various expectations regarding power management mingle with one another amid the smart grid initiative. To realize such power management, the smart grid initiative is premised on having a communication channel along with a transmission network. That is, exchanging information about power management by using this intelligent transmission network is assumed. However, in a region where a communication infrastructure is already built, instead of using a transmission network as a communication channel, information about power management may be exchanged by using a network constructed by the deployed communication infrastructure. That is, what is important in the smart grid initiative is how to efficiently manage power generation facilities and storage facilities that are not uniformly managed.

Each electronic appliance managed in the smart grid initiative is not enabled to receive power supply unless it is individually authenticated by a power management apparatus and unless the authentication is successful. Due to this mechanism, even if an unauthorized electronic appliance is connected, power is normally not illegally used by the unauthorized electronic appliance. However, if an electronic appliance that is modified without authorization so that it will pass authentication by the power management apparatus is used, power will be improperly used by that electronic appliance that has been modified without authorization. Furthermore, there is a risk that the security of the whole system managed by the power management apparatus is threatened by the electronic appliance that has been modified without authorization. For these reasons, a technology that enables to reliably identify each electronic appliance is desired.

For example, JP-A-2008-109849 discloses a technology of detecting, for a plurality of electronic appliances, a current waveform of current consumed by each electronic appliance as a feature, and transmitting the feature to a server. Furthermore, a technology is disclosed according to which the server that received the feature compares the received feature and a feature registered in advance in a database and identifies each electronic appliance. The feature described in the above patent document is a change in current consumption, an average value, a peak value, an effective value, a crest factor, a form factor, a settling time of current change, a conduction time, a peak position, a time difference between a peak position of a power supply voltage and a peak position of current consumption, or a power factor. When using the technology described in the above patent document, each electronic appliance can be identified more reliably than when relying on authentication.

SUMMARY OF THE INVENTION

However, an electronic appliance not compliant with authentication by the power management apparatus will be excluded from management targets. Thus, such electronic appliance is possibly treated, in the smart grid initiative, as an unusable electronic appliance. Furthermore, if power is supplied unconditionally to an electronic appliance not compliant with authentication by the power management apparatus, it becomes difficult to grasp accurate power consumption, and thus the significance of power management in the smart grid initiative will be lost.

In light of the foregoing, it is desirable to provide an outlet expansion apparatus, and a delegate authentication method, which are new and improved, and which are capable of providing additionally an authentication function to an electronic appliance not compliant with authentication by a power management apparatus.

According to an embodiment of the present invention, there is provided an outlet expansion apparatus which includes a first connection outlet to which an electronic appliance is to be connected, a second connection outlet that is for connecting to a power supply outlet that is to be a supply source of power, and a delegate authentication unit that carries out, in a case the electronic appliance not having a function of carrying out authentication with a power management apparatus managing an amount of power to be supplied to the electronic appliance is connected to the first connection outlet and the power supply outlet is connected to the second connection outlet, authentication to be carried out on the power management apparatus by the electronic appliance connected to the first connection outlet on behalf of the electronic appliance.

In a case there are a plurality of the first connection outlets, the delegate authentication unit may be configured to carry out, on behalf of the electronic appliance connected to each of the first connection outlets, authentication to be carried out on the power management apparatus by the electronic appliance.

The delegate authentication unit may include a power receiving unit that receives, in a case the electronic appliance is connected to the first connection outlet and the power supply outlet is connected to the second connection outlet, power for authentication supplied from the power supply outlet based on control by the power management apparatus, and an authentication processing unit that carries out an authentication process on the power management apparatus by using the power received by the power receiving unit.

The authentication processing unit may include a random number receiving unit that receives a random number from the power management apparatus, a consumption pattern calculating unit that calculates a time-series pattern of power consumption based on the random number received by the random number receiving unit, and a power consumption unit that consumes the power received by the power receiving unit in such a way that the time-series pattern of power consumption calculated by the consumption pattern calculating unit is observed by the power management apparatus.

In a case the electronic appliance connected to the first connection outlet is capable of carrying out authentication on the power management apparatus, the delegate authentication unit may be configured not to carry out, on behalf of the electronic appliance, authentication to be carried out on the power management apparatus by the electronic appliance.

The outlet expansion apparatus may further include a power-supply control unit that supplies, in a case authentication of the power management apparatus is completed by the delegate authentication unit or the electronic appliance connected to the first connection outlet, power supplied via the second connection outlet to the electronic appliance via the first connection outlet.

According to another embodiment of the present invention, there is provided a delegate authentication method performed by an outlet expansion apparatus including a first connection outlet to which an electronic appliance is to be connected and a second connection outlet that is for connecting to a power supply outlet that is to be a supply source of power, which includes the step of carrying out, in a case the electronic appliance not having a function of carrying out authentication with a power management apparatus managing an amount of power to be supplied to the electronic appliance is connected to the first connection outlet and the power supply outlet is connected to the second connection outlet, authentication to be carried out on the power management apparatus by the electronic appliance connected to the first connection outlet on behalf of the electronic appliance.

According to the embodiments of the present invention described above, it becomes possible to provide additionally an authentication function to an electronic appliance not compliant with authentication by a power management apparatus.

BRIEF DESCRIPTION OF THE DRAWINGS

FIG. 6 is an explanatory diagram showing a function of a system management server;
FIG. 9 is an explanatory diagram showing a detailed functional configuration of the information management unit.

FIG. 27 is an explanatory diagram showing a detailed functional configuration of the control-compliant appliance or the like;

FIG. 33 is an explanatory diagram showing a detailed functional configuration of the control-compliant appliance or the like;

FIG. 41 is an explanatory diagram showing contents to be displayed on the display unit and a display method;

FIG. 42 is an explanatory diagram showing contents to be displayed on the display unit and a display method;

FIG. 43 is an explanatory diagram showing contents to be displayed on the display unit and a display method;

FIG. 44 is an explanatory diagram showing contents to be displayed on the display unit and a display method;

FIG. 45 is an explanatory diagram showing contents to be displayed on the display unit and a display method;

FIG. 46 is an explanatory diagram showing contents to be displayed on the display unit and a display method;

DETAILED DESCRIPTION OF THE EMBODIMENT

Figure 1:
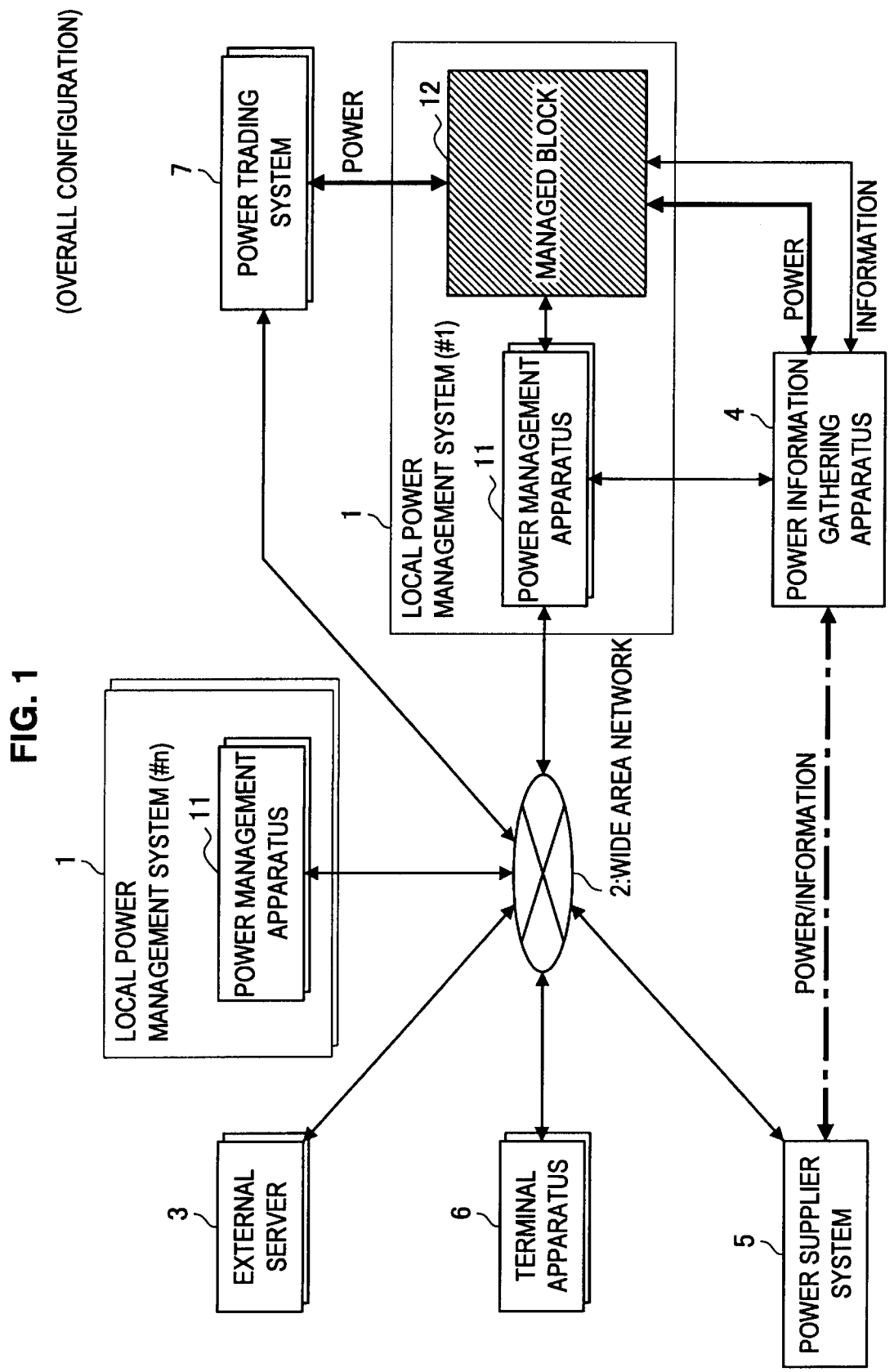
FIG. 1 is an explanatory diagram showing an overall picture of a power management system.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Description>

A flow of description of an embodiment of the present invention described below will be briefly mentioned here. First, an overall picture of a power management system will be described with reference to FIGS. 1 to 6. Next, a configuration of a power management apparatus 11 will be described with reference to FIGS. 7 to 9. Then, a configuration of an outlet expansion apparatus 127 will be described with reference to FIGS. 10 to 25. Then, an authentication/registration method of a control-compliant appliance 125 or the like will be described with reference to FIGS. 26 to 32.

Next, another authentication/registration method of the control-compliant appliance 125 or the like will be described with reference to FIGS. 33 to 38. Then, display contents and a display method of a display unit 116 will be described with reference to FIGS. 39 to 46. Then, use of multiple power management apparatuses will be described with reference to FIGS. 47 to 49. Then, an example of a hardware configuration capable of realizing a function of the power management apparatus 11 will be described with reference to FIG. 50. Lastly, the technical idea of the present embodiment will be summarized and effects obtained by the technical idea will be briefly described.

(Description Items)

Figure 49:
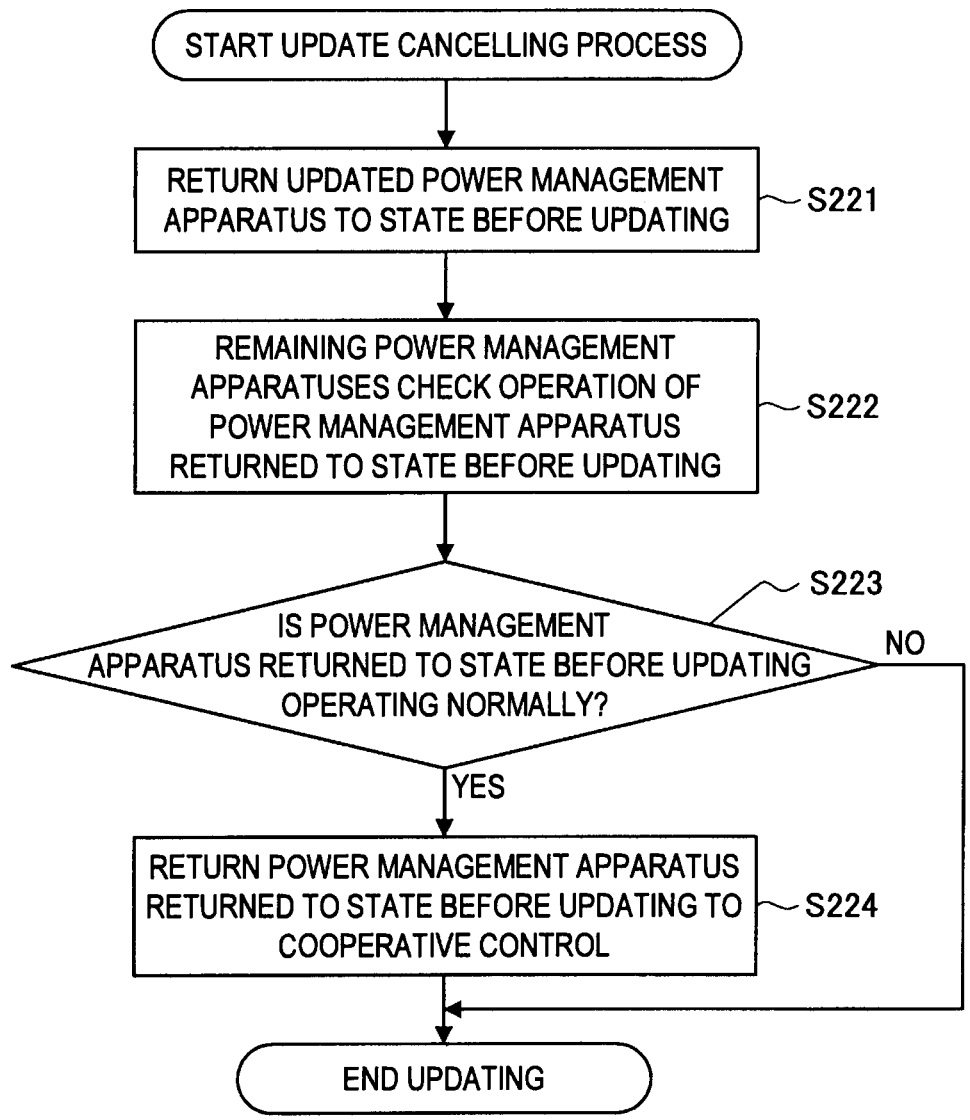
FIG. 49 is an explanatory diagram showing an operation flow of multiple power management apparatuses.
Figure 50:
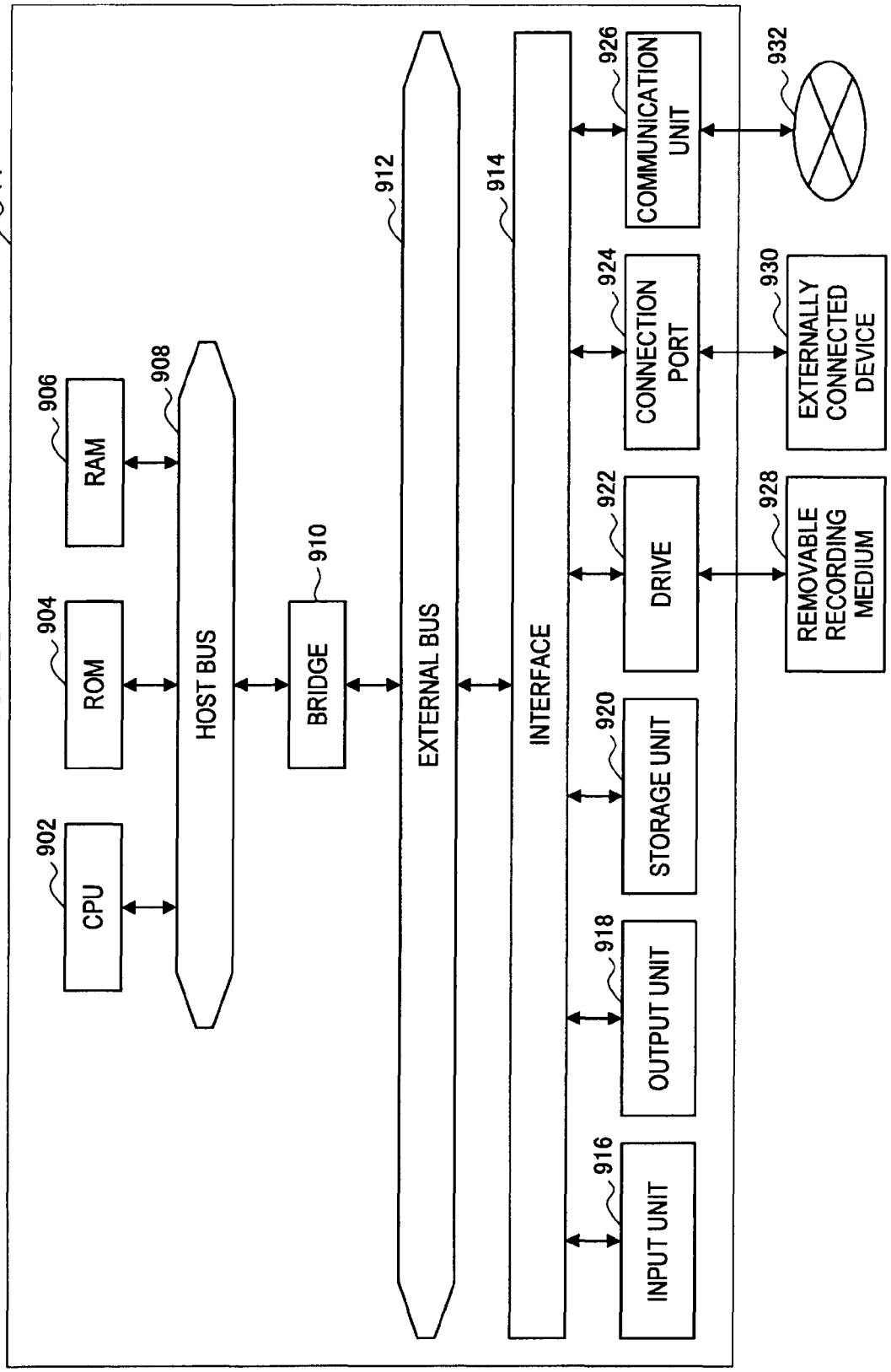
FIG. 50 is an explanatory diagram showing an example hardware configuration of the power management apparatus.

1: Overall Picture of Power Management System
   1-1: Overall Configuration (FIG. 1)
   1-2: Configuration of Managed Block 12 (FIGS. 2 to 4)
   1-3: Configuration of External Server 3 (FIGS. 5 and 6)
2: Configuration of Power Management Apparatus 11 (FIGS. 7 to 9)
   2-1: Overview of Function
   2-2: Details of Function
3: Configuration of Outlet Expansion Apparatus 127 (FIGS. 10 to 25)
   3-1: Function
   3-2: Operation
      3-2-1: Operation in Standby Mode
      3-2-2: Operation in Normal Mode
      3-2-3: Operation in Cut-Off Mode
      3-2-4: Operation in Error Mode
      3-2-5: Operation of Registration/Authentication
4: Authentication/Registration of Appliance 1 (FIGS. 26 to 32)
   4-1: Functional Configuration of Information Management Unit 112
   4-2: Functional Configuration of Control-Compliant Appliance 125 or the Like
   4-3: Operation at the Time of Authentication/Registration
5: Authentication/Registration of Appliance 2 (FIGS. 33 to 38)
   5-1: Functional Configuration of Control-Compliant Appliance 125 or the Like
   5-2: Functional Configuration of Manufacturer Server 36
   5-3: Operation at the Time of Authentication
   5-4: Billing Method
6: Display Contents/Display Method of Display Unit 116 (FIGS. 39 to 46)
   6-1: Display of System Configuration or the Like
   6-2: Display of Power Consumption or the Like
7: Use of Multiple Power Management Apparatuses 11 (FIGS. 47 to 49)
   7-1: Control Operation
   7-2: Operation during Updating
8: Example Hardware Configuration of Power Management Apparatus 11 (FIG. 50)

9: Summary

In the following, an embodiment of the present invention will be described in detail.

1: Overall Picture of Power Management System

First, an overall picture of a power management system according to the present embodiment will be described.

<1-1: Overall Configuration (FIG. 1)>

FIG. 1 shows an overall picture of the power management system according to the present embodiment.

As shown in FIG. 1, the power management system according to the present embodiment includes a local power management system 1, a wide area network 2, an external server 3, a power information gathering apparatus 4, a power supplier system 5, a terminal apparatus 6, and a power trading system 7. Also, the local power management system 1, the external server 3, the power information gathering apparatus 4, the power supplier system 5, the terminal apparatus 6, and the power trading system 7 are connected to the wide area network 2, and thus can exchange information with each other.

Additionally, in this specification, expressions "local" and "wide area" are used. "Local" means a small group configured from elements that can communicate without using the wide area network 2. On the other hand, "wide area" means a large group including elements that communicate via the wide area network 2. Also, a small group configured from elements arranged inside the local power management system 1 may be specifically expressed by the expression "local." On the other hand, the entire power management system shown in FIG. 1 may be expressed by the expression "wide area."

Now, the power management system described above attempts, as with the smart grid initiative described above, to enhance efficiency of power usage, and to appropriately manage various appliances operating on power, power storage means that stores power, power generating means that generates power, power supply means that supplies power from a power supply, and the like. The targets of power management in this power management system are the appliances, the power storage means, the power generating means, the power supply means, and the like provided in the local power management system 1. Additionally, a system in the smart grid initiative called HEMS (Home Energy Management System) or BEMS (Building Energy Management System) is an example of the local power management system 1.

As shown in FIG. 1, the local power management system 1 includes the power management apparatus 11, and a managed block 12. The power management apparatus 11 undertakes a role of managing the appliances, the power storage means, the power generating means, the power supply means, and the like provided in the local power management system 1. For example, the power management apparatus 11 permits or prohibits power supply to each appliance. Also, the power management apparatus 11 carries out authentication on each appliance to identify the appliance or to confirm validity of the appliance. Then, the power management apparatus 11 gathers information on power consumption or the like from each appliance.

Furthermore, the power management apparatus 11 acquires information on the amount of stored power or the like from the power storage means. Then, the power management apparatus 11 carries out charge/discharge control on the power storage means. Furthermore, the power management apparatus 11 acquires information on the amount of power generation or the like from the power generating means. Also, the power management apparatus 11 acquires information on the amount of power supplied from outside from the power supply means. In this manner, the power management apparatus 11 acquires information from the appliances, the power storage means, the power generating means, and the power supply means provided in the local power management system 1, and controls input/output of power. Of course, the power management apparatus 11 carries out, as appropriate, similar management of structural elements other than the appliances, the power storage means, the power generating means, and the power supply means.

In the local power management system 1 shown in FIG. 1, the structural elements such as the appliances, the power storage means, the power generating means, and the power supply means, which are the targets of power management, are included in the managed block 12. The structural elements included in the managed block 12 and the power management apparatus 11 are capable of directly or indirectly exchanging information. Also, the power management apparatus 11 may be configured to be able to exchange information with the power information gathering apparatus 4. The power information gathering apparatus 4 manages information on power supplied from the power supplier system 5 managed by a power supplier. Additionally, an appliance called a smart meter in the smart grid initiative is an example of the power information gathering apparatus 4.

The power supplier system 5 supplies power to each local power management system 1. Then, the power supplied from the power supplier system 5 is supplied to the managed block 12 in the local power management system 1 via the power information gathering apparatus 4. At this point, the power information gathering apparatus 4 acquires information, for example, on the amount of power supplied to the managed block 12. Then, the power information gathering apparatus 4 transmits the acquired information on the amount of power or the like to the power supplier system 5. By using such a mechanism, the power supplier system 5 gathers information relating to power consumption or the like of the managed block 12 in each local power management system 1.

Furthermore, the power supplier system 5 refers to the gathered information relating to power consumption or the like, controls the power information gathering apparatus 4, and controls the amount of power supply such that efficient power usage by the managed block 12 or the entire power management system is realized. At this point, the power information gathering apparatus 4 restricts the amount of power supplied from the power supplier system 5 to the managed block 12, or lifts the restriction on the amount of power according to the power consumption of the managed block 12. Additionally, the power supplier may be a power company, a corporate or non-corporate power generation manager owning a power station, a corporate or non-corporate power storage manager owning a power storage facility, or the like, for example.

However, under current situations, a power company is likely to be the power supplier and, in this specification, an explanation will be made assuming a case where the power company is the power supplier. Also, most of the externally-supplied power is at present purchased from the power company, which is the power supplier. However, in the future, the electricity market may become active and the power purchased in the electricity market may cover most of the externally-supplied power. In such a case, it is assumed that the local power management system 1 will be supplied with power from the power trading system 7, as shown in FIG. 1.

The power trading system 7 carries out processes relating to power trading such as placement of a sell or buy order in the electricity market, price calculation after the execution of an order, a settlement process, placement of order for power supply, and the like. Furthermore, in the example of FIG. 1, reception of power for which an order has been executed in the electricity market is also carried out by the power trading system 7. Thus, in the example of FIG. 1, according to the type of an executed order, the power is supplied from the power trading system 7 to the local power management system 1, or from the local power management system 1 to the power trading system 7. Furthermore, placement of an order to the power trading system 7 is performed automatically or manually by using the power management apparatus 11.

Furthermore, the power management system shown in FIG. 1 includes a plurality of local power management systems 1. As described above, each local power management system 1 includes the power management apparatus 11. The plurality of power management apparatuses 11 can mutually exchange information via the wide area network 2 or a secure communication path (not shown). There may also be provided a mechanism for supplying power from one local power management system 1 to another local power management system 1. In such a case, the power management apparatuses 11 of both systems carry out information exchange relating to reception of power, and perform control to transmit the amount of power appropriately decided by the information exchange.

For its part, the power management apparatus 11 may be configured to be operable by an external terminal device 6 connected via the wide area network 2. For example, a user may want to check the power state of the local power management system 1 that the user manages, by using the terminal apparatus 6. In such a case, if the power management apparatus 11 is configured to be operable by the terminal apparatus 6, the user is enabled to have the power state of the local power management system 1 that the user manages displayed by the terminal apparatus 6 and to check the power state. The user is also enabled to perform power trading by the power management apparatus 11 by using the terminal apparatus 6.

Additionally, the terminal apparatus 6 may be provided inside the local power management system 1. In this case, the terminal apparatus 6 connects to the power management apparatus 11 by using a communication path provided in the local power management system 1 without using the wide area network 2. One advantage of using the terminal apparatus 6 is that the user does not have to go to the installation location of the power management apparatus 11. That is, if the terminal apparatus 6 can be used, the power management apparatus 11 can be operated from an arbitrary place. Additionally, as a concrete form of the terminal apparatus 6, there can be assumed, for example, a mobile phone, a mobile information terminal, a notebook computer, a portable game machine, an information appliance, a facsimile, a fixed-line phone, an audio/video appliance, a car navigation system, or an electric vehicle.

In the foregoing, power management in the power management system shown in FIG. 1 has been briefly described while referring to the operation or function of each structural element. However, the above-described power management apparatus 11 has, in addition to the function relating to power management, a function of providing various services to a user by using various pieces of information gathered from the managed block 12 and the like.

Information that can be gathered by the power management apparatus 11 may be, for example, a model number or an appliance ID of each appliance (hereinafter, appliance information), information relating to the profile of a user (hereinafter, user information), information relating to a billing account or a credit card of a user (hereinafter, billing information), registration information relating to a service to be used (hereinafter, service information), or the like. The appliance information mentioned above is set in each appliance in advance or is manually input by a user. Also, the user information, the billing information, and the service information mentioned above are, in many cases, manually input to the power management apparatus 11 by a user. Additionally, input method of the information is not limited to these examples, and may be changed to arbitrary input method. Also, in the following explanation, the appliance information, the user information, the billing information, and the service information will be referred to as "initial information."

The information that can be gathered by the power management apparatus 11 may be, in addition to the initial information, information relating to specifications of a battery connected to each appliance (hereinafter, appliance battery information), information relating to the state of each appliance or the like (including the power storage means, the power generating means, the power supply means, and the like) (hereinafter, appliance state information), information that can be acquired from an external system or server connected to the wide area network 2 (hereinafter, external information), and the like. The appliance state information mentioned above may be, for example, the discharge voltage or the amount of stored power of the power storage means at the time point of information gathering, the power generation voltage or the amount of power generation of the power generating means, power consumption of each appliance, and the like. Furthermore, the external information mentioned above may be the unit market price of power acquired from the power trading system 7, a list of available services acquired from the external server 3, and the like. Additionally, in the following explanation, the appliance battery information, the appliance state information, and the external information will be referred to as "primary information."

Furthermore, the power management apparatus 11 can calculate, by itself or by using the function of the external server 3, secondary information by using the initial information and the primary information. For example, the power management apparatus 11 analyzes the primary information described above, and calculates an index value indicating the balance between the power supplied from the power supplier system 5, the power generated by the power generating means, the power charged/discharged by the power storage means, and the power consumed by the managed block 12 (hereinafter, a balance index). Also, the power management apparatus 11 calculates a billing status and a CO2 reduction status based on power consumption. Furthermore, the power management apparatus 11 calculates the degree of consumption of each appliance (a proportion of duration of use to duration of life, or the like) based on the initial information, or analyzes a user's lifestyle pattern based on the change over time in the consumed power.

Also, the power management apparatus 11 obtains various pieces of information (hereinafter, tertiary information) by performing calculation using the secondary information or by performing information exchange with a system or a server connected to the wide area network 2 or another power management apparatus 11. For example, the power management apparatus 11 obtains information relating to the status of sell/buy order or price in the electricity market (hereinafter, market data), information on the amount of surplus power or of deficit power in a neighbouring region (hereinafter, regional power information), information on an appliance suitable for a user's lifestyle pattern from the standpoint of promoting efficient power usage (hereinafter, appliance recommendation information), security information relating to a computer virus or the like, or appliance risk information relating to a fault in an appliance or the like.

By appropriately using the initial information, the primary information, the secondary information, and the tertiary information described above, the power management apparatus 11 can provide various services to a user. Meanwhile, the power management apparatus 11 is to hold important information relating to a user's privacy or the security of the local power management system 1. Also, the power management apparatus 11 is in a place to permit or prohibit power supply to the managed block 12. Thus, a high level of security is wanted from the power management apparatus 11 so that an attack from the outside of the local power management system 1 or an illegal behaviour performed within the local power management system 1 can be prevented.

As an attack that the power management apparatus 11 receives from the outside of the local power management system 1, there can be conceived a DoS attack (Denial of Service attack), a computer virus, or the like. A firewall is of course provided between the local power management system 1 and the wide area network 2, but a stricter security measure is wanted for the reason stated above. Furthermore, as the illegal behaviour performed within the local power management system 1, there can be conceived illegal modification of an appliance, the power storage means, or the like, falsification of information, connection of an unauthorized appliance, or the like. Furthermore, a measure against use, by a malicious third party, of information on consumed power reflecting a user's lifestyle pattern, or detection/recovery of breakdown (ignition or the like in some cases) of each appliance or the power management apparatus 11 may become necessary from the viewpoint of enhancing the security level.

As will be described later, the power management apparatus 11 has a function of realizing such high security level as described above. The power management apparatus 11 realizes power management for the managed block 12, service provision based on the initial information, the primary information, the secondary information, and the tertiary information gathered from the managed block 12, and the like, while maintaining the security level. Additionally, the maintenance of the high security level by the power management apparatus 11 may not be realized by the power management apparatus 11 alone. Accordingly, an appliance, the power storage means, the power generating means, the power supply means, and the like, provided in the managed block 12 are to attempt to maintain the security level in cooperation with the power management apparatus 11. Additionally, such structural elements of the managed block 12 will also be described later in detail.

<1-2: Configuration of Managed Block 12 (FIGS. 2 to 4)>

Figure 2:
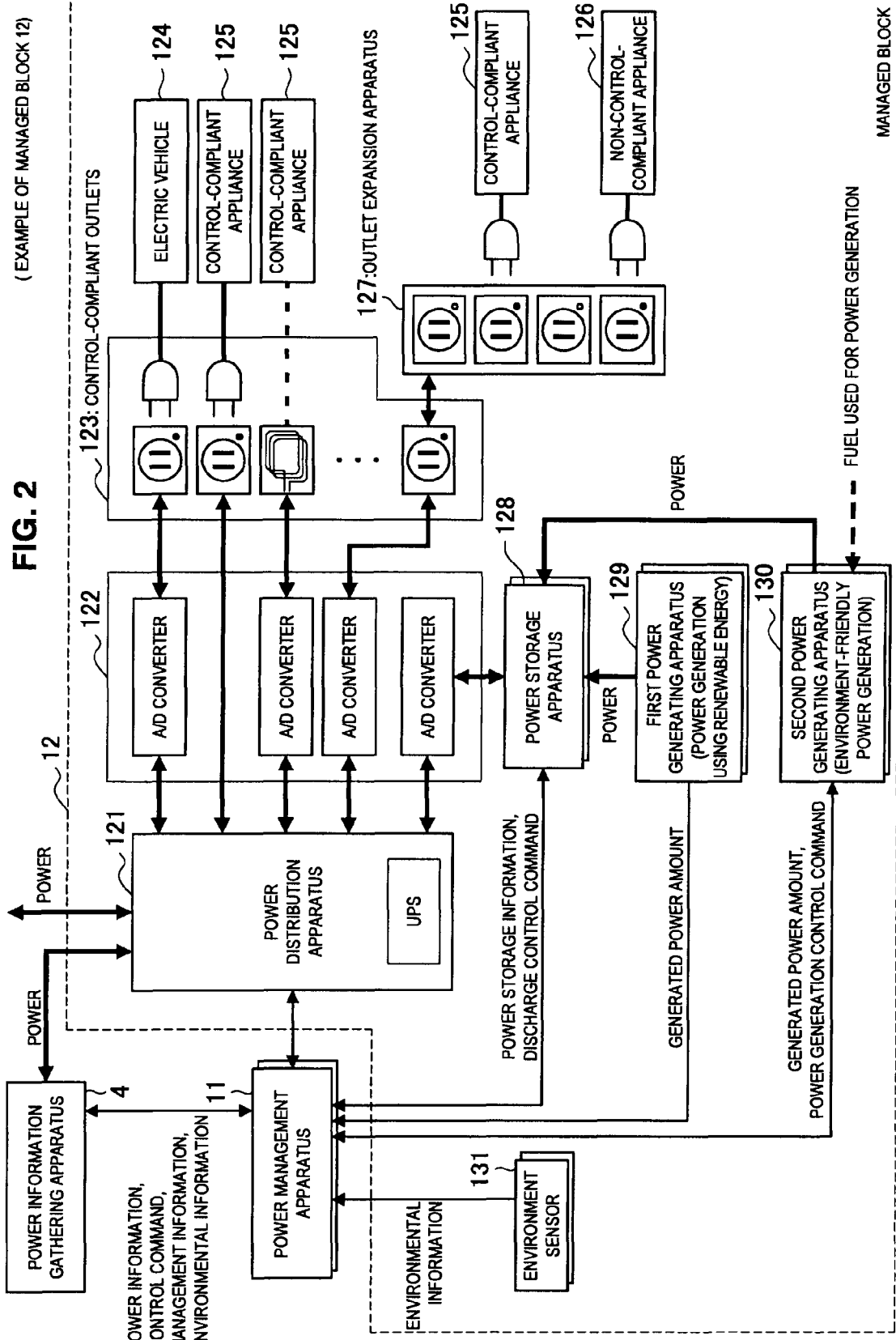
FIG. 2 is an explanatory diagram showing an overall configuration of a managed block.
Figure 3:
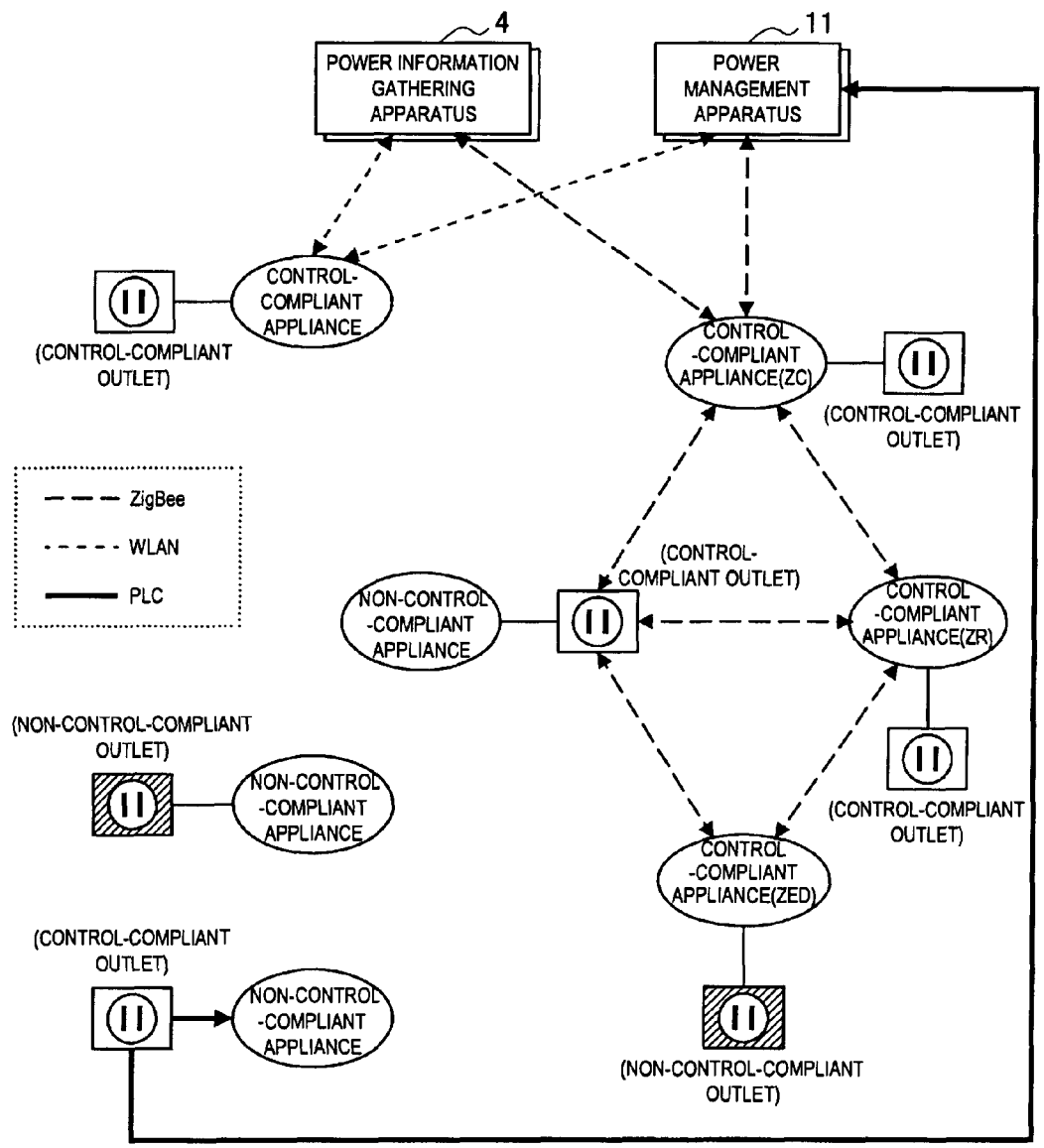
FIG. 3 is an explanatory diagram showing a communication network in a local power management system.
Figure 4:
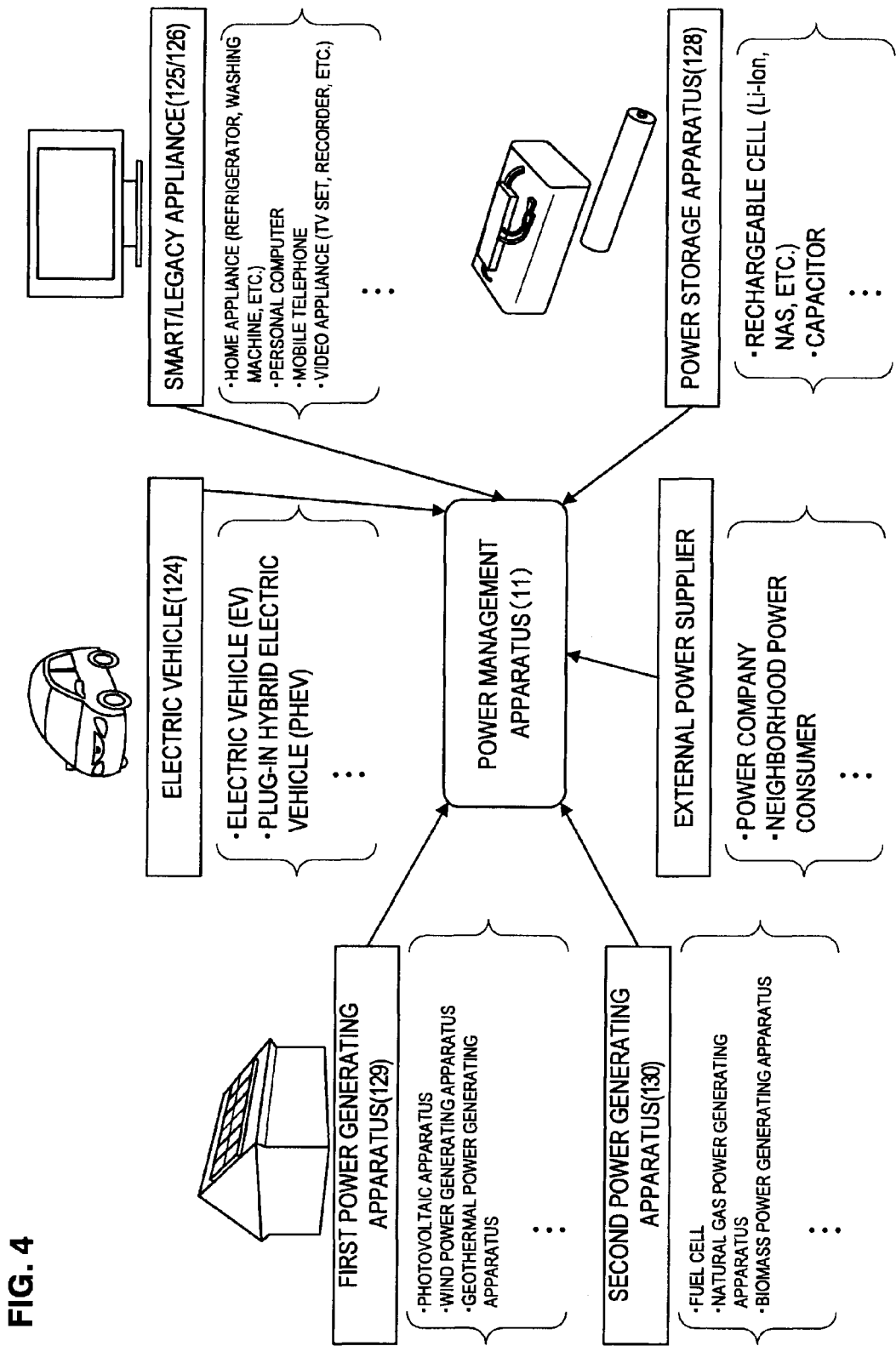
FIG. 4 is an explanatory diagram showing a system configuration that is centred on a power management apparatus.

A configuration of the managed block 12 will be described in detail here with reference to FIGS. 2 to 4. FIG. 2 shows the configuration of the managed block 12. Also, FIG. 3 shows a configuration of a communication network within the managed block 12. Furthermore, FIG. 4 shows specific configurations of main structural elements for exchanging information with the power management apparatus 11.

First, reference will be made to FIG. 2. As shown in FIG. 2, the managed block 12 includes a power distribution apparatus 121, an AC/DC converter 122, a control-compliant outlet 123, an electric vehicle 124, a control-compliant appliance 125, a non-control-compliant appliance 126, an outlet expansion apparatus 127, a power storage apparatus 128, a first power generating apparatus 129, a second power generating apparatus 130, and an environmental sensor 131.

Additionally, the control-compliant outlet 123, the electric vehicle 124, the control-compliant appliance 125, and the outlet expansion apparatus 127 are examples of the appliance described above. Also, the power storage apparatus 128 is an example of the power storage means described above. Furthermore, the first power generating apparatus 129 and the second power generating apparatus 130 are examples of the power generating means described above. The control-compliant outlet 123 and the outlet expansion apparatus 127 are also examples of the power supply means described above. Furthermore, the non-control-compliant appliance 126 is not directly subject to power management by the power management apparatus 11, and thus is not, by itself, an example of the appliance described above. However, as will be described later, by being combined with the outlet expansion apparatus 127, the non-control-compliant appliance 126 will be able to be managed by the power management apparatus 11, and will be an example of the appliance described above.

(Flow of Power)

Power supplied from the power supplier system 5, the power trading system 7, or another local power management system 1 (hereinafter, external power) is input to the power distribution apparatus 121. External AC power is assumed to be input to the power distribution apparatus 121 in the example of FIG. 2, but external DC power may also be input. However, for the sake of explanation, it is assumed in the following that external AC power is input to the power distribution apparatus 121. The external power input to the power distribution apparatus 121 is converted from AC to DC by the AC/DC converter 122, and is input to the control-compliant outlet 123 or the power storage apparatus 128. Additionally, a control-compliant outlet 123 to which AC is directly input from the power distribution apparatus 121 may be provided. In this case, it becomes possible to use the control-compliant appliance 125 or the like driven by AC.

Furthermore, power discharged from the power storage apparatus 128 (hereinafter, discharged power) is also input to the power distribution apparatus 121. The discharged power output from the power storage apparatus 128 is converted from DC to AC by the AC/DC converter 122, and is input to the power distribution apparatus 121. The discharged AC power input to the power distribution apparatus 121 is converted from AC to DC by the AC/DC converter 122, and is input to the control-compliant outlet 123. However, to avoid a loss in the discharged power at the AC/DC converter 122, the discharged power may also be supplied from the power storage apparatus 128 to the control-compliant outlet 123 without going through the AC/DC converter 122.

In addition to the external power input via the power distribution apparatus 121, power generated by the first power generating apparatus 129 and the second power generating apparatus 130 (hereinafter, generated power) is input to the power storage apparatus 128. Additionally, in the example of FIG. 2, the generated power generated by the first power generating apparatus 129 and the second power generating apparatus 130 is temporarily stored in the power storage apparatus 128. However, the generated power generated by the first power generating apparatus 129 and the second power generating apparatus 130 may also be input to the AC/DC converter 122 or the control-compliant outlet 123 without going through the power storage apparatus 128. However, in many cases, supply of the generated power output from the first power generating apparatus 129 is unstable due to the climate or the environment. Thus, in the case of using the generated power output from the first power generating apparatus 129, the generated power is preferably used after being temporarily stored in the power storage apparatus 128.

Additionally, the first power generating apparatus 129 is power generating means for generating power using renewable energy. For example, the first power generating apparatus 129 is a photovoltaic apparatus, a wind power generating apparatus, a geothermal power generating apparatus, a hydraulic power generating apparatus, or the like. On the other hand, the second power generating apparatus 130 is power generating means for generating power using non-renewable energy which is environment-friendly compared to, for example, thermal power generation that generates power by combusting gasoline, coal, or the like, and using the combustion. For example, the second power generating apparatus 130 is a fuel cell, a natural gas power generating apparatus, a biomass power generating apparatus, or the like. Incidentally, in the case hydrogen, which is the fuel for power generation by the fuel cell, is generated using power derived from renewable energy, the fuel cell is power generating means that generates power without using non-renewable energy.

The generated power generated by the first power generating apparatus 129 and the second power generating apparatus 130, and the power stored in the power storage apparatus 128 are, on the one hand, input to the control-compliant outlet 123 via the power distribution apparatus 121 or the AC/DC converter 122, and, on the other hand, may be purchased by the power supplier system 5, the power trading system 7, or the like. In such a case, the generated power generated by the first power generating apparatus 129 and the second power generating apparatus 130, and the discharged power output from the power storage apparatus 128 are converted by the AC/DC converter 122 from DC to AC, and are transmitted to the power supplier system 5, the power trading system 7, or the like, via the power distribution apparatus 121.

In the foregoing, the flow of power in the managed block 12 has been roughly described. Particularly, a distribution path of the power flowing via the power distribution apparatus 121 has been described here. As described above, the power distribution apparatus 121 undertakes a role of dividing the distribution path of power within the managed block 12. Thus, if the power distribution apparatus 121 stops, the distribution of power within the managed block 12 is disrupted. Therefore, the power distribution apparatus 121 is provided with an uninterruptible power supply (UPS). Additionally, in the example of FIG. 2, the power distribution apparatus 121 is provided separately from the power management apparatus 11, but the power distribution apparatus 121 and the power management apparatus 11 may be installed in the same casing.

(Authentication at the Time of Power Supply)

In the managed block 12, the power flowing to the control-compliant outlet 123 or the power storage apparatus 128 via the power distribution apparatus 121 is managed by the power management apparatus 11. For example, the power management apparatus 11 controls the power distribution apparatus 121 and supplies power to the control-compliant outlet 123 or stops the supply of power to the control-compliant outlet 123.

The power management apparatus 11 also carries out authentication of the control-compliant outlet 123. Then, the power management apparatus 11 supplies power to the control-compliant outlet 123 for which authentication has been successful, and stops supply of power to the control-compliant outlet 123 for which authentication has failed. In this manner, supply or non-supply of power in the managed block 12 is determined by the success or failure of authentication by the power management apparatus 11. Authentication by the power management apparatus 11 is carried out not only on the control-compliant outlet 123, but also on the electric vehicle 124, the control-compliant appliance 125, and the outlet expansion apparatus 127. Incidentally, authentication by the power management apparatus 11 is not carried out on the non-control-compliant appliance 126, which does not possess a communication function with the power management apparatus 11 nor a computational function necessary for authentication.

Accordingly, the control-compliant outlet 123, the electric vehicle 124, the control-compliant appliance 125, or the outlet expansion apparatus 127 which has been authenticated can be supplied with power based on control by the power management apparatus 11. However, the non-control-compliant appliance 126, which is not, by itself, to be authenticated, will not be supplied with power based on control by the power management apparatus 11. Accordingly, power is continuously supplied to the non-control-compliant appliance 126 independently of control by the power management apparatus 11, or power is not at all supplied thereto. However, by having the outlet expansion apparatus 127 carry out authentication instead, it becomes possible for the non-control-compliant appliance 126 to be supplied with power based on control by the power management apparatus 11.

(Summary of Appliance Function)

The functions of the control-compliant outlet 123, the electric vehicle 124, the control-compliant appliance 125, the non-control-compliant appliance 126, and the outlet expansion apparatus 127 will be briefly summarized here.

(Control-Compliant Outlet 123)

First, the function of the control-compliant outlet 123 will be summarized. The control-compliant outlet 123 has terminals to be connected with power plugs of the electric vehicle 124, the control-compliant appliance 125, the non-control-compliant appliance 126, and the outlet expansion apparatus 127. Furthermore, the control-compliant outlet 123 has a function of supplying power supplied via the power distribution apparatus 121 to the electric vehicle 124, the control-compliant appliance 125, the non-control-compliant appliance 126, and the outlet expansion apparatus 127 connected to the terminals. That is, the control-compliant outlet 123 has a function as a power supply outlet.

The control-compliant outlet 123 also has various functions necessary for being authenticated by the power management apparatus 11. For example, the control-compliant outlet 123 has a communication function for exchanging information with the power management apparatus 11. This communication function is realized by cable communication by a power line or a signal line, or by providing the control-compliant outlet 123 with a communication module for wireless communication. The control-compliant outlet 123 also has a computational function for performing computation necessary at the time of authentication. Furthermore, the control-compliant outlet 123 holds identification information such as an appliance ID and key information necessary for authentication. By using these functions and information, the control-compliant outlet 123 is enabled to be authenticated by the power management apparatus 11. Additionally, the type of authentication may be mutual authentication using a common key, or public key authentication using a pair of a secret key and a public key.

Furthermore, the control-compliant outlet 123 may also have state display means for displaying success/failure of authentication with the power management apparatus 11 and a state during authentication (hereinafter, authentication state). In this case, the state display means provided in the control-compliant outlet 123 may display the authentication states of the electric vehicle 124, the control-compliant appliance 125, and the outlet expansion apparatus 127 connected to the control-compliant outlet 123. Furthermore, this state display means may also display whether an appliance connected to the control-compliant outlet 123 is the non-control-compliant appliance 126 or not. Additionally, this state display means is configured from an indicator lamp such as a LED or a small bulb, or a display device such as an LCD or an ELD.

As has been described, power is supplied via the power distribution apparatus 121 by control by the power management apparatus 11 to the control-compliant outlet 123 for which authentication by the power management apparatus 11 has been successful. On the other hand, supply of power to the control-compliant outlet 123 for which authentication has failed is stopped by control by the power management apparatus 11. As such, with power supply being controlled according to the success/failure of authentication, an unauthorized power supply outlet can be prevented from connecting to the power distribution apparatus 121. It becomes possible also to easily detect a power supply outlet fraudulently connected to the power distribution apparatus 121. Furthermore, in the case the state display means is provided in the control-compliant outlet 123, the authentication state of the control-compliant outlet 123 can be easily grasped, and authentication failure and breakdown of the control-compliant outlet 123 can be easily distinguished.

Now, the form of the control-compliant outlet 123 is not limited to the form of a power point for connecting a power plug. For example, a control-compliant outlet 123 that has a built-in coil that supplies power by using electromagnetic induction as with a reader/writer for a non-contact IC card, and that has a surface form without the form of a power point can also be realized. In such a case, as with a non-contact IC card, a coil for generating an induced electromotive force from a magnetic field generated by the control-compliant outlet 123 is provided in the electric vehicle 124, the control-compliant appliance 125, and the outlet expansion apparatus 127. According to such a configuration, supplying or receiving of power without the use of a power plug is made possible. Additionally, in the case of using electromagnetic induction, exchange of information using modulation of magnetic field is made possible between the control-compliant outlet 123 and the electric vehicle 124, the control-compliant appliance 125, or the outlet expansion apparatus 127.

Furthermore, the control-compliant outlet 123 has a function of measuring the amount of power supplied to the electric vehicle 124, the control-compliant appliance 125, or the outlet expansion apparatus 127 connected to the terminal. Furthermore, the control-compliant outlet 123 has a function of notifying the measured amount of power to the power management apparatus 11. Also, the control-compliant outlet 123 may have a function of acquiring the primary information from the electric vehicle 124, the control-compliant appliance 125, or the outlet expansion apparatus 127 that is connected to the terminal and of transmitting the acquired primary information to the power management apparatus 11. As such, with the information which has been measured or acquired by the control-compliant outlet 123 transmitted to the power management apparatus 11, it becomes possible for the power management apparatus 11 to grasp power status or to perform power supply control for each individual control-compliant outlet 123.

(Electric Vehicle 124)

Next, the function of the electric vehicle 124 will be summarized. The electric vehicle 124 includes a battery for storing power. The electric vehicle 124 also includes a driving mechanism that is driven using power discharged from the battery. In the case the electric vehicle 124 is an electric vehicle or a plug-in hybrid electric vehicle, this driving mechanism will include a motor, a gear, a shaft, wheels, tires, and the like, for example. The driving mechanisms of other electric vehicles 124 will at least include a motor. Furthermore, the electric vehicle 124 includes a power plug used at the time of charging the battery. Power can be received by connecting this power plug to the control-compliant outlet 123. Incidentally, in the case of a method where the control-compliant outlet 123 supplies power by using the electromagnetic induction, a coil that generates an induced electromotive force when placed in a magnetic field is provided in the electric vehicle 124.

The electric vehicle 124 also has various functions necessary for being authenticated by the power management apparatus 11. For example, the electric vehicle 124 has a communication function for exchanging information with the power management apparatus 11. This communication function is realized by cable communication by a power line or a signal line, or by providing the electric vehicle 124 with a communication module for wireless communication. The electric vehicle 124 also has a computational function for performing computation necessary at the time of authentication. Furthermore, the electric vehicle 124 holds identification information such as an appliance ID and key information necessary for authentication. By using these functions and information, the electric vehicle 124 is enabled to be authenticated by the power management apparatus 11. Additionally, the type of authentication may be mutual authentication using a common key, or public key authentication using a pair of a secret key and a public key.

Furthermore, the electric vehicle 124 also has a function of transmitting, to the power management apparatus 11, appliance battery information relating to a battery that is mounted, such as a remaining battery level, a charge amount, and a discharge amount. User information relating to a user owning the electric vehicle 124, and appliance information relating to fuel efficiency, performance, or the like, of the electric vehicle 124 are also transmitted to the power management apparatus 11. With these pieces of information transmitted to the power management apparatus 11 from the electric vehicle 124, it becomes possible for the power management apparatus 11 to carry out processes such as billing using the user information, and taxation based on the user information and the appliance information. For example, a process of imposing an environmental tax calculated based on the amount of $CO_2$ emissions, a process of displaying a mileage based on the remaining battery level, and the like, will be able to be carried out by the power management apparatus 11.

Additionally, it is also conceivable to use the battery of the electric vehicle 124 instead of the power storage apparatus 128. For example, the battery of the electric vehicle 124 may be used instead of the power storage apparatus 128 when it is temporarily not possible to use the power storage apparatus 128, such as when the power storage apparatus 128 is broken down or is being exchanged. Furthermore, since the electric vehicle 124 is itself movable, it can carry external power as a material. That is, it can be used as a movable power storage apparatus 128. Due to such advantage, it may also be useful to have the electric vehicle 124 act as back-up power supply in case of disaster or emergency. Such usage can, of course, be realized within the framework of the local power management system 1 according to the present embodiment.

(Control-Compliant Appliance 125)

Next, the function of the control-compliant appliance 125 will be summarized. The control-compliant appliance 125 has various functions necessary for being authenticated by the power management apparatus 11. For example, the control-compliant appliance 125 has a communication function for exchanging information with the power management apparatus 11. This communication function is realized by cable communication by a power line or a signal line, or by providing the control-compliant appliance 125 with a communication module for wireless communication. The control-compliant appliance 125 also has a computational function for performing computation necessary at the time of authentication. Furthermore, the control-compliant appliance 125 holds identification information such as an appliance ID and key information necessary for authentication. By using these functions and information, the control-compliant appliance 125 is enabled to be authenticated by the power management apparatus 11. Additionally, the type of authentication may be mutual authentication using a common key, or public key authentication using a pair of a secret key and a public key.

Furthermore, the control-compliant appliance 125 also has a function of transmitting, to the power management apparatus 11, appliance battery information relating to a battery that is mounted, such as a remaining battery level, a charge amount, and a discharge amount. User information relating to a user owning the control-compliant appliance 125, and appliance information relating to the type, performance, or the like, of the control-compliant appliance 125 are also transmitted to the power management apparatus 11. With these pieces of information transmitted to the power management apparatus 11 from the control-compliant appliance 125, it becomes possible for the power management apparatus 11 to carry out processes such as billing using the user information, and taxation based on the user information and the appliance information. For example, a process of imposing an environmental tax calculated based on the amount of $CO_2$ emissions, a display process for recommending an appliance with higher environmental performance, and the like, will be able to be carried out by the power management apparatus 11.

(Non-Control-Compliant Appliance 126, Outlet Expansion Apparatus 127)

Next, the functions of the non-control-compliant appliance 126 and the outlet expansion apparatus 127 will be summarized. Unlike the control-compliant outlet 123, the electric vehicle 124, and the control-compliant appliance 125 described above, the non-control-compliant appliance 126 does not possess a function necessary to be authenticated by the power management apparatus 11. That is, the non-control-compliant appliance 126 is an existing home electric appliance, an existing video appliance, or the like. The non-control-compliant appliance 126, which does not pass authentication, is not enabled to be subjected to power management by the power management apparatus 11, and in some cases, is not enabled to receive power. Therefore, to enable use of the non-control-compliant appliance 126 in the local power management system 1, delegate means for performing authentication becomes necessary.

The outlet expansion apparatus 127 undertakes two roles. One role is a function of performing delegate authentication such that the non-control-compliant appliance 126 is enabled to be used in the local power management system 1. The other role is a function of increasing the number of appliances to be connected to the control-compliant outlet 123. One or more terminals to be connected with the power plug of the electric terminal 124, the control-compliant appliance 125, or the non-control-compliant appliance 126 is provided to the outlet expansion apparatus 127. When using the outlet expansion apparatus 127 provided with a plurality of terminals, the number of the electric vehicles 124, the control-compliant appliances 125, and the non-control-compliant appliances 126 that can be connected to the control-compliant outlet 123 can be increased. That is, the outlet expansion apparatus 127 functions as a power strip having an advanced function.

In the foregoing, the functions of the control-compliant outlet 123, the electric vehicle 124, the control-compliant appliance 125, the non-control-compliant appliance 126, and the outlet expansion apparatus 127 have been briefly summarized. Incidentally, the functions described above are not the only functions of the control-compliant outlet 123, the electric vehicle 124, the control-compliant appliance 125, the non-control-compliant appliance 126, and the outlet expansion apparatus 127. Taking these functions as basics, functions necessary for operation of power management by the power management apparatus 11 described below will be further supplemented.

(Communication Function)

Here, a communication function of the power management apparatus 11, the control-compliant outlet 123, the electric vehicle 124, the control-compliant appliance 125, the outlet expansion apparatus 127, or the like, within the local power management system 1 will be described with reference to FIG. 3. As shown in FIG. 3, in the local power management system 1, short-range wireless communication, wireless LAN, power line communication, or the like, is used, for example. For example, ZigBee is an example of the short-range wireless communication. Also, PLC is an example of the power line communication.

As shown in FIG. 2, in the local power management system 1, the control-compliant outlet 123 and appliances connected to the control-compliant outlet 123 are connected to the power distribution apparatus 121 by power lines. Thus, a communication network based on the power line communication can be easily constructed by using these power lines. On the other hand, in the case of using the short-range wireless communication, a communication network can be constructed by connecting each appliance in an ad-hoc manner, as shown in FIG. 3. Also, in the case of using the wireless LAN, each appliance can be directly connected to the power management apparatus 11. Accordingly, a necessary communication network can be constructed within the local power management system 1 by using any of the communication methods.

However, as shown in FIG. 3, the non-control-compliant appliance 126 is sometimes not enabled to be connected to the power management apparatus 11 by using the communication network. Thus, in the case of using the non-control-compliant appliance 126, the non-control-compliant appliance 126 has to be connected to the outlet expansion apparatus 127. Additionally, even in the case of using a non-control compliant outlet not having the communication function nor an authentication function, connection to the power management apparatus 11 via the communication network is enabled by using the function of the electric vehicle 124, the control-compliant appliance 125, or the outlet expansion apparatus 127, if the electric vehicle 124, the control-compliant appliance 125, or the outlet expansion apparatus 127 is connected to the non-control compliant outlet. Of course, in the case the non-control-compliant appliance 126 is connected to the non-control compliant outlet, connection to the communication network is not enabled, and thus control by the power management apparatus 11 is not enabled.

Incidentally, the power information gathering apparatus 4 may be included, as a connection destination, in the communication network constructed within the local power management system 1, as shown in FIG. 3. Also, information may be exchanged between the electric vehicle 124 or the control-compliant appliance 125 and the power information gathering apparatus 4 by using this communication network. Of course, the power management apparatus 11 and the power information gathering apparatus 4 may exchange information by using this communication network. As such, the structure of the communication network constructed within the local power management system 1 should be appropriately set according to the mode of embodiment. Additionally, this communication network is to be constructed by a sufficiently secure communication channel. Also, a mechanism that allows to guarantee security of information flowing through the communication channel should be provided.

(Specific Examples of Appliances and Various Apparatuses)

Here, specific examples of some structural elements of the local power management system 1 will be introduced with reference to FIG. 4. As shown in FIG. 4, structural elements that possibly exchange information with the power management apparatus 11 include, for example, the electric vehicle 124, the control-compliant appliance 125 (a smart appliance), the non-control-compliant appliance 126 (a legacy appliance), the power storage apparatus 128, the first power generating apparatus 129, the second power generating apparatus 130, and the like.

As the electric vehicle 124, an electric vehicle and a plug-in hybrid electric vehicle can be given as specific examples, for example. Also, as the control-compliant appliance 125 and the non-control-compliant appliance 126, a home appliance, a personal computer, a mobile phone, and a video appliance can be given as specific examples, for example. As the power storage apparatus 128, a lithium-ion rechargeable cell, a NAS rechargeable cell, and a capacitor can be given as specific examples, for example. Also, as the first power generating apparatus 129, a photovoltaic apparatus, a wind power generating apparatus, and a geothermal power generating apparatus can be given as specific examples, for example. Furthermore, as the second power generating apparatus 130, a fuel cell, a natural gas power generating apparatus, and a biomass power generating apparatus can be given as specific examples, for example. As described, various apparatuses and appliances are used as the structural elements of the local power management system 1.

In the foregoing, the configuration of the managed block 12 has been described. However, the function of each structural element included in the managed block 12 is not limited to that described above. The function of each structural element is supplemented as necessary for power management by the power management apparatus 11. Additionally, a supplementary function of each structural element will be described in detail in the explanation of the configuration of the power management apparatus 11 and other structural elements to be described later.

<1-3: Configuration of External Server 3 (FIGS. 5 and 6)>

Figure 5:
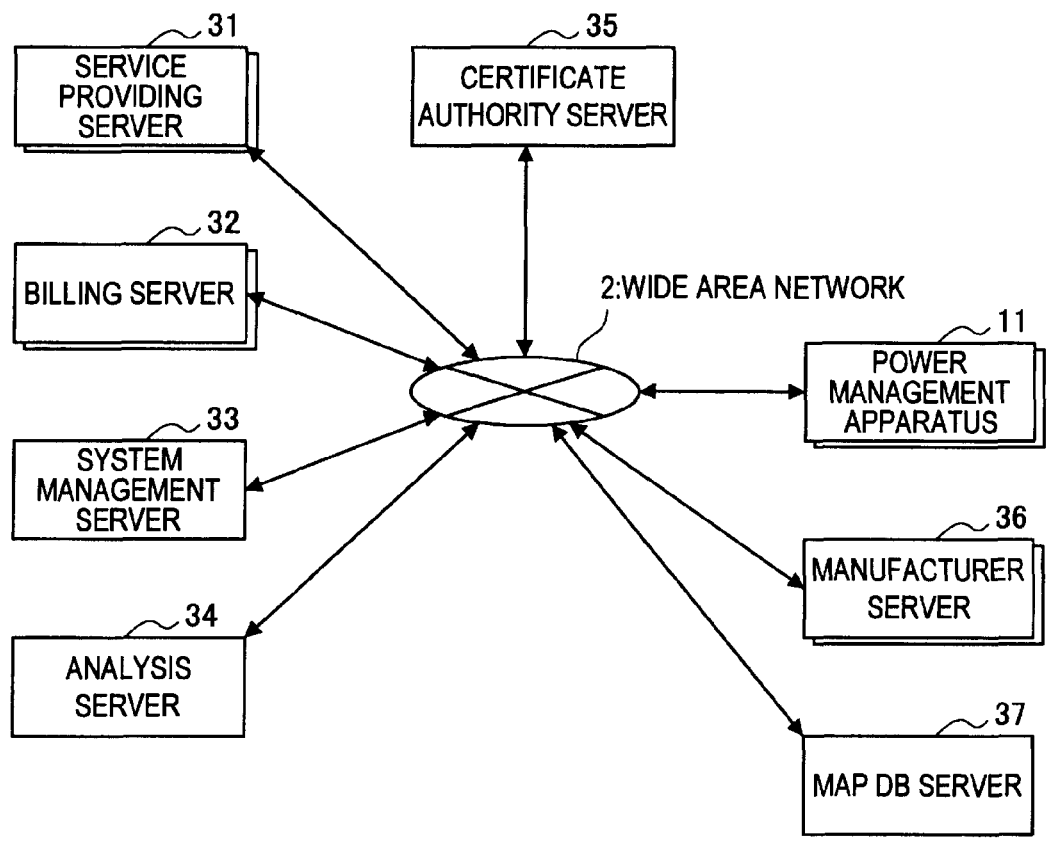
FIG. 5 is an explanatory diagram showing specific examples of external servers.

Next, the configuration of the external server 3 will be described with reference to FIG. 5. As shown in FIG. 5, as the external server 3, a service providing server 31, a billing server 32, a system management server 33, an analysis server 34, a certificate authority server 35, a manufacturer server 36, and a map DB server 37 are used, for example.

The service providing server 31 has a function of providing a service that uses a function of the power management apparatus 11 or the like. The billing server 32 has a function of providing the power management apparatus 11 with billing information according to the power consumed in the local power management system 1, and requesting a user to settle the usage fee, based on information on the amount of power managed by the power management apparatus 11. Also, the billing server 32 carries out, in cooperation with the service providing server 31, a billing process on a service used by a user. Additionally, the billing process may be carried out for an owner user of the electric vehicle 124, the control-compliant appliance 125, or the like, that consumed power, or may be carried out for a user of the power management apparatus 11 managing information on the power consumed.

The system management server 33 has a function of managing the entire power management system shown in FIG. 1 or of managing the power management system on a regional basis. For example, as shown in FIG. 6, the system management server 33 grasps a usage status in the local power management system 1 of a user #1, a usage status in the local power management system 1 of a user #2, and a usage status in the local power management system 1 of a user #3, and provides the billing server 32 or the like with necessary information.

In the example of FIG. 6, a case is assumed where the user #1 used power in the local power management systems 1 of the user #1 himself/herself, the user #2, and the user #3. In this case, an appliance ID of the user #1 that consumed power and usage information (power consumption or the like) are gathered by the system management server 33, and user information of the user #1 and the usage information are transmitted from the system management server 33 to the billing server 32. Furthermore, the system management server 33 calculates billing information (billed amount, or the like) based on the gathered usage information, and provides the same to the user #1. For its part, the billing server 32 charges the user #1 for a sum corresponding to the billing information.

As described, with the system management server 33 exercising general control over a plurality of local power management systems 1, a mechanism is realized of billing a user who has used power even if the user has used power in the local power management system 1 of another user. Especially, charging of the electric vehicle 124 is, in many cases, performed outside the local power management system 1 managed by oneself. In such a case, if the function described above of the system management server 33 is used, fee can be reliably billed to the user of the electric vehicle 124.

The analysis server 34 has a function of analyzing information gathered by the power management apparatus 11, or information that another server connected to the wide area network 2 holds. For example, in the case of optimizing region-based power supply control, the amount of information gathered from the local power management systems 1 will be huge, and to calculate an optimal control method for each local power management system 1 by analyzing the information, tremendous amount of computation will have to be performed. Such computation is burdensome to the power management apparatus 11, and thus is carried out by using the analysis server 34. Additionally, the analysis server 34 can also be used for other various computational processes. Furthermore, the certificate authority server 35 is for authenticating a public key, and for issuing a public key certificate.

The manufacturer server 36 is managed by the manufacturer of an appliance. For example, the manufacturer server 36 of the electric vehicle 124 holds information relating to the design of the electric vehicle 124. Similarly, the manufacturer server 36 of the control-compliant appliance 125 holds information relating to the design of the control-compliant appliance 125. Furthermore, the manufacturer server 36 holds information for identifying each manufactured appliance, such as each electric vehicle 124 and each control-compliant appliance 125. The manufacturer server 36 has a function of identifying the electric vehicle 124 or the control-compliant appliance 125 located within each local power management system 1 by using these pieces of information and cooperating with the power management apparatus 11. By using this function, the power management apparatus 11 can carry out authentication of the electric vehicle 124 or the control-compliant appliance 125, or detect connection of an unauthorized appliance.

The map DB server 37 holds a map database. Accordingly, a server or the power management apparatus 11 connected to the wide area network 2 can access the map DB server 37 and use the map database. For example, in a case a user used power outside his/her local power management system 1, the system management server 33 can search the usage location from the map database and provide the user with information on the usage location together with billing information. As described, there are various types of external server 3, and in addition to the server configuration illustrated here, different types of external servers 3 can also be added as appropriate.

Figure 7:
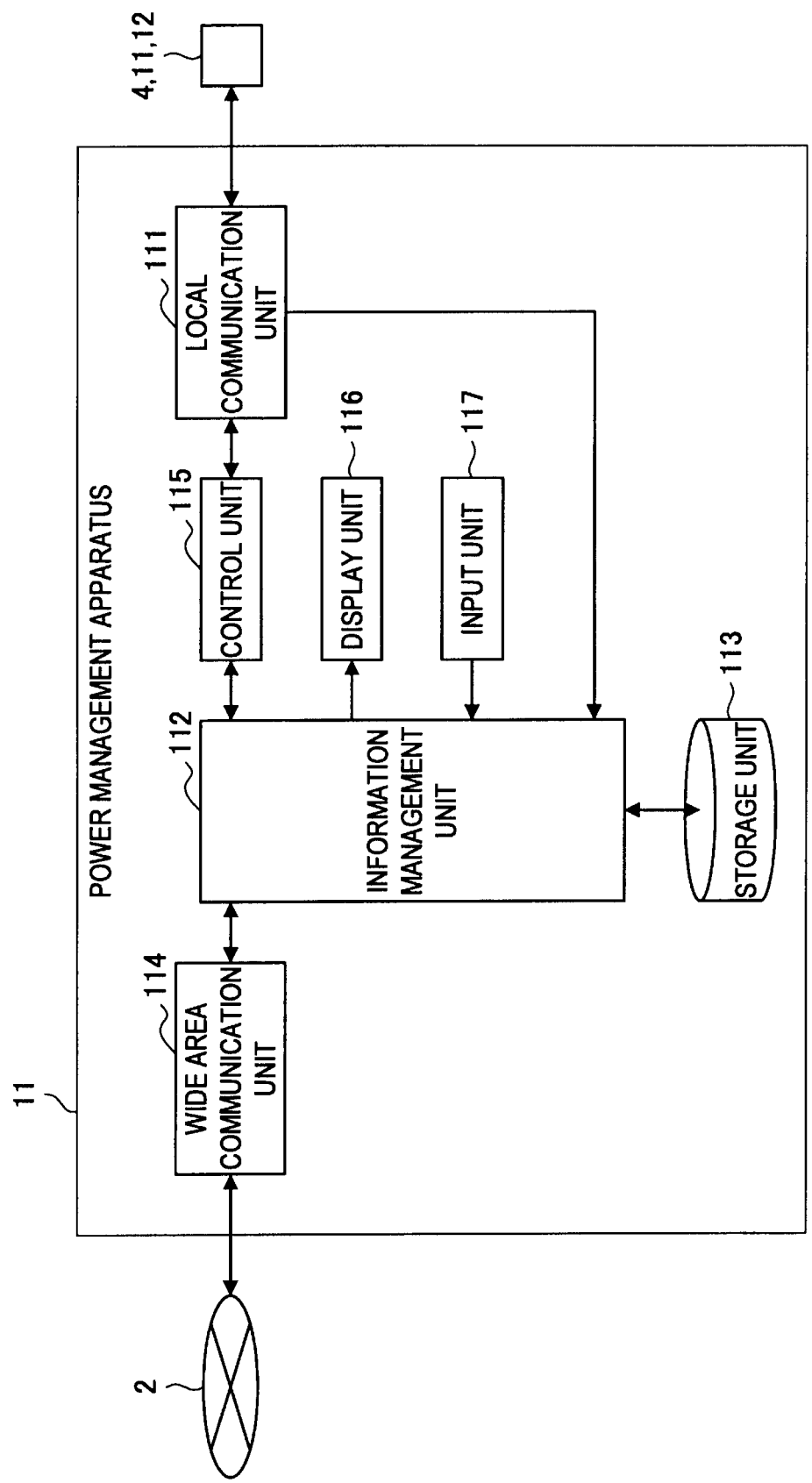
FIG. 7 is an explanatory diagram showing a functional configuration of the power management apparatus.
Figure 8:
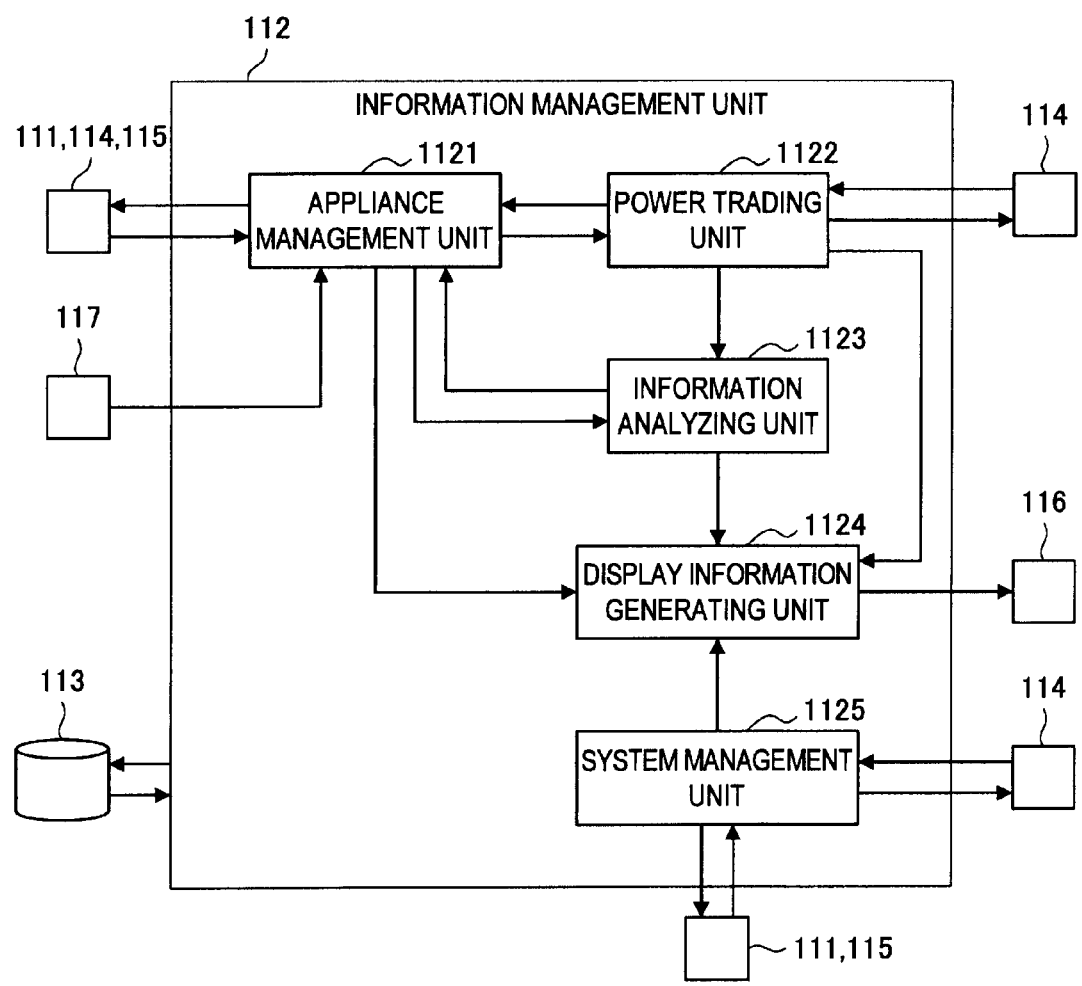
FIG. 8 is an explanatory diagram showing a detailed functional configuration of an information management unit.

2: Configuration of Power Management Apparatus 11 (FIGS. 7 to 9)

In the foregoing, an overall picture of the power management system according to the present embodiment has been described. In the following, the configuration of the power management apparatus 11 mainly in charge of power management in the power management system will be described with reference to FIGS. 7 to 9.

<2-1: Overview of Function>

First, an overall functional configuration of the power management apparatus 11 will be described with reference to FIG. 7. As shown in FIG. 7, the power management apparatus 11 includes a local communication unit 111, an information management unit 112, a storage unit 113, a wide area communication unit 114, a control unit 115, a display unit 116, and an input unit 117.

The local communication unit 111 is communication means for communicating via a communication network constructed within the local power management system 1. The information management unit 112 is means for managing appliance information of each structural element included in the local power management system 1 and information relating to power. Also, the authentication process for the control-compliant outlet 123, the electric vehicle 124, the control-compliant appliance 125, the outlet expansion apparatus 127, or the like, is carried out by the information management unit 112. The storage unit 113 is storage means for holding information used for authentication and information used for power management. The wide area communication unit 114 is communication means for exchanging information with an external system and server via the wide area network 2.

The control unit 115 is control means for controlling operation of each structural element included in the local power management system 1. The display unit 116 is display means for displaying information relating to power consumed in the local power management system 1, the user information, the billing information, other types of information relating to power management, information relating to power management outside the local power management system 1, information relating to power trading, and the like. Additionally, as the display means, an LCD, an ELD or the like is used, for example. The input unit 117 is input means for a user to input information. Additionally, as the input unit 117, a keyboard, a button, or the like is used, for example. Furthermore, it is also possible to construct a touch panel by combining the display unit 116 and the input unit 117.

As described, the power management apparatus 11 includes the communication means (the local communication unit 111, the wide area communication unit 114) for exchanging information with an appliance, an apparatus, a system, a server, or the like, within or outside the local power management system 1. Furthermore, the power management apparatus 11 includes the control means (the control unit 115) for controlling an appliance or an apparatus within the local power management system 1. Also, the power management apparatus 11 includes information management means (the information management unit 112) that gathers information from an appliance, an apparatus, a system, a server, or the like, within or outside the local power management system 1, and provides a service or authenticates an appliance or an apparatus within the local power management system 1 by using the information. Also, the power management apparatus 11 includes the display means (the display unit 116) for displaying information relating to power within or outside the local power management system 1.

To safely and efficiently manage power within the local power management system 1, first, an appliance, an apparatus, or the like, within the local power management system 1 has to be correctly identified. Also, to safely and efficiently manage power within the local power management system 1, analysis of the information relating to power within and outside the local power management system 1 and performance of appropriate power control are also necessary. The function of the information management unit 112 is used for management of information performed to fulfill the above. Accordingly, the function of the information management unit 112 will be described in greater detail. Additionally, the function of the control unit 115 is used for control of a specific appliance, apparatus, or the like.

<2-2: Details of Function>

In the following, a functional configuration of the information management unit 112 will be described in detail with reference to FIGS. 8 and 9. FIG. 8 shows a detailed functional configuration of the information management unit 112. FIG. 9 shows a main function of each structural element of the information management unit 112.

As shown in FIG. 8, the information management unit 112 includes an appliance management unit 1121, a power trading unit 1122, an information analyzing unit 1123, a display information generating unit 1124, and a system management unit 1125.

(Appliance Management Unit 1121)

As shown in FIG. 9, the appliance management unit 1121 is means for managing an appliance, an apparatus, or the like, within the local power management system 1. For example, the appliance management unit 1121 performs, for the control-compliant outlet 123, the electric vehicle 124, the control-compliant appliance 125, the outlet expansion apparatus 127, or the like, registration, authentication, management of an appliance ID, management of operation settings and service settings, grasping of an operational state and a usage state, gathering of environmental information, and the like. Additionally, gathering of environmental information is carried out by using the environmental sensor 131 installed in the managed block 12. Moreover, the environmental information is information relating to temperature, humidity, weather, wind direction, wind velocity, landform, region, weather forecast, and the like, and information obtained by analysis thereof.

(Power Trading Unit 1122)

As shown in FIG. 9, the power trading unit 1122 performs acquisition of market trading data or individual trading data in the electricity market, timing control of execution of trading, execution of trading, management of trade log, and the like. Additionally, the market trading data is information relating to market price and trading conditions in the electricity market. Moreover, the individual trading data is information relating to transaction price and trading conditions determined at the time of an individual trade between a power supplier and a neighborhood consumer or the like. The timing control of execution of trading is automatic control of placing a buy order for a predetermined amount at a timing the power purchase price falls below a predetermined value or placing a sell order for a predetermined amount at a timing the power sell price rises above a predetermined value, for example.

(Information Analyzing Unit 1123)

As shown in FIG. 9, the information analyzing unit 1123 performs analysis of power generation data, analysis of power storage data, learning of lifestyle pattern, and analysis of power consumption data. Furthermore, the information analyzing unit 1123 performs, based on the analyses, estimation of power consumption pattern, estimation of power storage pattern, estimation of power discharge pattern, and estimation of power generation pattern. Additionally, analysis and learning by the information analyzing unit 1123 are performed by using time-series data of the amount of power generation by the first power generating apparatus 129 or the second power generating apparatus 130 within the local power management system 1, time-series data of charge/discharge amount or power storage amount of the power storage apparatus 128, or time-series data of the amount of power supplied from the power supplier system 5, for example.

Furthermore, estimation by the information analyzing unit 1123 is performed by using, as data for learning, the time-series data or an analysis result obtained by analyzing the time-series data, and by using an estimation formula obtained based on a predetermined machine learning algorithm. For example, by using a genetic learning algorithm (see JP-A-2009-48266, for example), the estimation formula can be automatically constructed. Also, by inputting the past time-series data or analysis result to the estimation formula, an estimation result can be obtained. Furthermore, by sequentially inputting calculated estimation results to the estimation formula, time-series data can be estimated.

Furthermore, the information analyzing unit 1123 performs calculation of present or future $CO_2$ emissions, calculation of power supply pattern for reducing the power consumption (power saving pattern), calculation of power supply pattern for reducing $CO_2$ emissions (low $CO_2$ emissions pattern), and calculation or recommendation of appliance configuration, appliance arrangement or the like capable of reducing the power consumption and the $CO_2$ emissions in the local power management system 1. The $CO_2$ emissions are calculated based on the total power consumption or the power consumption distinguished for each power generation method.

In the case of using the total power consumption, approximately average $CO_2$ emissions are calculated. On the other hand, in the case of using the power consumption distinguished for each power generation method, comparatively accurate $CO_2$ emissions are calculated. Additionally, by at least distinguishing between power supplied from the outside, power generated by the first power generating apparatus 129 and power generated by the second power generating apparatus 130, more accurate $CO_2$ emissions can be calculated than when the total power consumption is used. Tax, such as carbon tax, and billing are, in many cases, determined according to the $CO_2$ emissions. Thus, it is assumed that enabling accurate calculation of the $CO_2$ emissions will increase a sense of fairness among users and contribute to widespread use of power generating means based on renewable energy.

(Display Information Generating Unit 1124)

As shown in FIG. 9, the display information generating unit 1124 generates display information to be displayed on the display unit 116, by adjusting the format of information relating to an appliance, an apparatus or the like within the local power management system 1, information relating to power, information relating to environment, information relating to power trading, information relating to an analysis result or an estimation result by the information analyzing unit 1123, or the like. For example, the display information generating unit 1124 generates display information for displaying information indicating the amount of power in a graph format, or generates display information for displaying market data in a table format. Also, the display information generating unit 1124 generates a graphical user interface (GUI) used for display of various types of information or input of information. These pieces of display information generated by the display information generating unit 1124 are displayed on the display unit 116.

(System Management Unit 1125)

As shown in FIG. 9, the system management unit 1125 performs management/update of version of firmware, which is a program for controlling basic operation of the power management apparatus 11, restricts access thereto, and takes antivirus measures, for example. Also, in the case a plurality of power management apparatuses 11 are installed in the local power management system 1, the system management unit 1125 exchanges information with another power management apparatuses 11, and performs control such that a plurality of power management apparatuses 11 operate in cooperation with each other. For example, the system management unit 1125 manages the attribute (for example, priority ranks of control processes on an appliance, an apparatus, or the like) of each power management apparatus 11. Furthermore, the system management unit 1125 performs state control of each power management apparatus 11 relating to participation in a cooperative operation or withdrawal from the cooperative operation.

In the foregoing, the functional configuration of the power management apparatus 11 has been described. Additionally, the functional configuration of the power management apparatus 11 described here is only an example, and functions other than the above may be added as necessary.

3: Configuration of Outlet Expansion Apparatus 127 (FIGS. 10 to 25)

Figure 10:
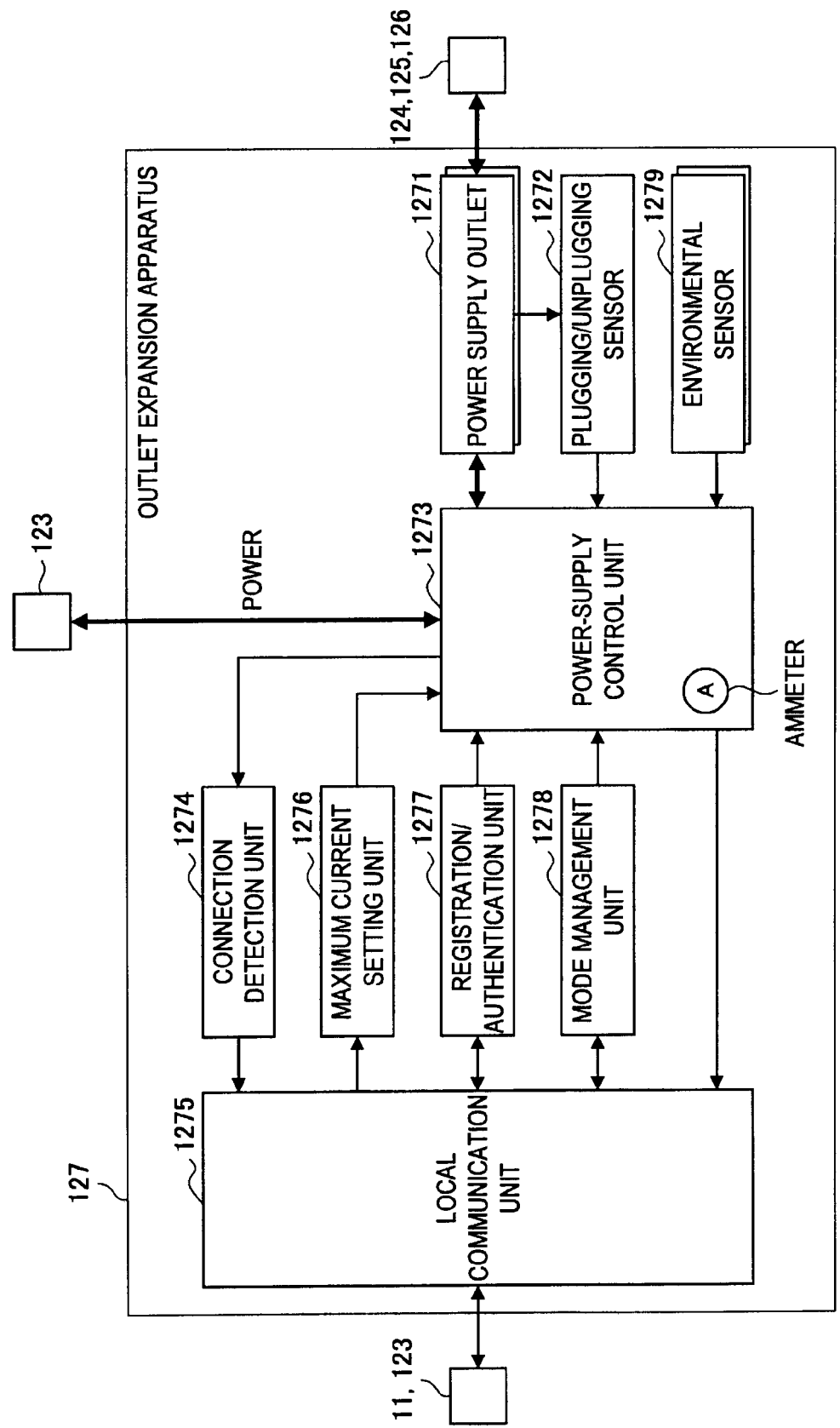
FIG. 10 is an explanatory diagram showing a functional configuration of an outlet expansion apparatus.

Here, the configuration of the outlet expansion apparatus 127 will be described with reference to FIGS. 10 to 25. FIG. 10 shows a functional configuration of the outlet expansion apparatus 127. Also, FIGS. 11 to 25 show operation flows by the outlet expansion apparatus 127.

<3-1: Function>

First, a functional configuration of the outlet expansion apparatus 127 will be described with reference to FIG. 10. As has been described, the outlet expansion apparatus 127 undertakes the role of performing, as a delegate, authentication of the non-control-compliant appliance 126. Also, the outlet expansion apparatus 127 undertakes a role of increasing the number of appliances or apparatuses that can be connected to the control-compliant outlet 123. Accordingly, the outlet expansion apparatus 127 has a functional configuration as below. As shown in FIG. 10, the outlet expansion apparatus 127 includes a power supply outlet 1271, a plugging/unplugging sensor 1272, a power-supply control unit 1273, a connection detection unit 1274, a local communication unit 1275, a maximum current setting unit 1276, a registration/authentication unit 1277, a mode management unit 1278, and an environmental sensor 1279.

The electronic vehicle 124, the control-compliant appliance 125, or the non-control-compliant appliance 126 is connected to the power supply outlet 1271. Then, the power supply outlet 1271 supplies power to the electric vehicle 124, the control-compliant appliance 125, or the non-control-compliant appliance 126 in accordance with the control by the power-supply control unit 1273. Also, the plugging/unplugging sensor 1272 is connected to the power supply outlet 1271, and physical plugging/unplugging of the electric vehicle 124, the control-compliant appliance 125, or the non-control-compliant appliance 126 can be detected. The physical plugging/unplugging of the electric vehicle 124, the control-compliant appliance 125, or the non-control-compliant appliance 126 detected by the plugging/unplugging sensor 1272 is notified to the power-supply control unit 1273.

The power-supply control unit 1273 is control means for controlling power supply to the electric vehicle 124, the control-compliant appliance 125, or the non-control-compliant appliance 126 connected to the power supply outlet 1271. Furthermore, the power-supply control unit 1273 includes an ammeter. Accordingly, the power-supply control unit 1273 can measure the current supplied to the power supply outlet 1271. Furthermore, the contents of notification received by the power-supply control unit 1273 from the plugging/unplugging sensor 1272 and a change in the current measured by the ammeter of the power-supply control unit 1273 are input to the connection detection unit 1274. Furthermore, information on the current measured by the ammeter of the power-supply control unit 1273 is input to the local communication unit 1275.

In the case the contents of notification received by the power-supply control unit 1273 from the plugging/unplugging sensor 1272 and the change in the current measured by the ammeter of the power-supply control unit 1273 are input, the connection detection unit 1274 detects, based on these pieces of input information, connection state (connection/non-connection) of the electric vehicle 124, the control-compliant appliance 125, or the non-control-compliant appliance 126 to the power supply outlet 1271. Then, information on the connection state detected by the connection detection unit 1274 is input to the local communication unit 1275. The local communication unit 1275 to which the information on the connection state and the information on the current are input uses the communication network in the local power management system 1 and transmits these pieces of input information to the power management apparatus 11 directly or via the control-compliant outlet 123.

When the electric vehicle 124, the control-compliant appliance 125, or the non-control-compliant appliance 126 is connected to the power supply outlet 1271 and information on the connection state is transmitted to the power management apparatus 11, the power management apparatus 11 transmits, to the outlet expansion apparatus 127, information indicating the upper limit of current (hereinafter, maximum current) that may be supplied from the power supply outlet 1271. The information on the maximum current is received by the local communication unit 1275, and is input to the maximum current setting unit 1276. The maximum current setting unit 1276 sets the maximum current of the power-supply control unit 1273 based on the input information on the maximum current. The power-supply control unit 1273 in which the maximum current is set controls power supply to the power supply outlet 1271 within a range of current not exceeding the maximum current.

Additionally, the power-supply control unit 1273 does not supply power to the power supply outlet 1271 until the electric vehicle 124 or the control-compliant appliance 125 connected to the power supply outlet 1271 is registered/authenticated by the power management apparatus 11 or delegate authentication of the non-control-compliant appliance 126 connected to the power supply outlet 1271 is completed. Thus, when the maximum current is set, registration/authentication process for the electric vehicle 124, the control-compliant appliance 125, or the non-control-compliant appliance 126 connected to the power supply outlet 1271 is carried out by the registration/authentication unit 1277. Incidentally, at the time of registration/authentication, a predetermined amount of power is supplied as appropriate from the power-supply control unit 1273 to the electric vehicle 124 or the control-compliant appliance 125 connected to the power supply outlet 1271.

The registration/authentication of the electric vehicle 124 and the control-compliant appliance 125 and the delegate authentication of the non-control-compliant appliance 126 are performed by the registration/authentication unit 1277. Additionally, the function and the operation of the registration/authentication unit 1277 will be described in detail in the description of an operation flow described later. If the registration/authentication of the electric vehicle 124 or the control-compliant appliance 125 or the delegate authentication of the non-control-compliant appliance 126 is successful, the registration/authentication unit 1277 notifies the power-supply control unit 1273 of the success/failure of the registration/authentication or the delegate authentication. When the success of the registration/authentication or the delegate authentication is notified, the power-supply control unit 1273 starts supplying power to the power supply outlet 1271. On the other hand, when failure of the registration/authentication or delegate authentication is notified, the power-supply control unit 1273 stops supplying power to the power supply outlet 1271.

In this manner, the power-supply control unit 1273 performs power supply control according to the limitation by the maximum current determined by the power management apparatus 11 or the success/failure of the registration/authentication. Particularly, the power-supply control unit 1273 performs power supply control for each power supply outlet 1271 even if there are a plurality of power supply outlets 1271. Thus, the number of the power supply outlets 1271 may be set to any number. Furthermore, the non-control-compliant appliance 126 is enabled to be included in the power management by the power management apparatus 11 by the function of the registration/authentication unit 1277. Furthermore, since the registration/authentication unit 1277 is configured to perform registration/authentication with each power supply outlet 1271 as a unit, the electric vehicle 124 or the control-compliant appliance 125 and the non-control-compliant appliance 126 can be simultaneously connected.

Additionally, the mode management unit 1278 and the environmental sensor 1279 are also provided in the outlet expansion apparatus 127. The mode management unit 1278 is means for managing the operation mode of the outlet expansion apparatus 127. Also, the environmental sensor 1279 is means for acquiring environmental information (appliance temperature, surrounding temperature, humidity, atmospheric pressure, and the like) at the installation location of the outlet expansion apparatus 127. Additionally, the environmental information is used for abnormality detection of the outlet expansion apparatus 127 or the like.

The type of the operation mode may be, for example, a standby mode, a normal mode, a cut-off mode, or an error mode. The standby mode is an operation mode where connection of an appliance or the like to the power supply outlet 1271 is waited for. The normal mode is an operation mode of a state where an appliance or the like is connected to the power supply outlet 1271. The cut-off mode is an operation mode defining an operation for a case where an appliance or the like is removed from the power supply outlet 1271. And the error mode is an operation mode defining an operation for a case of occurrence of an abnormality. The mode management unit 1278 sets the operation mode as appropriate, and notifies the power-supply control unit 1273 of the set operation mode.

In the foregoing, the functional configuration of the outlet expansion apparatus 127 has been described.

<3-2: Operation>

Next, an operation flow of the outlet expansion apparatus 127 will be described with reference to FIGS. 11 to 25. Here, the registration/authentication of an appliance or the like by the outlet expansion apparatus 127 and the operation of the outlet expansion apparatus 127 in each operation mode will be described in greater detail.

(3-2-1: Operation in Standby Mode)

Figure 11:
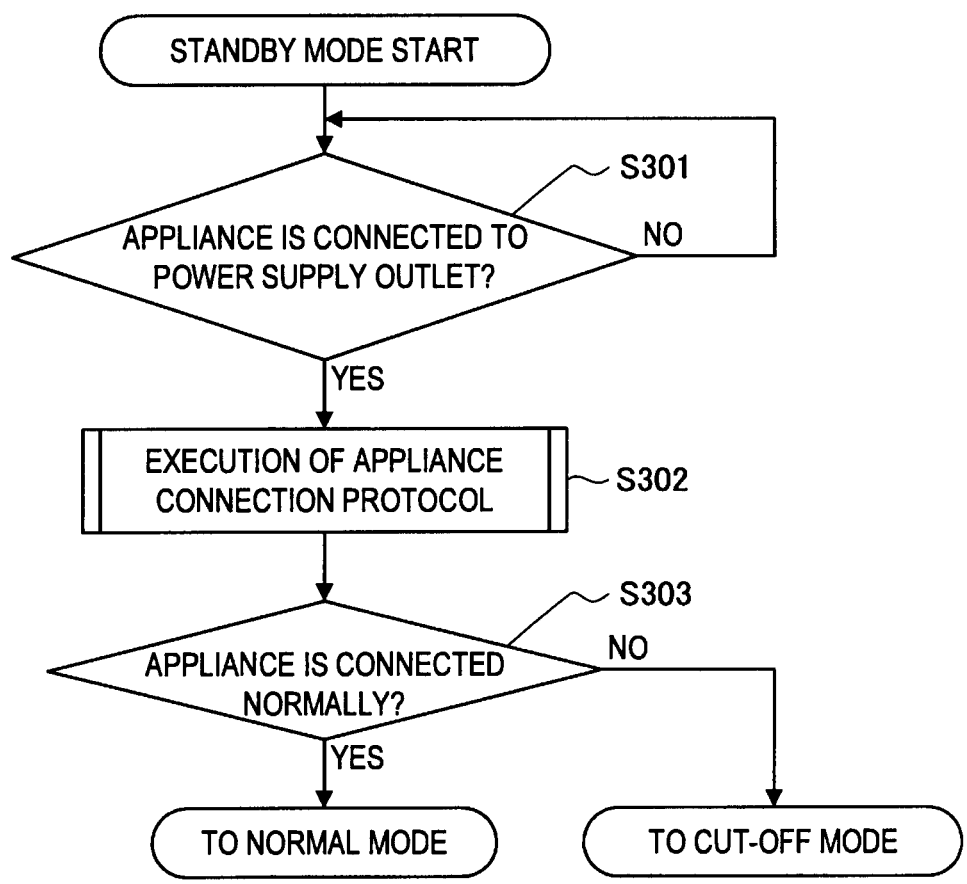
FIG. 11 is an explanatory diagram showing an operation flow in a standby mode.

First, an operation flow of the outlet expansion apparatus 127 in the standby mode will be described with reference to FIG. 11. FIG. 11 shows the operation flow of the outlet expansion apparatus 127 in the standby mode.

As shown in FIG. 11, when the operation in the standby mode is started, the outlet expansion apparatus 127 uses the functions of the plugging/unplugging sensor 1272, the power-supply control unit 1273, and the connection detection unit 1274 and decides whether the electric vehicle 124, the control-compliant appliance 125, or the non-control-compliant appliance 126 (hereinafter, appliance or the like) is connected to the power supply outlet 1271 or not (S301). In the case the appliance or the like is connected to the power supply outlet 1271, the outlet expansion apparatus 127 proceeds with the process to step S302. On the other hand, in the case the appliance or the like is not connected to the power supply outlet 1271, the outlet expansion apparatus 127 returns to the process of step S301.

In the case the process is proceeded to step S302, the outlet expansion apparatus 127 uses the functions of the registration/authentication unit 1277, and the mode management unit 1278 and performs an appliance connection protocol shown in FIGS. 17 to 25 (S302). This appliance connection protocol will be described later. Next, the outlet expansion apparatus 127 determines whether the appliance or the like connected to the power supply outlet 1271 is connected normally or not (S303). In the case the appliance or the like is connected normally, the outlet expansion apparatus 127 uses the function of the mode management unit 1278 and sets the operation mode to the normal mode. On the other hand, in the case the appliance or the like is not connected normally, the outlet expansion apparatus 127 uses the function of the mode management unit 1278 and sets the operation mode to the cut-off mode. Additionally, "normal" here means that registration/authentication has been successful.

(3-2-2: Operation in Normal Mode)

Figure 12:
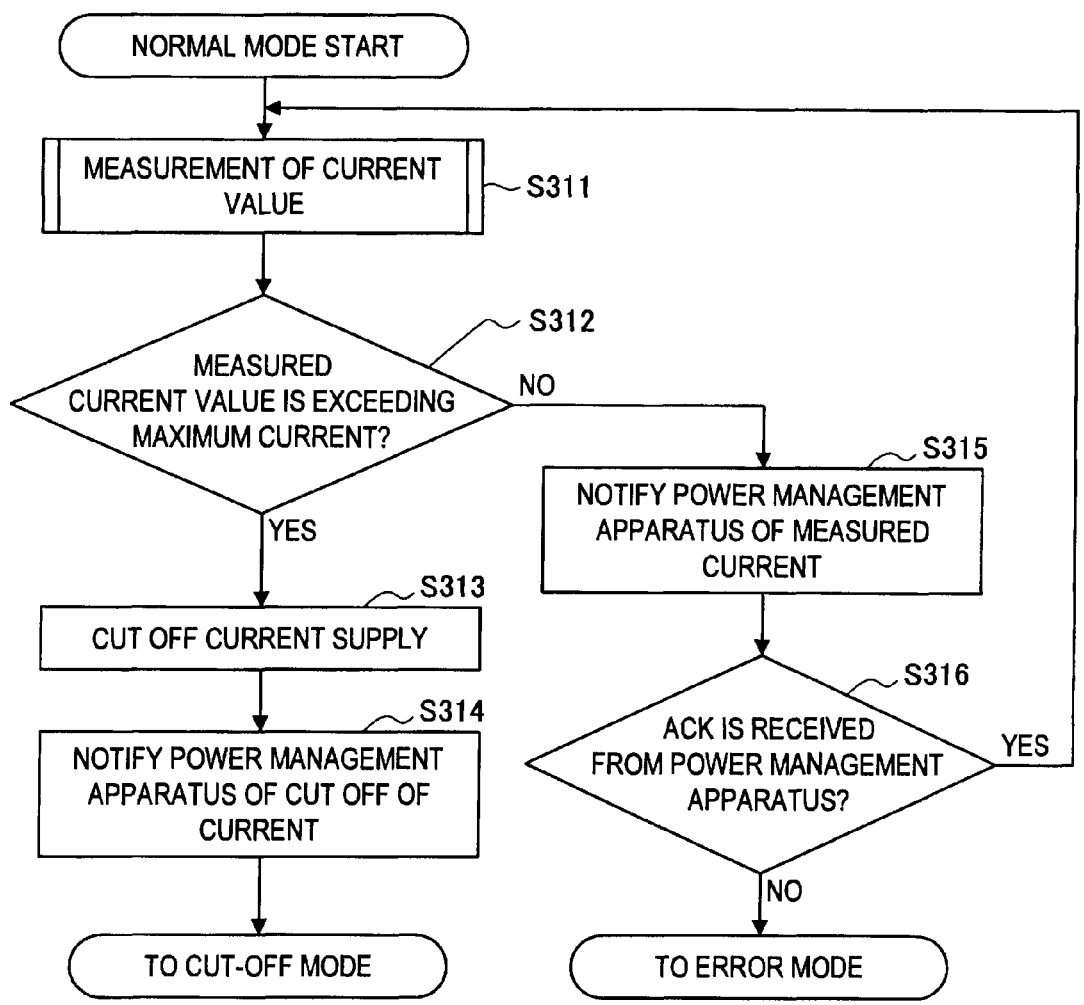
FIG. 12 is an explanatory diagram showing an operation flow in a normal mode.

Next, an operation flow of the outlet expansion apparatus 127 in the normal mode will be described with reference to FIG. 12. FIG. 12 shows the operation flow of the outlet expansion apparatus 127 in the normal mode.

As shown in FIG. 12, when the operation in the normal mode is started, the outlet expansion apparatus 127 uses the function of the power-supply control unit 1273, and supplies power to the power supply outlet 1271 and measures the current value (S311). Next, the outlet expansion apparatus 127 uses the function of the power-supply control unit 1273 and determines whether the measured current value is exceeding the maximum current set by the maximum current setting unit 1276 or not (S312). In the case the measured current value is exceeding the maximum current, the outlet expansion apparatus 127 proceeds with the process to step S313. On the other hand, in the case the measured current value is not exceeding the maximum current, the outlet expansion apparatus 127 proceeds with the process to step S315.

In the case the process is proceeded to step S313 in step S312, the outlet expansion apparatus 127 cuts off the power supply to the power supply outlet 1271 (S313). Then, the outlet expansion apparatus 127 uses the functions of the power-supply control unit 1273 and the local communication unit 1275 and notifies the power management apparatus 11 of the cut off of power supply (S314). Then, the outlet expansion apparatus 127 uses the function of the mode management unit 1278 and sets the operation mode to the cut-off mode.

On the other hand, in the case the process is proceeded to step S315 in step S312, the outlet expansion apparatus 127 uses the functions of the power-supply control unit 1273 and the local communication unit 1275 and notifies the power management apparatus 11 of the measured current value (S315). Then, the outlet expansion apparatus 127 uses the function of the local communication unit 1275 and determines whether an ACK (confirmation information indicating normal reception of the measured current) is received from the power management apparatus 11 or not (S316). In the case the ACK is received from the power management apparatus 11, the outlet expansion apparatus 127 returns the process to step S311. On the other hand, in the case the ACK is not received from the power management apparatus 11, the outlet expansion apparatus 127 uses the function of the mode management unit 1278 and sets the operation mode to the error mode.

(Modification)

Figure 13:
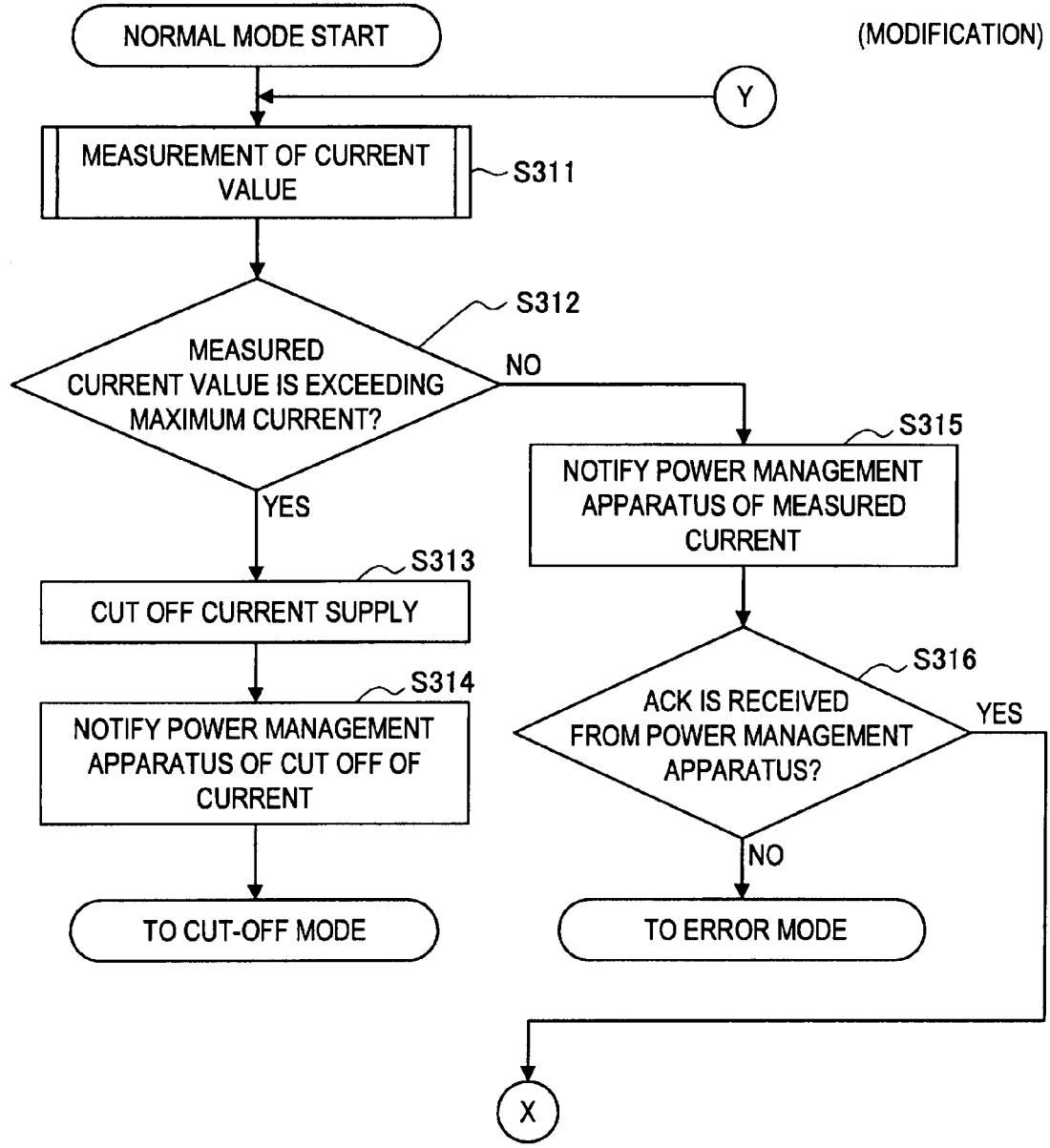
FIG. 13 is an explanatory diagram showing an operation flow in the normal mode.
Figure 14:
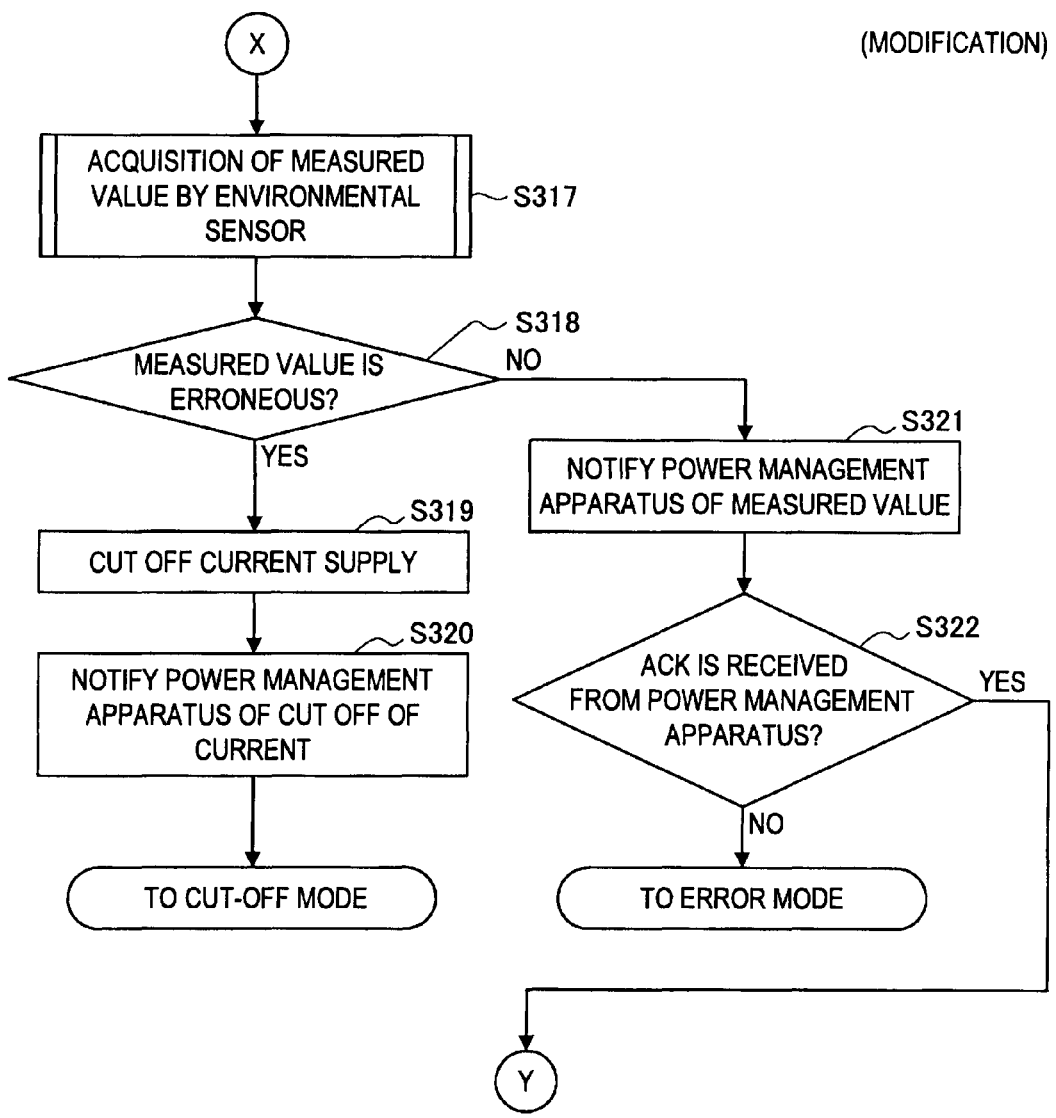
FIG. 14 is an explanatory diagram showing an operation flow in the normal mode.

Additionally, the operation flow in the normal mode can be modified to the operation flow as shown in FIGS. 13 and 14. In the following, the modification will be described.

As shown in FIG. 13, when the operation in the normal mode is started, the outlet expansion apparatus 127 uses the function of the power-supply control unit 1273, and supplies power to the power supply outlet 1271 and measures the current value (S311). Next, the outlet expansion apparatus 127 uses the function of the power-supply control unit 1273 and determines whether the measured current value is exceeding the maximum current set by the maximum current setting unit 1276 or not (S312). In the case the measured current value is exceeding the maximum current, the outlet expansion apparatus 127 proceeds with the process to step S313. On the other hand, in the case the measured current value is not exceeding the maximum current, the outlet expansion apparatus 127 proceeds with the process to step S315.

In the case the process is proceeded to step S313 in step S312, the outlet expansion apparatus 127 cuts off the power supply to the power supply outlet 1271 (S313). Then, the outlet expansion apparatus 127 uses the functions of the power-supply control unit 1273 and the local communication unit 1275 and notifies the power management apparatus 11 of the cut off of power supply (S314). Then, the outlet expansion apparatus 127 uses the function of the mode management unit 1278 and sets the operation mode to the cut-off mode.

On the other hand, in the case the process is proceeded to step S315 in step S312, the outlet expansion apparatus 127 uses the functions of the power-supply control unit 1273 and the local communication unit 1275 and notifies the power management apparatus 11 of the measured current value (S315). Then, the outlet expansion apparatus 127 uses the function of the local communication unit 1275 and determines whether the ACK (confirmation information indicating normal reception of the measured current) is received from the power management apparatus 11 or not (S316). In the case the ACK is received from the power management apparatus 11, the outlet expansion apparatus 127 proceeds with the process to step S317 (FIG. 14). On the other hand, in the case the ACK is not received from the power management apparatus 11, the outlet expansion apparatus 127 uses the function of the mode management unit 1278 and sets the operation mode to the error mode.

In the case the process is proceeded to step S317 (see FIG. 14) in step S316, the outlet expansion apparatus 127 acquires a measured value of the environmental information by the environmental sensor 1279 (S317). Next, the outlet expansion apparatus 127 determines whether the measured value acquired by the environmental sensor 1279 is erroneous or not (S318). For example, in the case the temperature (the measured value) is higher than a predetermined value, an "abnormality" is detected. In the case the measured value is erroneous, the outlet expansion apparatus 127 proceeds with the process to step S319. On the other hand, in the case the measured value is not erroneous, the outlet expansion apparatus 127 proceeds with the process to step S321.

In the case the process is proceeded to step S319 in step S318, the outlet expansion apparatus 127 cuts off the power supply to the power supply outlet 1271 (S319). Then, the outlet expansion apparatus 127 uses the functions of the power-supply control unit 1273 and the local communication unit 1275 and notifies the power management apparatus 11 of the cut off of power supply (S320). Then, the outlet expansion apparatus 127 uses the function of the mode management unit 1278 and sets the operation mode to the cut-off mode.

On the other hand, in the case the process is proceeded to step S321 in step S318, the outlet expansion apparatus 127 uses the functions of the power-supply control unit 1273 and the local communication unit 1275 and notifies the power management apparatus 11 of the measured value (S321). Then, the outlet expansion apparatus 127 uses the function of the local communication unit 1275 and determines whether the ACK (confirmation information indicating normal reception of the measured amount) is received from the power management apparatus 11 or not (S322). In the case the ACK is received from the power management apparatus 11, the outlet expansion apparatus 127 returns the process to step S311 (FIG. 13). On the other hand, in the case the ACK is not received from the power management apparatus 11, the outlet expansion apparatus 127 uses the function of the mode management unit 1278 and sets the operation mode to the error mode.

(3-2-3: Operation in Cut-Off Mode)

Figure 15:
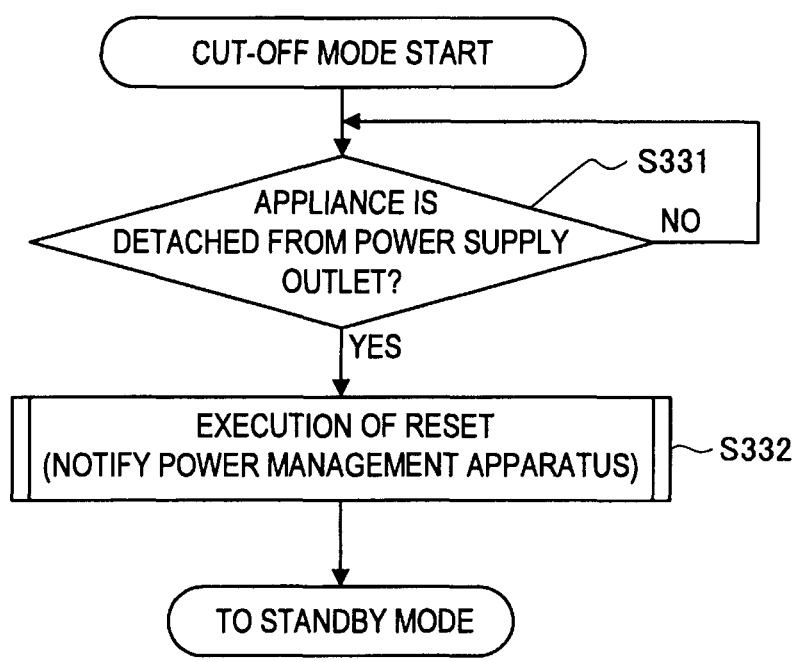
FIG. 15 is an explanatory diagram showing an operation flow in a cut-off mode.

Next, an operation flow of the outlet expansion apparatus 127 in the cut-off mode will be described with reference to FIG. 15. FIG. 15 shows the operation flow of the outlet expansion apparatus 127 in the cut-off mode.

As shown in FIG. 15, when the operation in the cut-off mode is started, the outlet expansion apparatus 127 uses the function of the connection detection unit 1274 and determines whether the appliance or the like has been removed from the power supply outlet 1271 or not (S331). In the case the appliance or the like has been removed from the power supply outlet 1271, the outlet expansion apparatus 127 proceeds with the process to step S332. On the other hand, in the case the appliance or the like has not been removed from the power supply outlet 1271, the outlet expansion apparatus 127 returns the process to step S331. In the case the process is proceeded to step S332, the outlet expansion apparatus 127 resets connection state of the appliance or the like and information on the connection state and notifies the power management apparatus 11 of the reset via the local communication unit 1275 (S332). Then, the outlet expansion apparatus 127 uses the function of the mode management unit 1278 and sets the operation mode to the standby mode.

(3-2-4: Operation in Error Mode)

Figure 16:
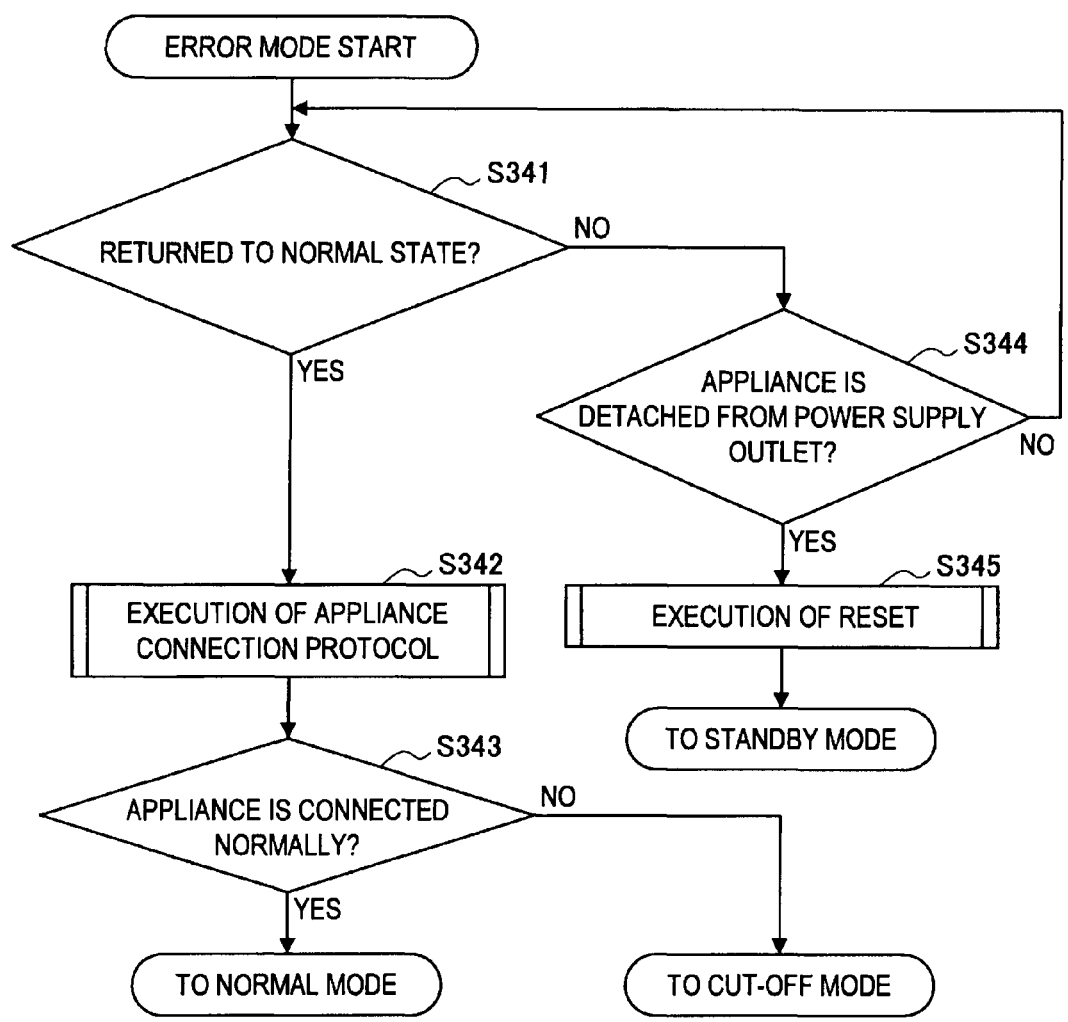
FIG. 16 is an explanatory diagram showing an operation flow in an error mode.

Next, an operation flow of the outlet expansion apparatus 127 in the error mode will be described with reference to FIG. 16. FIG. 16 shows the operation flow of the outlet expansion apparatus 127 in the error mode.

As shown in FIG. 16, when the operation in the error mode is started, the outlet expansion apparatus 127 determines whether the power management apparatus 11 (and structural elements used for the communication) has returned to a normal state or not (S341). This determination is performed based on a result obtained by authentication retried by the registration/authentication unit 1277, for example. In the case the power management apparatus 11 and the like have returned to the normal state, the outlet expansion apparatus 127 proceeds with the process to step S342. On the other hand, in the case the power management apparatus 11 and the like have not returned to the normal state, the outlet expansion apparatus 127 proceeds with the process to step S344.

In the case the process is proceeded to step S342 in step S341, the outlet expansion apparatus 127 uses the functions of the registration/authentication unit 1277 and the mode management unit 1278 and performs the appliance connection protocol shown in FIGS. 17 to 25 (S342). Next, the outlet expansion apparatus 127 determines whether the appliance or the like connected to the power supply outlet 1271 is connected normally or not (S343). In the case the appliance or the like is connected normally, the outlet expansion apparatus 127 uses the function of the mode management unit 1278 and sets the operation mode to the normal mode. On the other hand, in the case the appliance or the like is not connected normally, the outlet expansion apparatus 127 uses the function of the mode management unit 1278 and sets the operation mode to the cut-off mode.

In the case the process is proceeded to step S344 in step S341, the outlet expansion apparatus 127 uses the function of the connection detection unit 1274 and determines whether the appliance or the like has been removed from the power supply outlet 1271 or not (S344). In the case the appliance or the like has been removed from the power supply outlet 1271, the outlet expansion apparatus 127 proceeds with the process to step S345. On the other hand, in the case the appliance or the like has not been removed from the power supply outlet 1271, the outlet expansion apparatus 127 returns the process to step S341. In the case the process is proceeded to step S345, the outlet expansion apparatus 127 resets connection state of the appliance or the like and information on the connection state and notifies the power management apparatus 11 of the reset via the local communication unit 1275 (S345). Then, the outlet expansion apparatus 127 uses the function of the mode management unit 1278 and sets the operation mode to the standby mode.

(3-2-5: Operation of Registration/Authentication)

Next, the appliance connection protocol regarding registration/authentication relating to the following three cases will be described with reference to FIGS. 17 to 25.

Figure 17:
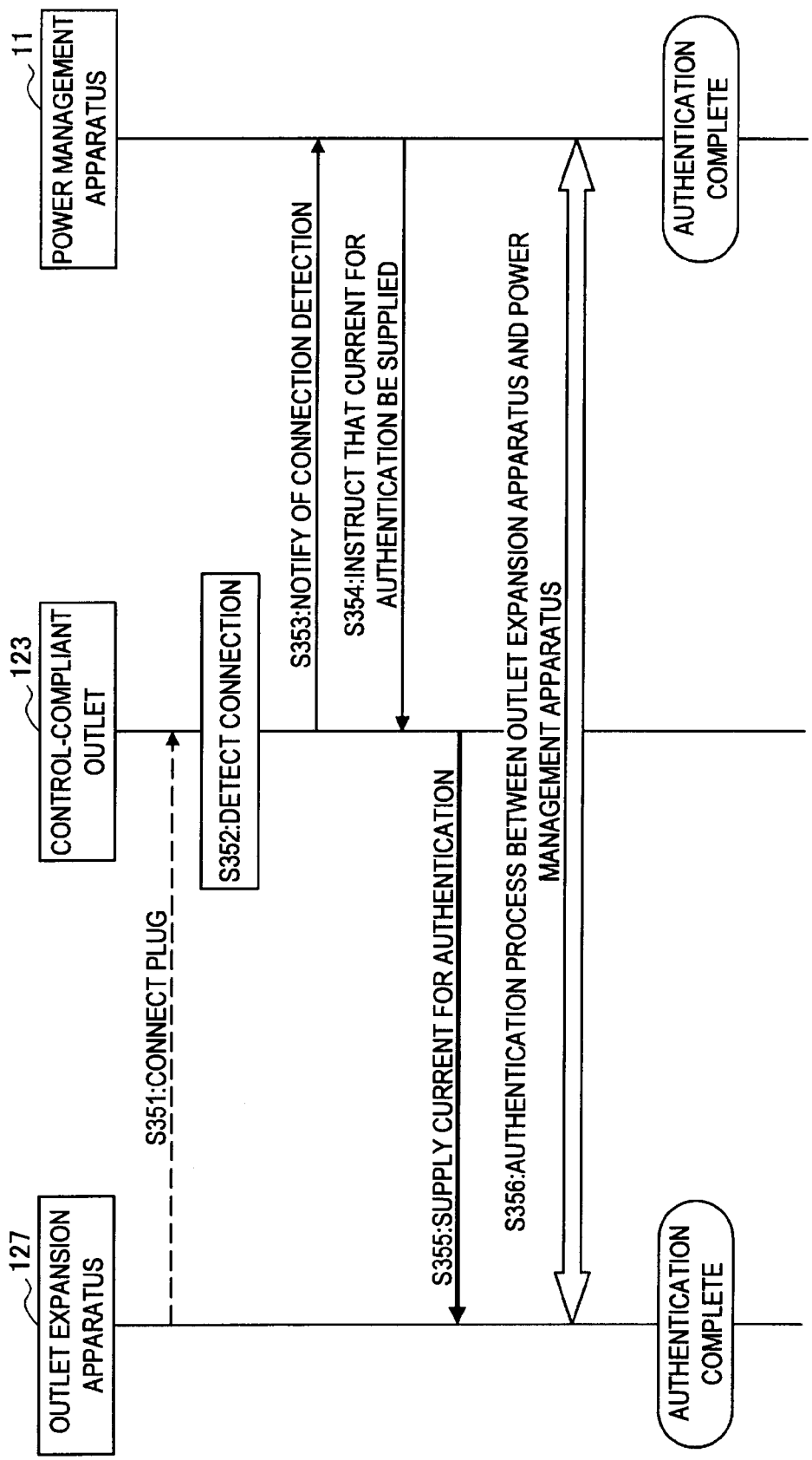
FIG. 17 is an explanatory diagram showing an operation flow relating to authentication of an outlet expansion apparatus.
Figure 18:
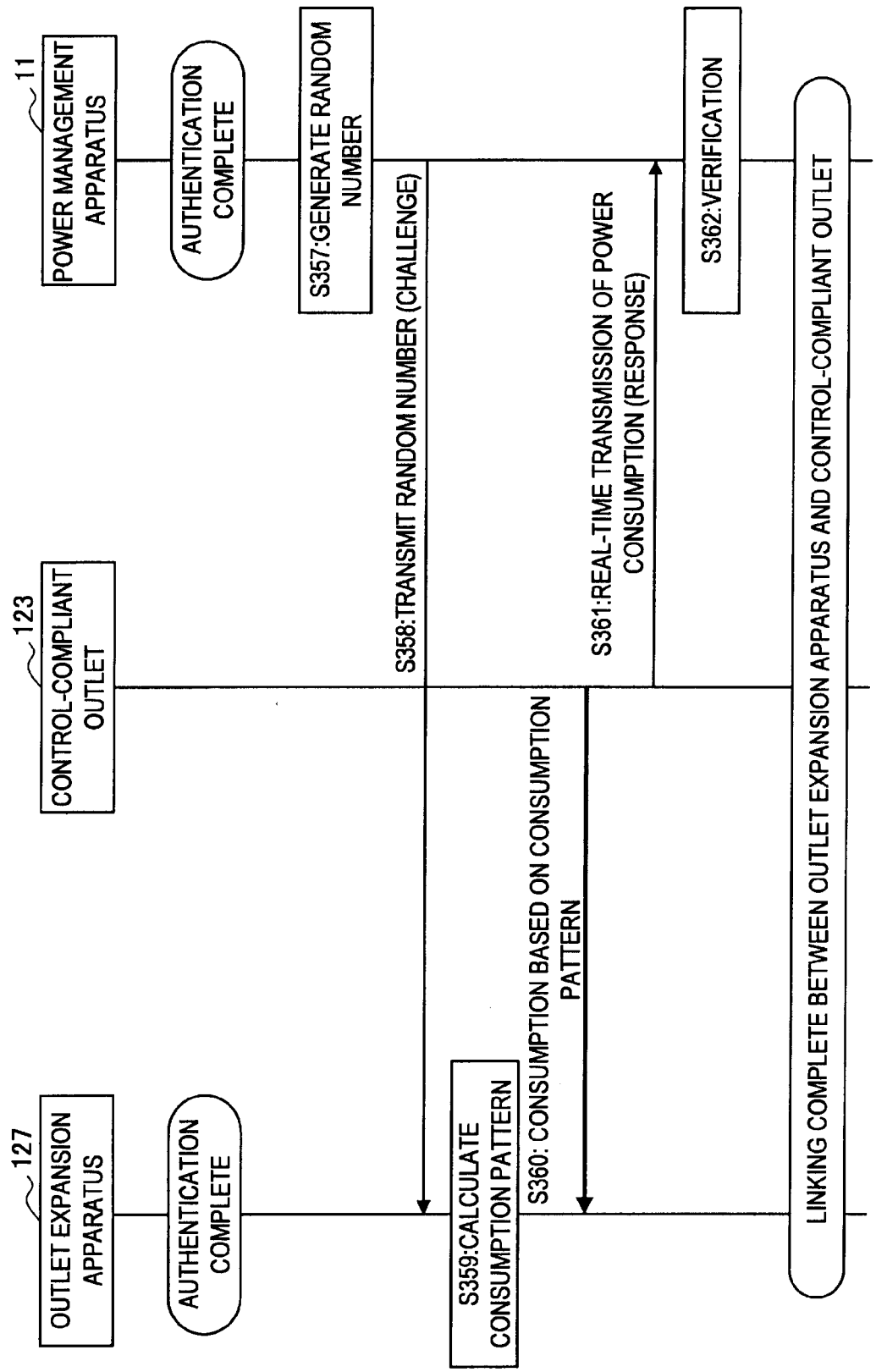
FIG. 18 is an explanatory diagram showing an operation flow relating to authentication of the outlet expansion apparatus.
Figure 19:
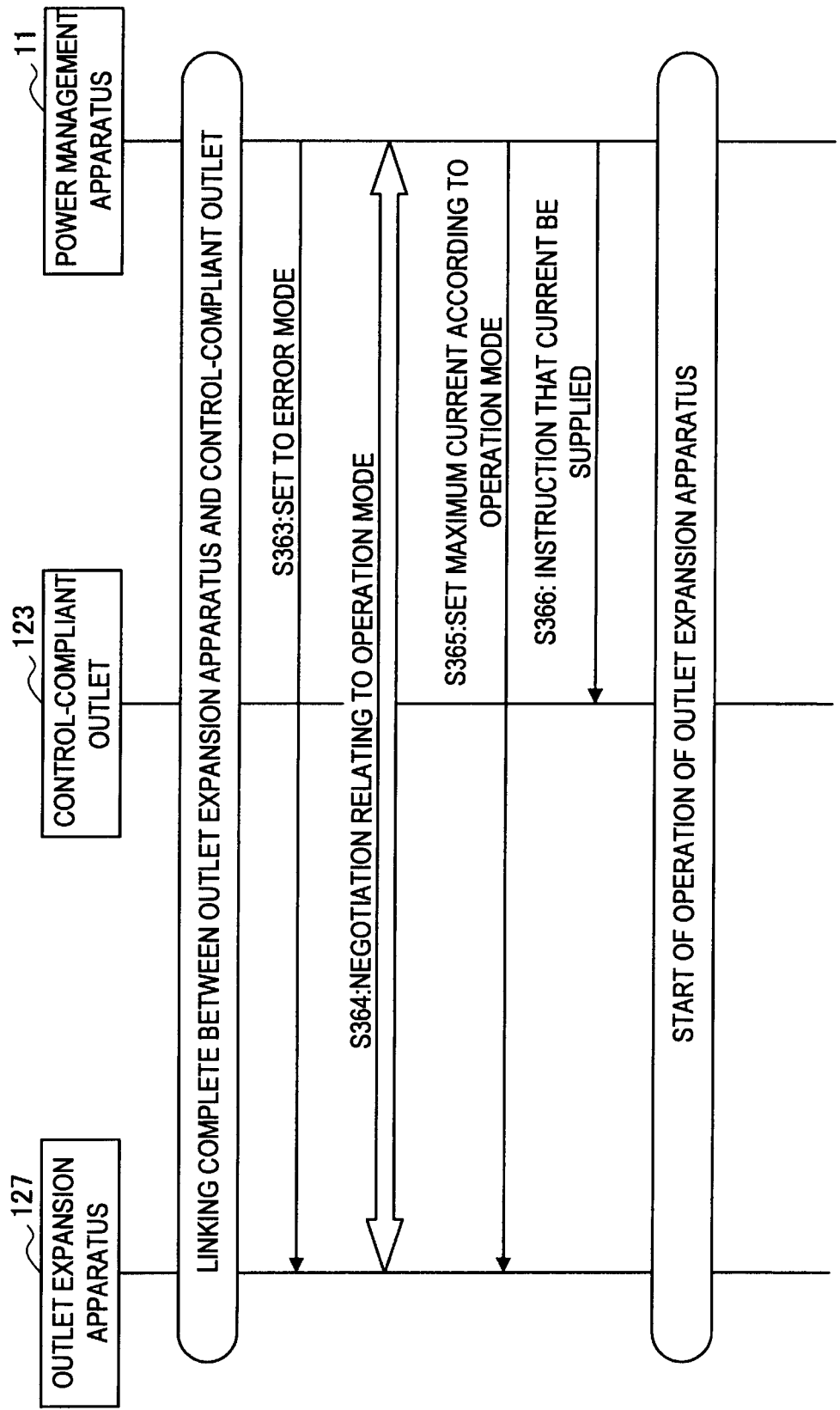
FIG. 19 is an explanatory diagram showing an operation flow relating to authentication of the outlet expansion apparatus.
Figure 20:
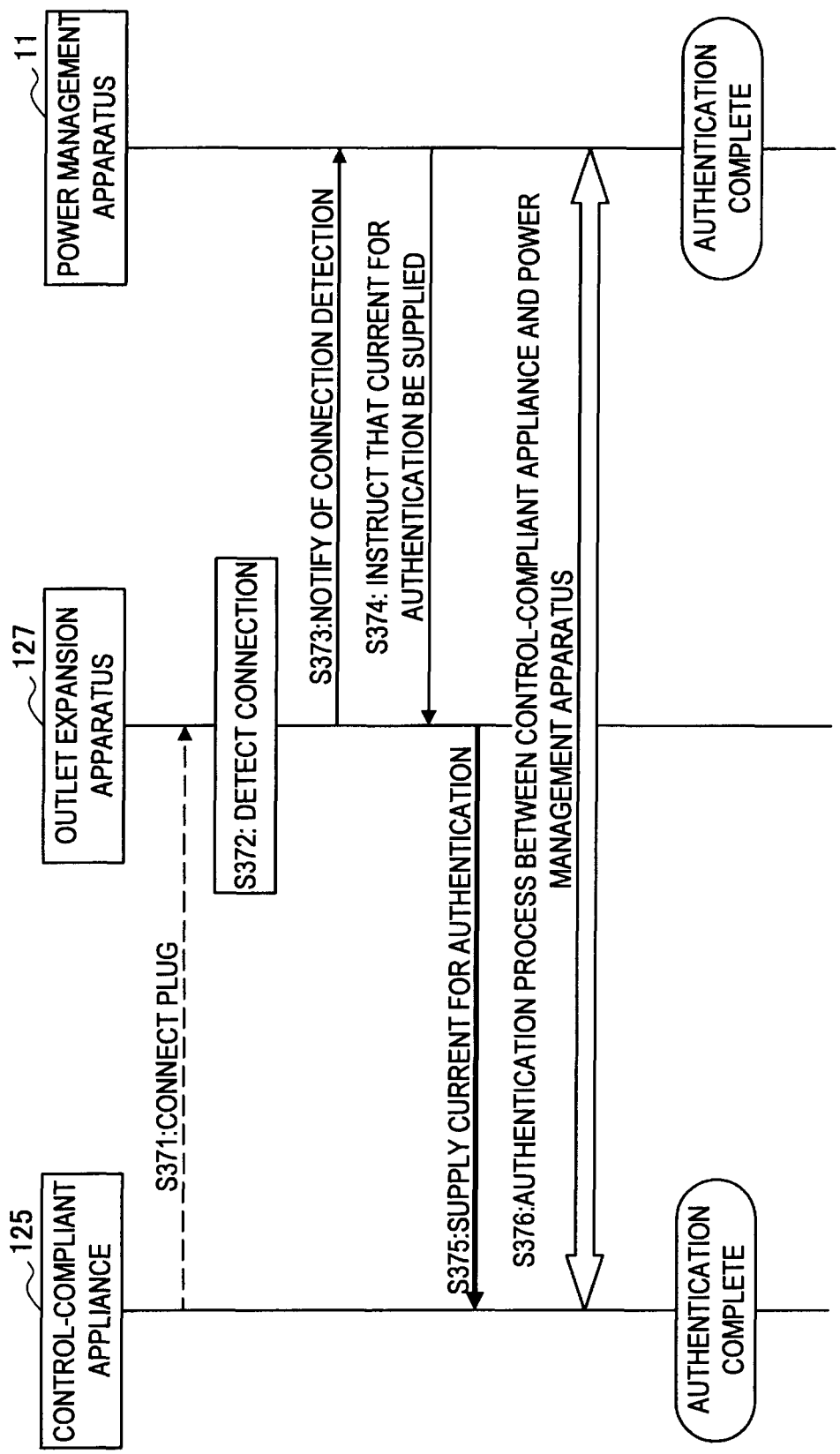
FIG. 20 is an explanatory diagram showing an operation flow relating to authentication of a control-compliant appliance.
Figure 21:
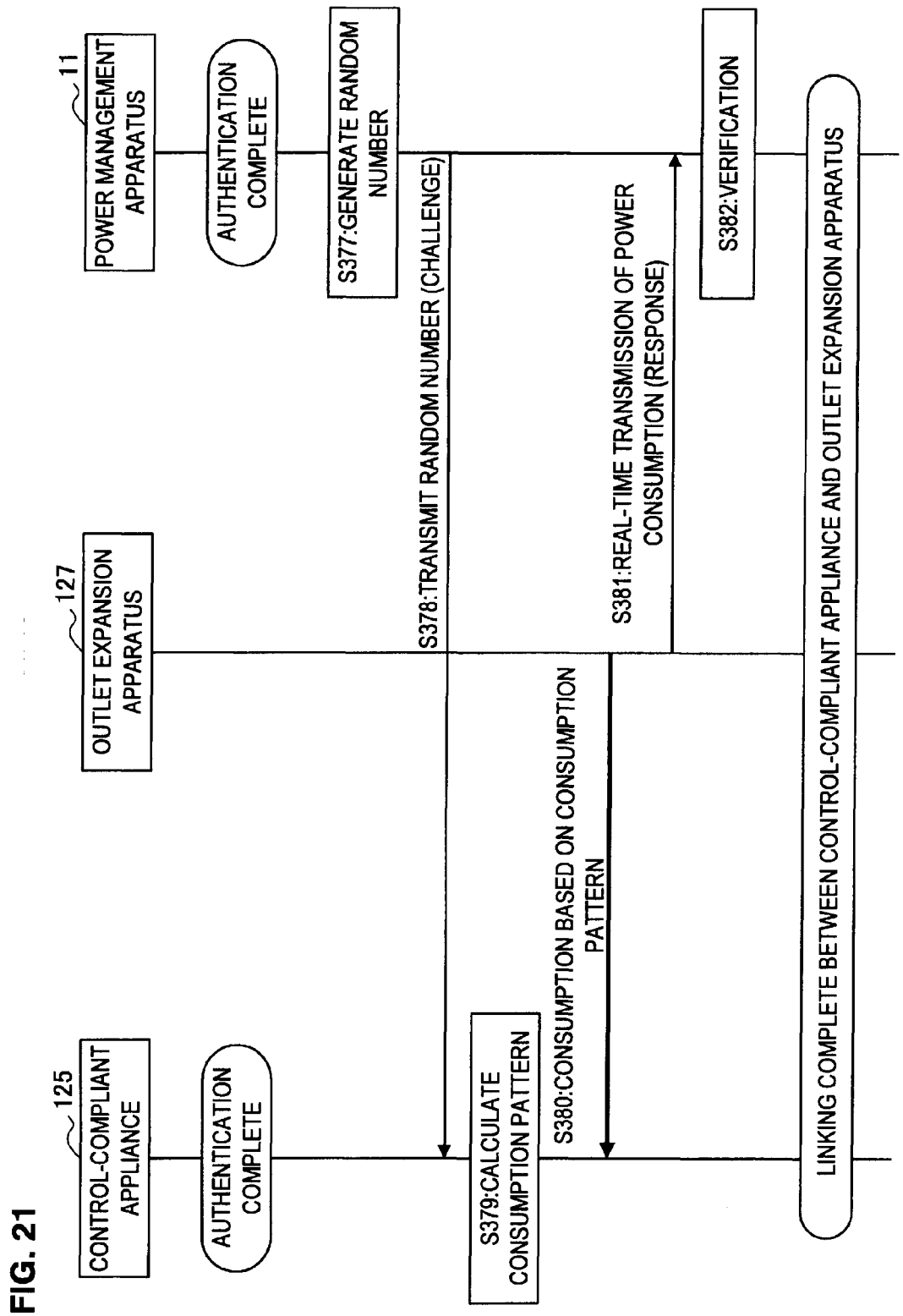
FIG. 21 is an explanatory diagram showing an operation flow relating to authentication of the control-compliant appliance.
Figure 22:
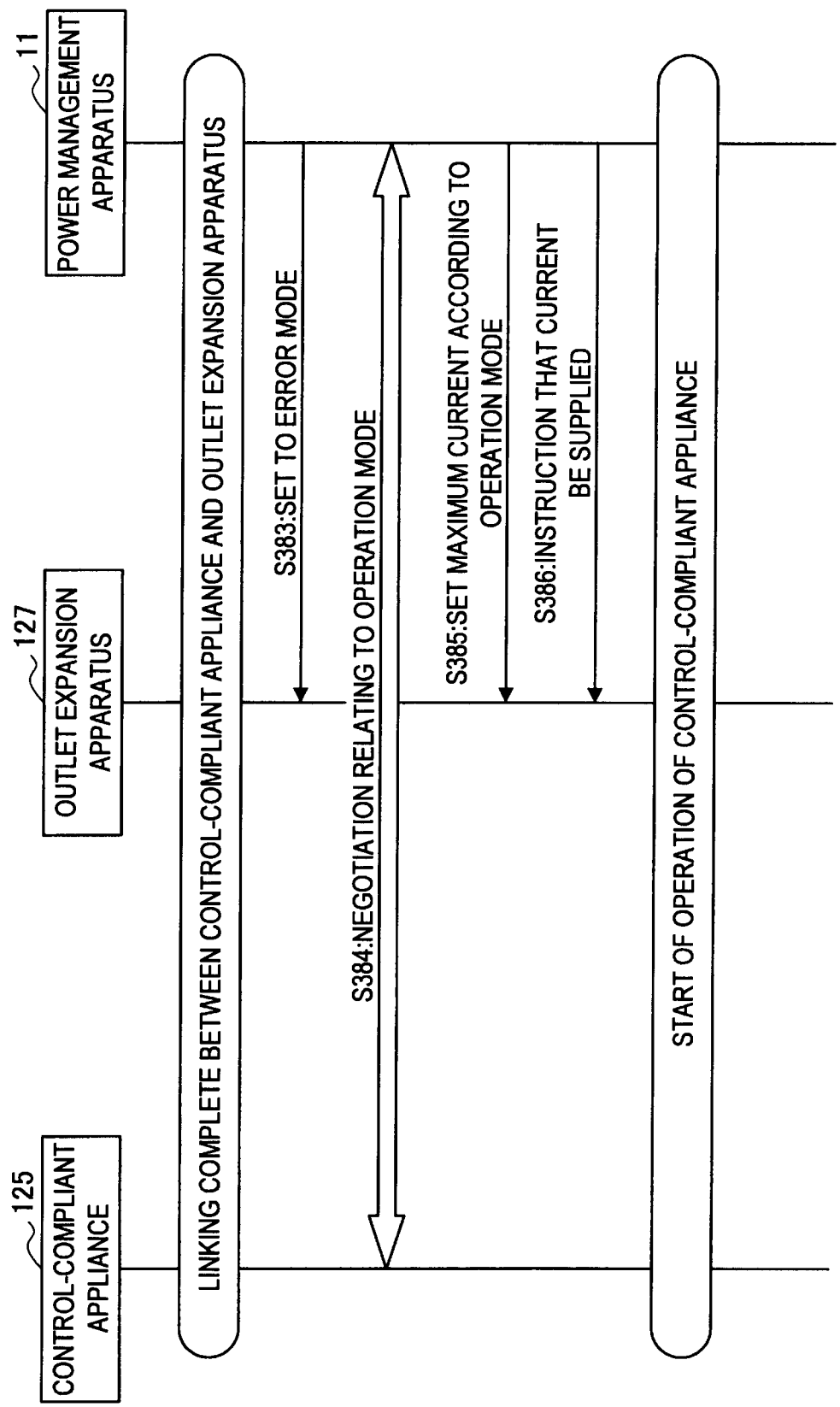
FIG. 22 is an explanatory diagram showing an operation flow relating to authentication of the control-compliant appliance.
Figure 23:
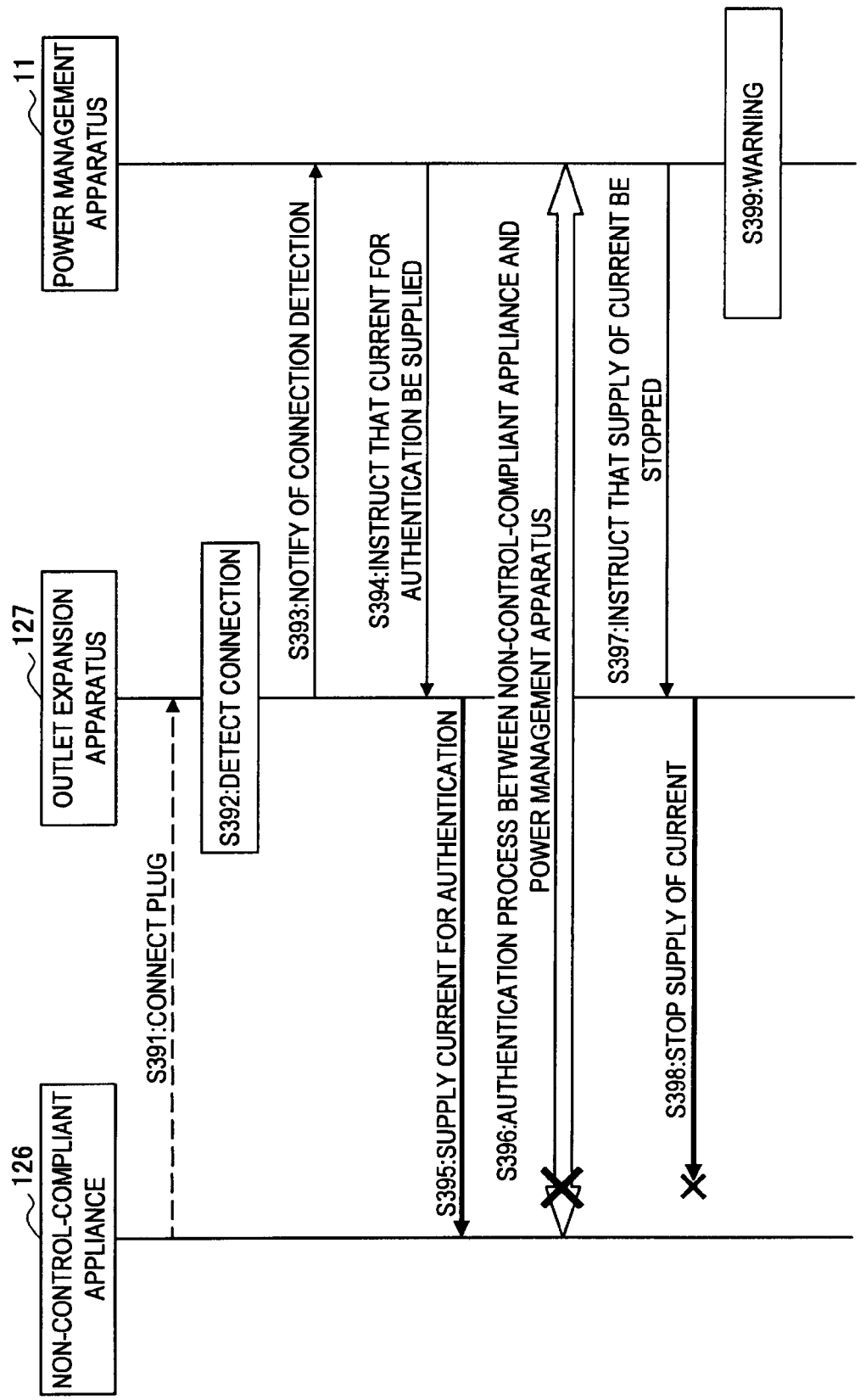
FIG. 23 is an explanatory diagram showing an operation flow relating to delegate authentication of a non-control-compliant appliance.
Figure 24:
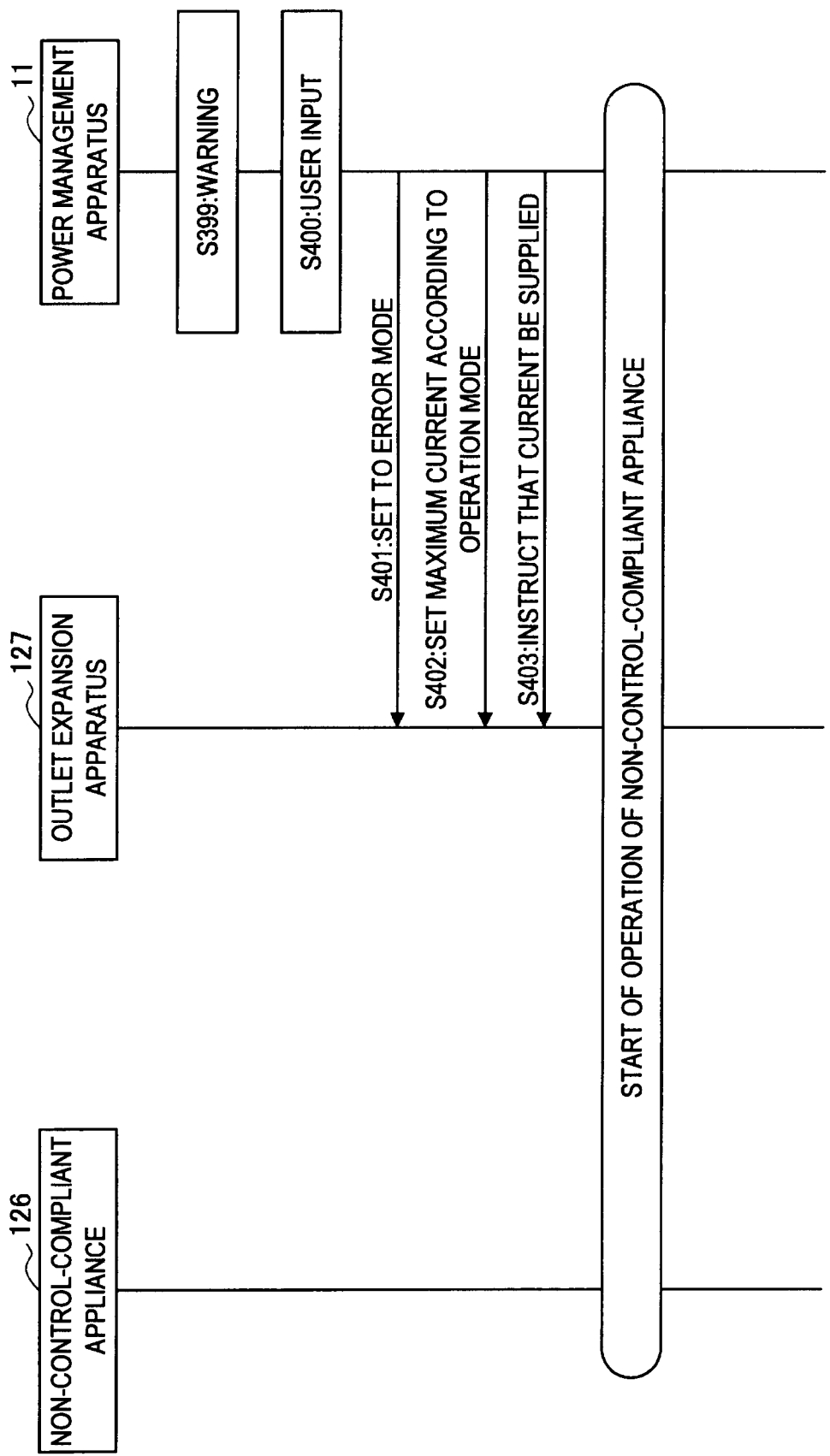
FIG. 24 is an explanatory diagram showing an operation flow relating to delegate authentication of the non-control-compliant appliance.
Figure 25:
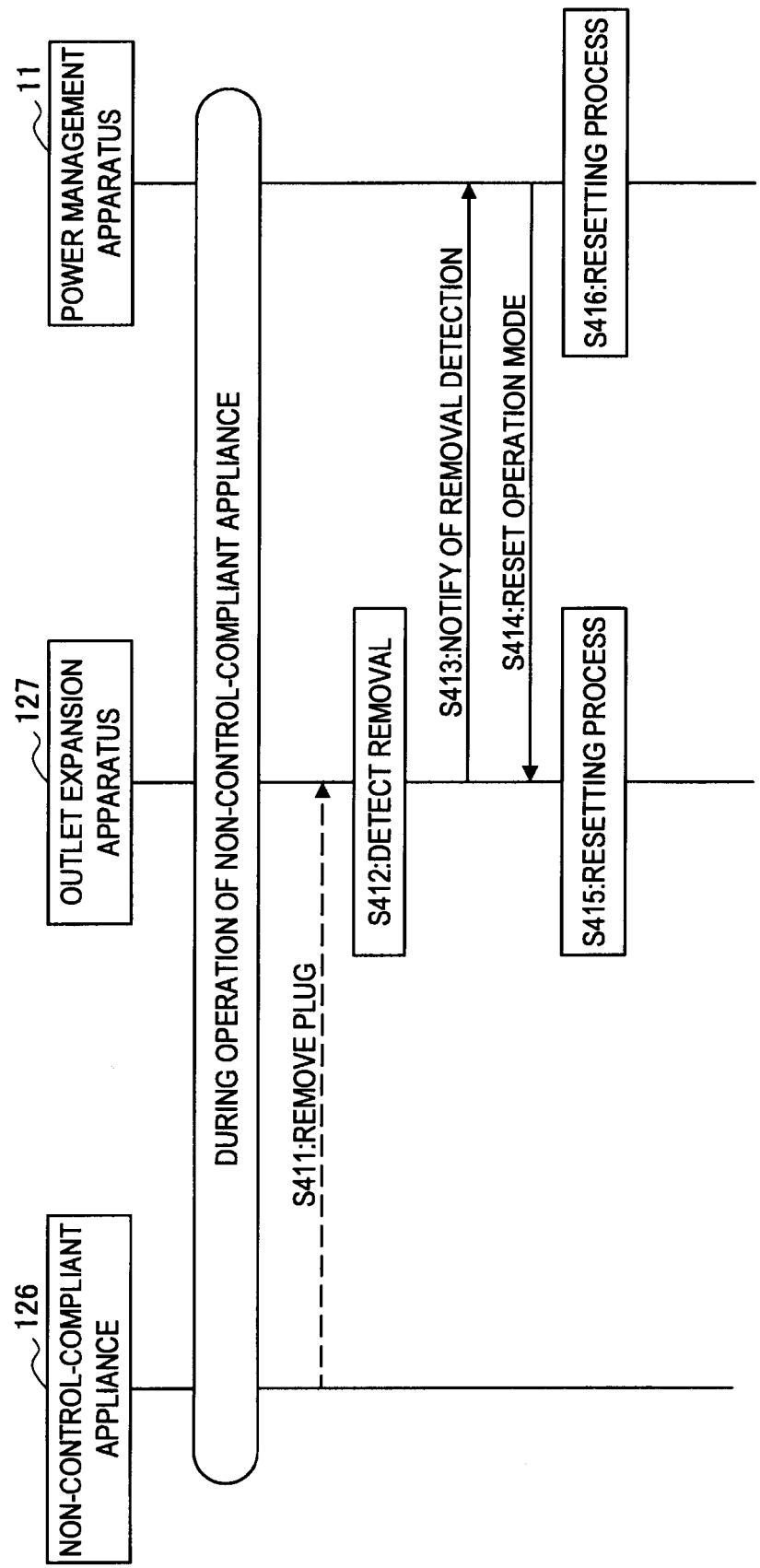
FIG. 25 is an explanatory diagram showing an operation flow relating to delegate authentication of the non-control-compliant appliance.

(Case 1) FIGS. 17 to 19 show the appliance connection protocol for a case where the outlet expansion apparatus 127 is connected to the control-compliant outlet 123 and registration/authentication is performed between the outlet expansion apparatus 127 and the power management apparatus 11. (Case 2) FIGS. 20 to 22 show the appliance connection protocol for a case where the control-compliant appliance 125 is connected to the outlet expansion apparatus 127 and registration/authentication is performed between the control-compliant appliance 125 and the power management apparatus 11. (Case 3) FIGS. 23 to 25 show the appliance connection protocol for a case where the non-control-compliant appliance 126 is connected to the outlet expansion apparatus 127 and registration/authentication is performed between the outlet expansion apparatus 127 and the power management apparatus 11.

(Case 1)

First, the appliance connection protocol according to Case 1 mentioned above will be described with reference to FIGS. 17 to 19.

As shown in FIG. 17, when the outlet expansion apparatus 127 is connected to the control-compliant outlet 123 (S351), the control-compliant outlet 123 detects connection of the outlet expansion apparatus 127 (S352). When the connection is detected, the control-compliant outlet 123 notifies the power management apparatus 11 to the effect that connection of the outlet expansion apparatus 127 is detected (S353). The power management apparatus 11 that received this notification instructs the control-compliant outlet 123 to supply current to be used for registration/authentication to the outlet expansion apparatus 127 (S354). The control-compliant outlet 123 that received the instruction to supply current supplies power for authentication to the outlet expansion apparatus 127 (S355). When the power for authentication is supplied to the outlet expansion apparatus 127, an authentication process is carried out between the outlet expansion apparatus 127 and the power management apparatus 11 (S356).

When the authentication process is completed in step S356, the process proceeds to the step of FIG. 18 (linking process). As shown in FIG. 18, first, the power management apparatus 11 uses the function of the appliance management unit 1121 and generates a random number (S357). Next, the power management apparatus 11 transmits the random number generated in step S357 to the outlet expansion apparatus 127 (S358). The outlet expansion apparatus 127 that received the random number transmitted from the power management apparatus 11 calculates a power consumption pattern based on the received random number (S359). Then, the outlet expansion apparatus 127 performs a power consumption operation based on the calculated consumption pattern (S360).

When power is consumed by the outlet expansion apparatus 127, a time-series pattern of power consumption corresponding to the consumption pattern is detected by the control-compliant outlet 123, and the detection result is transmitted from the control-compliant outlet 123 to the power management apparatus 11 (S361). The power management apparatus 11 that received this detection result uses the function of the information analyzing unit 1123 and verifies whether or not the received detection result and the random number generated in step S357 match (S362). In the case the verification is positive, the power management apparatus 11 uses the function of the appliance management unit 1121 and links the outlet expansion apparatus 127 and the control-compliant outlet 123. For example, the appliance management unit 1121 records, in the storage unit 113, the appliance ID of the outlet expansion apparatus 127 and the appliance ID of the control-compliant outlet 123 in association with each other.

When the linking of the outlet expansion apparatus 127 and the control-compliant outlet 123 is completed in this manner, the process proceeds to the step of FIG. 19 (setting of operation mode and maximum current, and the like). As shown in FIG. 19, first, the power management apparatus 11 uses the function of the appliance management unit 1121 and instructs the outlet expansion apparatus 127 to set the error mode (S363). The outlet expansion apparatus 127 starts the operation in the error mode shown in FIG. 16. Next, the outlet expansion apparatus 127 and the power management apparatus 11 carry out exchange of information relating to an operation mode (for example, a full power mode, a power saving mode, or the like) of the appliance or the like (S364). Then, the outlet expansion apparatus 127 and the power management apparatus 11 decide the operation mode of the appliance or the like.

When the operation mode of the appliance or the like is decided, the power management apparatus 11 uses the function of the appliance management unit 1121 and sets in the outlet expansion apparatus 127 a maximum current according to the operation mode of the appliance or the like (S365). At this point, the outlet expansion apparatus 127 uses the function of the maximum current setting unit 1276 and sets, in the power-supply control unit 1273, the maximum current decided with the power management apparatus 11. When setting of the maximum current is complete, the power management apparatus 11 uses the function of the control unit 115 and instructs the control-compliant outlet 123 to supply power to the outlet expansion apparatus 127 (S366). Then, power is supplied from the control-compliant outlet 123 to the outlet expansion apparatus 127 and power control of the appliance or the like is started by the outlet expansion apparatus 127.

(Case 2)

Next, the appliance connection protocol according to Case 2 mentioned above will be described with reference to FIGS. 20 to 22.

As shown in FIG. 20, when the control-compliant appliance 125 is connected to the outlet expansion apparatus 127 (S371), the outlet expansion apparatus 127 detects connection of the control-compliant appliance 125 (S372). When the connection is detected, the outlet expansion apparatus 127 notifies the power management apparatus 11 to the effect that connection of the control-compliant appliance 125 is detected (S373). The power management apparatus 11 that received this notification instructs the outlet expansion apparatus 127 to supply current to be used for registration/authentication to the control-compliant appliance 125 (S374). The outlet expansion apparatus 127 that received the instruction to supply current supplies power for authentication to the control-compliant appliance 125 (S375). When the power for authentication is supplied to the control-compliant appliance 125, an authentication process is performed between the control-compliant appliance 125 and the power management apparatus 11 (S376).

When the authentication process is completed in step S376, the process proceeds to the step of FIG. 21 (linking process). As shown in FIG. 21, first, the power management apparatus 11 uses the function of the appliance management unit 1121 and generates a random number (S377). Next, the power management apparatus 11 transmits the random number generated in step S377 to the control-compliant appliance 125 (S378). The control-compliant appliance 125 that received the random number transmitted from the power management apparatus 11 calculates a power consumption pattern based on the received random number (S379). Then, the control-compliant appliance 125 performs a power consumption operation based on the calculated consumption pattern (S380).

When power is consumed by the control-compliant appliance 125, a time-series pattern of power consumption corresponding to the consumption pattern is detected by the outlet expansion apparatus 127, and the detection result is transmitted from the outlet expansion apparatus 127 to the power management apparatus 11 (S381). The power management apparatus 11 that received this detection result uses the function of the information analyzing unit 1123 and verifies whether or not the received detection result and the random number generated in step S377 match (S382). In the case the verification is positive, the power management apparatus 11 uses the function of the appliance management unit 1121 and links the control-compliant appliance 125 and the outlet expansion apparatus 127. For example, the appliance management unit 1121 records, in the storage unit 113, the appliance ID of the control-compliant appliance 125 and the appliance ID of the outlet expansion apparatus 127 in association with each other.

When the linking of the control-compliant appliance 125 and the outlet expansion apparatus 127 is completed in this manner, the process proceeds to the step of FIG. 22 (setting of operation mode and maximum current, and the like). As shown in FIG. 22, first, the power management apparatus 11 uses the function of the appliance management unit 1121 and instructs the outlet expansion apparatus 127 to set the error mode (S383). The outlet expansion apparatus 127 starts the operation in the error mode shown in FIG. 16. Next, the control-compliant appliance 125 and the power management apparatus 11 carry out exchange of information relating to an operation mode (for example, a full power mode, a power saving mode, or the like) of the appliance or the like (S384). Then, the control-compliant appliance 125 and the power management apparatus 11 decide the operation mode of the appliance or the like.

When the operation mode of the appliance or the like is decided, the power management apparatus 11 uses the function of the appliance management unit 1121 and sets in the outlet expansion apparatus 127 a maximum current according to the operation mode of the appliance or the like (S385). At this point, the outlet expansion apparatus 127 uses the function of the maximum current setting unit 1276 and sets, in the power-supply control unit 1273, the maximum current decided with the power management apparatus 11. When the setting of the maximum current is complete, the power management apparatus 11 uses the function of the control unit 115 and instructs the outlet expansion apparatus 127 to supply power to the control-compliant appliance 125 (S386). Then, power is supplied from the outlet expansion apparatus 127 to the control-compliant appliance 125 and power control of the control-compliant appliance 125 is started by the outlet expansion apparatus 127.

(Case 3)

Next, the appliance connection protocol according to Case 3 mentioned above will be described with reference to FIGS. 23 to 25.

As shown in FIG. 23, when the non-control-compliant appliance 126 is connected to the outlet expansion apparatus 127 (S391), the outlet expansion apparatus 127 detects connection of the non-control-compliant appliance 126 (S392). When the connection is detected, the outlet expansion apparatus 127 notifies the power management apparatus 11 to the effect that connection of the non-control-compliant appliance 126 is detected (S393). The power management apparatus 11 that received this notification instructs the outlet expansion apparatus 127 to supply current to be used for registration/authentication to the non-control-compliant appliance 126 (S394). The outlet expansion apparatus 127 that received the instruction to supply current supplies power for authentication to the non-control-compliant appliance 126 (S395). When the power for authentication is supplied to the non-control-compliant appliance 126, the power management apparatus 11 attempts an authentication process (S396). However, since the non-control-compliant appliance 126 does not possess an authentication function, the authentication in step S396 will fail.

When the authentication fails, the power management apparatus 11 instructs the outlet expansion apparatus 127 to stop power supply to the non-control-compliant appliance 126 (S397). The outlet expansion apparatus 127 that received this instruction stops power supply to the non-control-compliant appliance 126 (S398). Next, the power management apparatus 11 notifies a warning or the like to a user (S399). For example, the warning or the like is displayed on the display unit 116.

After the warning or the like is displayed, the process proceeds to the step of FIG. 24 (delegate authentication). As shown in FIG. 24, first, after displaying the warning or the like, the power management apparatus 11 requests a user to input information indicating whether or not the non-control-compliant appliance 126 will be used, the appliance information or the operation mode of the non-control-compliant appliance 126, the user information, or the like (S400). When the user input is complete, the power management apparatus 11 uses the function of the appliance management unit 1121 and instructs the outlet expansion apparatus 127 to set the error mode (S401).

Next, the power management apparatus 11 uses the function of the appliance management unit 1121 and sets in the outlet expansion apparatus 127 a maximum current according to the operation mode of the non-control-compliant appliance 126 (S402). At this point, the outlet expansion apparatus 127 uses the function of the maximum current setting unit 1276 and sets, in the power-supply control unit 1273, the maximum current decided by the power management apparatus 11. When the setting of the maximum current is complete, the power management apparatus 11 uses the function of the control unit 115 and instructs the outlet expansion apparatus 127 to supply power to the non-control-compliant appliance 126 (S403). Then, power is supplied from the outlet expansion apparatus 127 to the non-control-compliant appliance 126 and operation of the non-control-compliant appliance 126 is started.

Also, when the non-control-compliant appliance 126 is removed from the outlet expansion apparatus 127, the process proceeds to the step of FIG. 25 (resetting process). As shown in FIG. 25, when the non-control-compliant appliance 126 is detached from the outlet expansion apparatus 127 (S411), the outlet expansion apparatus 127 uses the function of the connection detection unit 1274 and detects detachment of the non-control-compliant appliance 126 (S412). Then, the outlet expansion apparatus 127 notifies the power management apparatus 11 to the effect that the non-control-compliant appliance 126 has been detached (S413). The power management apparatus 11 that received this notification resets the operation mode of the outlet expansion apparatus 127 (sets a predetermined operation mode) (S414). Then, the outlet expansion apparatus 127 and the power management apparatus 11 respectively perform a resetting process (S415, S416).

In the foregoing, the configuration and the operation of the outlet expansion apparatus 127 have been described. Here, the registration/authentication process for enabling use of the non-control-compliant appliance 126 or increasing the number of connected appliances and the like by using the outlet expansion apparatus 127 has been described.

4: Authentication/Registration of Appliance 1 (FIGS. 26 to 32)

Next, a process of authentication/registration of the control-compliant appliance 125 or the like by the power management apparatus 11 will be described with reference to FIGS. 26 to 32. The process of authentication/registration described below is for reliably detecting unauthorized modification of an appliance or the like or connection of an unauthorized appliance or the like. This process of authentication/registration is performed by using mainly structural elements of the power management apparatus 11 shown in FIG. 26 and structural elements of the control-compliant appliance 125 shown in FIG. 27.

<4-1: Functional Configuration of Information Management Unit 112>

Figure 26:
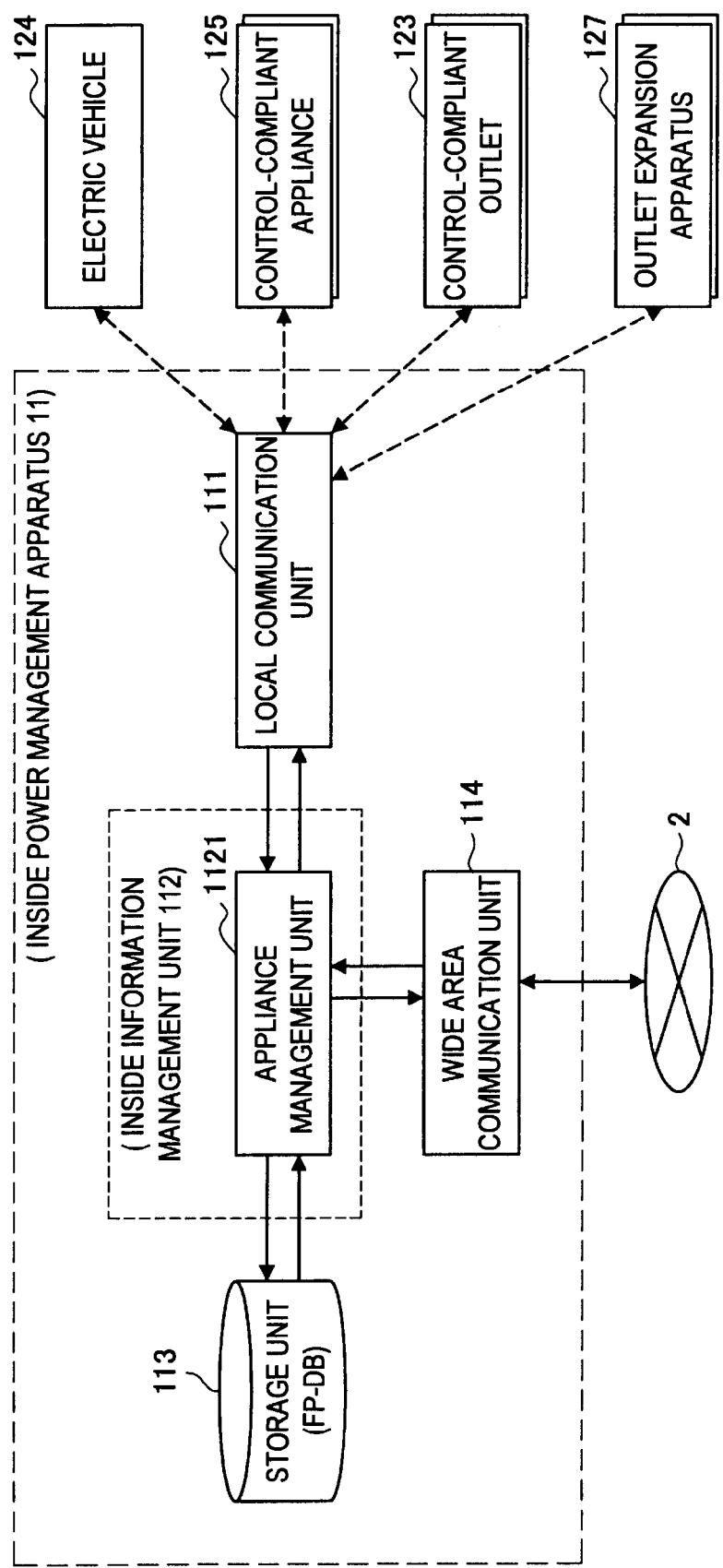
FIG. 26 is an explanatory diagram showing a detailed functional configuration of the information management unit.

First, a functional configuration of the information management unit 112 relating to registration/authentication described here will be briefly described with reference to FIG. 26. As has been described, the information management unit 112 includes the appliance management unit 1121. The appliance management unit 1121 is means for controlling the operation of the control-compliant outlet 123, the electric vehicle 124, the control-compliant appliance 125, the outlet expansion apparatus 127, or the like (hereinafter, appliance or the like). Thus, the appliance management unit 1121 can exchange information with the appliance or the like via the local communication unit 111. Also, the appliance management unit 1121 can exchange information, via the wide area communication unit 114, with a system, a server, or the like, connected to the wide area network 2. Furthermore, the appliance management unit 1121 can record information in the storage unit 113, or read information recorded in the storage unit 113. The process of authentication/registration described here is carried out mainly by using the function of this appliance management unit 1121.

<4-2: Functional Configuration of Control-Compliant Appliance 125 or the Like>

Next, a functional configuration of the control-compliant appliance 125 relating to registration/authentication described here will be briefly described with reference to FIG. 27. Only the control-compliant appliance 125 will be illustrated here for the sake of explanation, but by applying the same configuration to the control-compliant outlet 123, the electric vehicle 124, and the outlet expansion apparatus 127, the same registration/authentication process can be realized.

Figure 27:
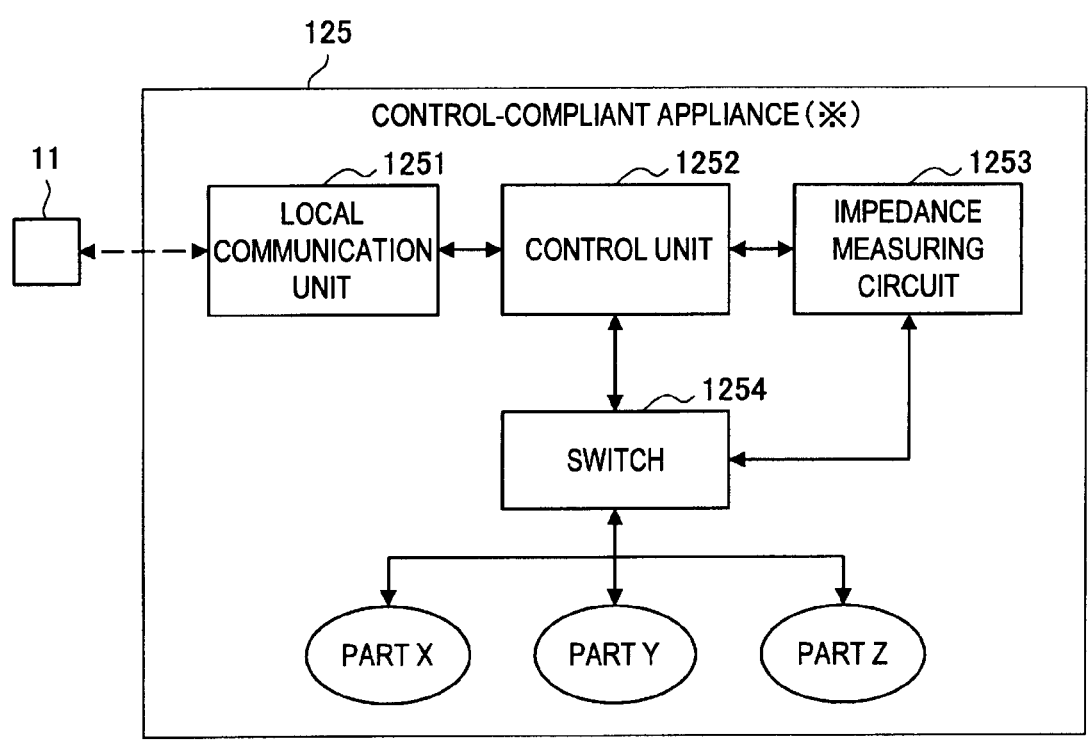
Figure 28:
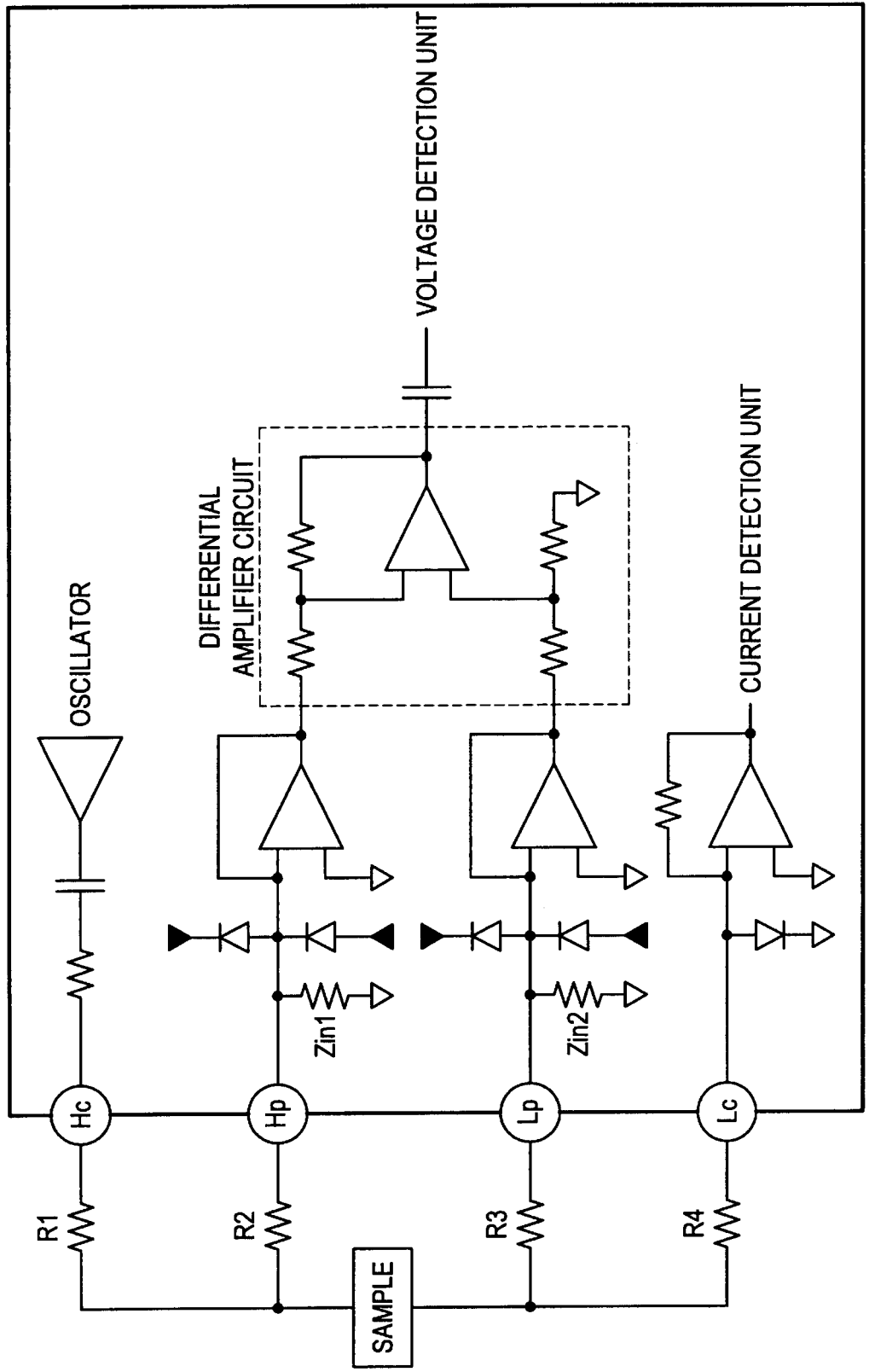
FIG. 28 is an explanatory diagram showing an example circuit configuration of an impedance measuring circuit.

As shown in FIG. 27, the control-compliant appliance 125 includes a local communication unit 1251, a control unit 1252, an impedance measuring circuit 1253, a switch 1254, and a plurality of electrical parts (part X, part Y, part Z).

The local communication unit 1251 is communication means for exchanging information via the communication network in the local power management system 1. Also, the control unit 1252 is control means for controlling operation of each structural element included in the control-compliant appliance 125. Furthermore, the impedance measuring circuit 1253 is a circuit for measuring impedance of the part X, the part Y, or the part Z (see FIG. 28, for example). Additionally, in the case the part X, the part Y, or the part Z is a semiconductor circuit or the like, a transistor measurement circuit for measuring transistor characteristics of the semiconductor circuit may be embedded instead of or together with the impedance measuring circuit 1253. The switch 1254 is a switch for switching an electrical part whose impedance is to be measured by the impedance measuring circuit 1253.

Accuracies of electrical parts used by the control-compliant appliance 125 or the like are varied by a few percent for individual pieces. Therefore, if electrical characteristics of the electrical parts can be detected with sufficient accuracy, individual pieces can be identified. In the case of a semiconductor circuit, individual pieces vary with respect to the transistor characteristics. Therefore, if the transistor characteristics of semiconductor circuits can be detected with sufficient accuracy, individual semiconductor circuits can be identified. Of course, variation in individual pieces naturally occurring at the time of manufacture may be used, but it is also possible to uniquely vary each individual piece. Also, in the case the control-compliant appliance 125 is provided with a secondary cell, a parameter relating to charging control thereof or the like can also be used as information for identifying the piece.

The control-compliant appliance 125 shown in FIG. 27 has a function of detecting the variation in the impedance characteristics of the electrical parts. This function is realized by the control unit 1252 and the impedance measuring circuit 1253. Also, the control-compliant appliance 125 has a function of switching objects whose impedance characteristics are to be measured, by using the switch 1254. Therefore, the impedance characteristics of an electrical part selected from a plurality of parts based on an arbitrary or predetermined rule can be measured. Additionally, control of the switch 1254 is performed by the control unit 1252. Control of measurement timing, a measurement time, or the like, of the impedance characteristics by the impedance measuring circuit 1253 is also performed by the control unit 1252.

<4-3: Operation at the Time of Authentication/Registration>

Based on the explanation of the configurations of the information management unit 112 and the control-compliant appliance 125, the operations of the information management unit 112 and the control-compliant appliance 125 performed at the time of authentication/registration will be described with reference to FIGS. 29 to 32. Additionally, the control-compliant appliance 125 is taken as an example of the appliance or the like, but the same authentication/registration operation also applies to the control-compliant outlet 123, the electric vehicle 124, or the outlet expansion apparatus 127.

(Operation in the Case of Non-Registration)

First, the operations of the information management unit 112 and the control-compliant appliance 125 in the case where the control-compliant appliance 125 is non-registered will be described with reference to FIG. 29.

Figure 29:
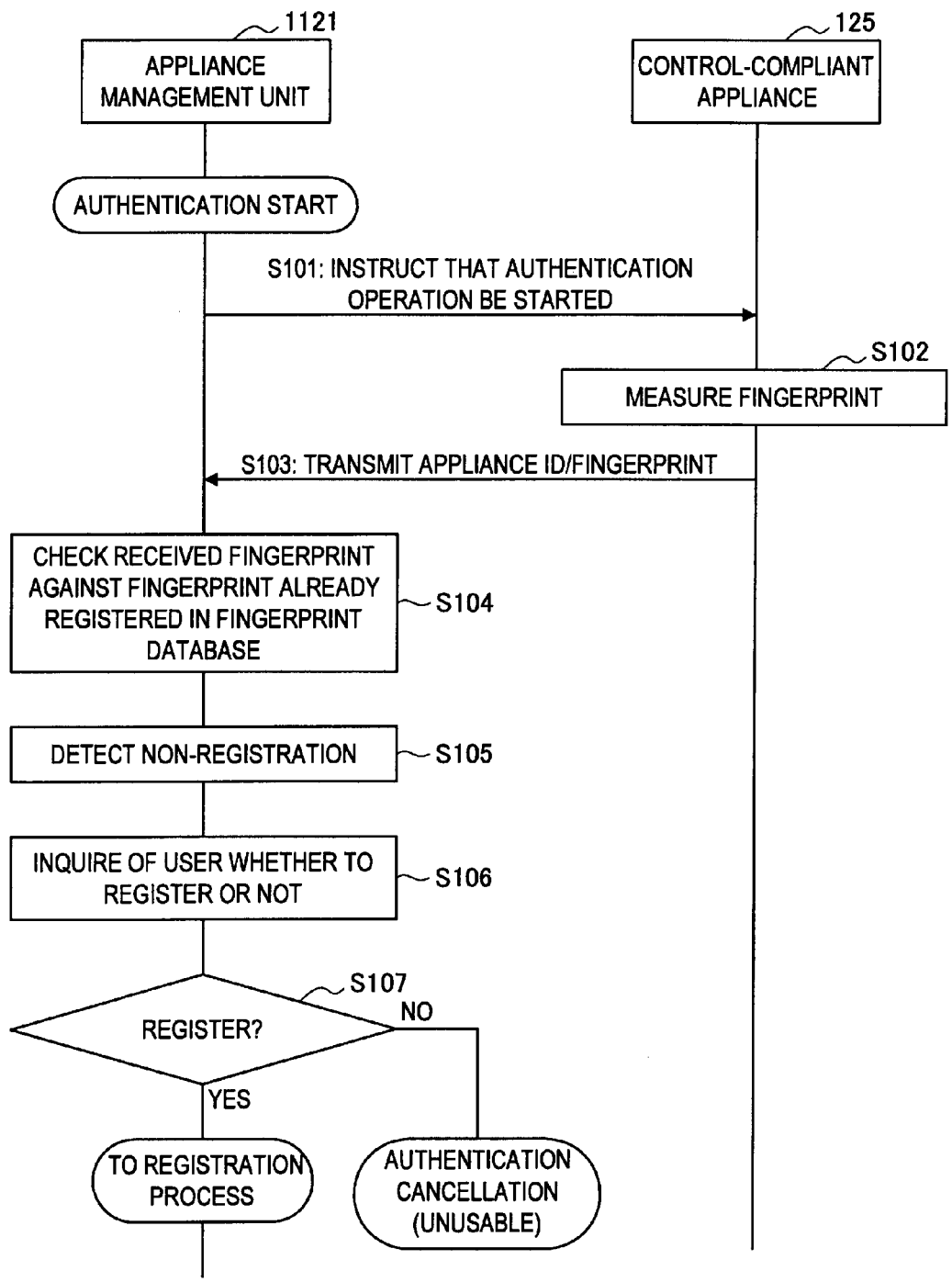
FIG. 29 is an explanatory diagram showing an operation flow relating to registration of the control-compliant appliance.

As shown in FIG. 29, when the operation of authentication/registration is started, the appliance management unit 1121 instructs the control-compliant appliance 125 to start an authentication operation (S101). The control-compliant appliance 125 that received this instruction measures a fingerprint (S102). In the case of the control-compliant appliance 125 illustrated in FIG. 27, the impedance characteristics of a predetermined electrical part are measured by the impedance measuring circuit 1253.

When the fingerprint is measured, the control-compliant appliance 125 transmits the appliance ID of itself and the measured fingerprint to the appliance management unit 1121 (S103). The appliance management unit 1121 that received the appliance ID and the fingerprint checks the received fingerprint against a fingerprint registered in a fingerprint database configured in the storage unit 113 (S104). Incidentally, in the example of FIG. 29, the control-compliant appliance 125 is non-registered, and thus the fingerprint of this control-compliant appliance 125 is not registered in the fingerprint database.

Accordingly, the state of the control-compliant appliance 125 being non-registered is detected by the appliance management unit 1121 (S105). When non-registration is detected, the appliance management unit 1121 inquires of a user whether or not to register this control-compliant appliance 125 (S106, S107). In the case the user gives an instruction that it is to be registered, the appliance management unit 1121 proceeds with the process to a registration process for the control-compliant appliance 125. On the other hand, in the case the user gives an instruction that it is not to be registered, the appliance management unit 1121 cancels the authentication process and places the control-compliant appliance 125 in an unusable state.

(Operation at the Time of Registration)

Next, a registration process by the appliance management unit 1121 carried out at the time of registering the control-compliant appliance 125 will be described with reference to FIG. 30.

Figure 30:
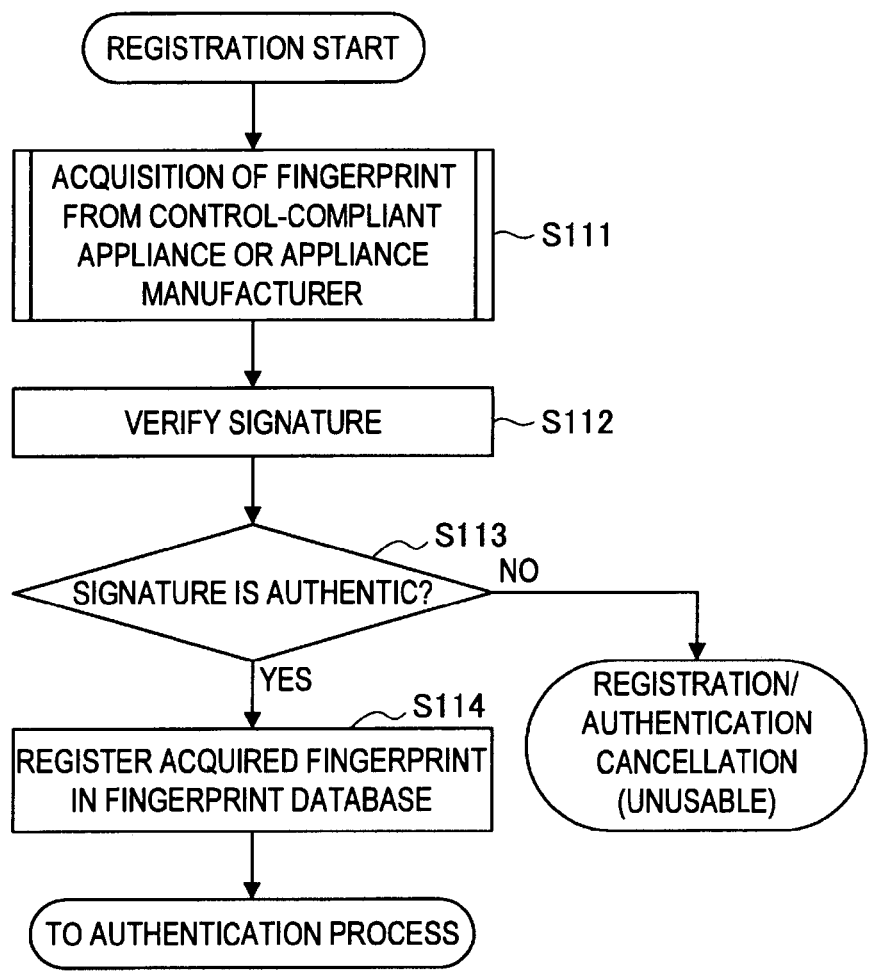
FIG. 30 is an explanatory diagram showing an operation flow relating to registration of the control-compliant appliance.

As shown in FIG. 30, first, the appliance management unit 1121 acquires a fingerprint from the control-compliant appliance 125 to be registered, or acquires a fingerprint that the control-compliant appliance 125 to be registered possesses by making an inquiry to the manufacturer server 36 (S111). At this point, a digital signature is attached and transmitted with the fingerprint to enable detection of tampering of the fingerprint in the communication channel. Accordingly, after acquiring the fingerprint, the appliance management unit 1121 verifies the digital signature acquired together with the fingerprint (S112).

In the case the digital signature is authentic, the appliance management unit 1121 proceeds with the process to step S114. On the other hand, in the case the digital signature is not authentic, the appliance management unit 1121 cancels the processes relating to registration and authentication of the control-compliant appliance 125 and places the control-compliant appliance 125 in an unusable state. In the case the process proceeds to step S114, the appliance management unit 1121 registers the acquired fingerprint in the fingerprint database (S114). For example, the appliance management unit 1121 registers the fingerprint in the fingerprint database in association with the appliance ID of the control-compliant appliance 125. When the fingerprint is registered, the appliance management unit 1121 proceeds with the process to the authentication process.

Figure 31:
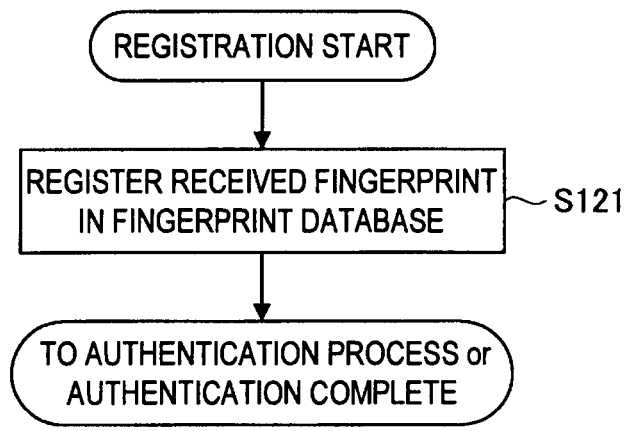
FIG. 31 is an explanatory diagram showing an operation flow relating to registration of the control-compliant appliance.

Additionally, in the case of acquiring the fingerprint from the control-compliant appliance 125 to be registered, the operation of the appliance management unit 1121 at the time of registering the control-compliant appliance 125 may be modified to a simplified operation as shown in FIG. 31. In the case of the operation illustrated in FIG. 31, if the appliance ID and the fingerprint transmitted from the control-compliant appliance 125 are already received in step S103 described above, the appliance management unit 1121 registers the fingerprint acquired at that time in the fingerprint database (S121), and proceeds with the process to the authentication process or completes the authentication. In this manner, the authentication may be assumed to be completed at the time the registration is complete.

(Operation at the Time of Authentication)

Next, operations of the information management unit 112 and control-compliant appliance 125 carried out at the time of authentication performed in the case the fingerprint of the control-compliant appliance 125 is already registered will be described with reference to FIG. 32.

Figure 32:
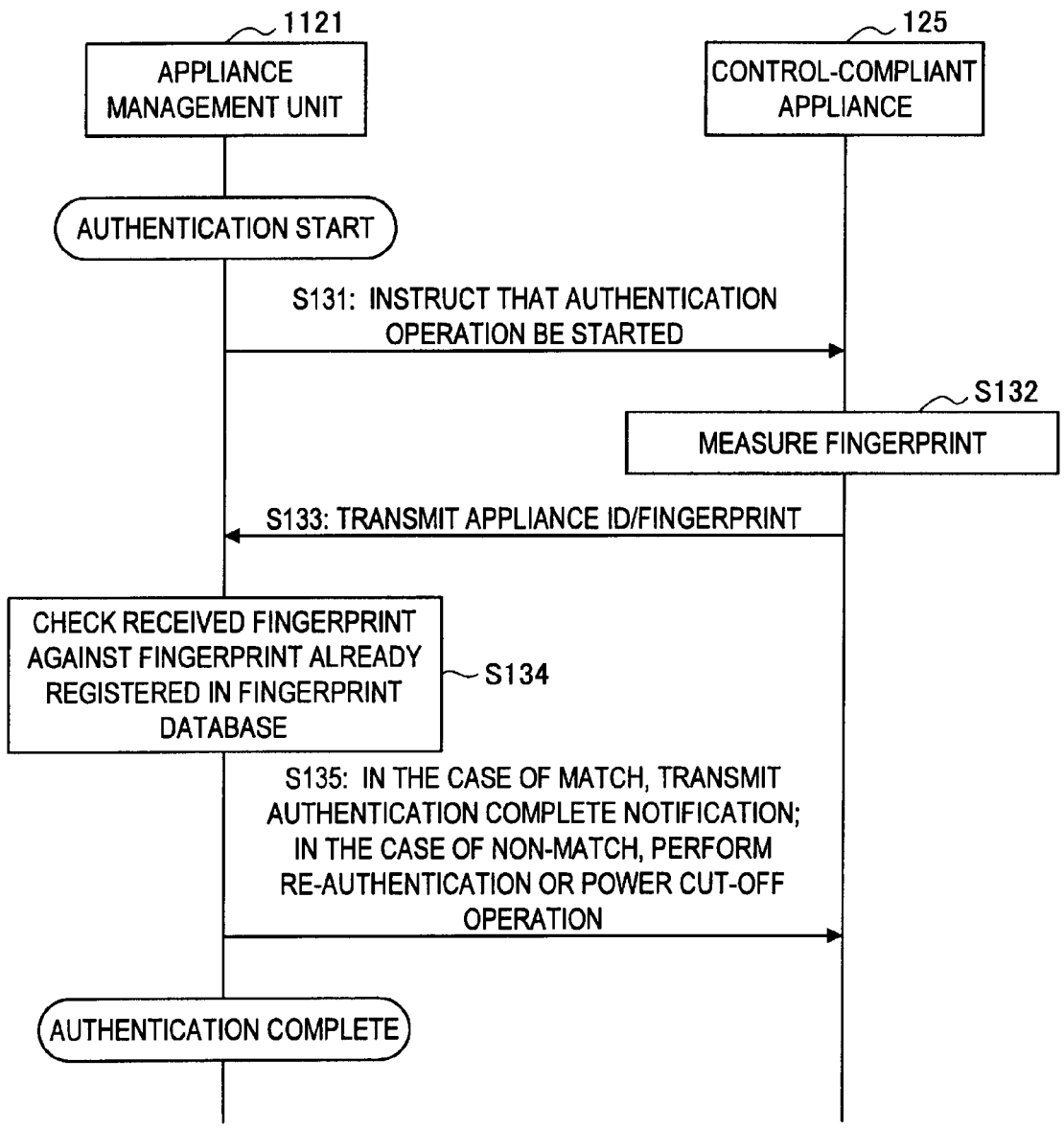
FIG. 32 is an explanatory diagram showing an operation flow relating to registration of the control-compliant appliance.

As shown in FIG. 32, when the operation of authentication is started, the appliance management unit 1121 instructs the control-compliant appliance 125 to start the authentication operation (S131). The control-compliant appliance 125 that received this instruction measures the fingerprint (S132). In the case of the control-compliant appliance 125 illustrated in FIG. 27, the impedance characteristics of a predetermined electrical part are measured by the impedance measuring circuit 1253.

When the fingerprint is measured, the control-compliant appliance 125 transmits the appliance ID of itself and the measured fingerprint to the appliance management unit 1121 (S133). The appliance management unit 1121 that received the appliance ID and the fingerprint checks the received fingerprint against a fingerprint registered in the fingerprint database configured in the storage unit 113 (S134).

In the case the result of the check is match of the received fingerprint and a fingerprint registered in the fingerprint database, the appliance management unit 1121 transmits to the control-compliant appliance 125 a notification to the effect that authentication is complete (authentication complete notification) (S135). On the other hand, in the case the result of the check is non-match of the received fingerprint and a fingerprint registered in the fingerprint database, the appliance management unit 1121 repeats the authentication process of steps S131 to S134 or performs an operation of cutting off power to the control-compliant appliance 125.

In the foregoing, the registration/authentication operation for the control-compliant appliance 125 has been described. As described, since registration/authentication is performed by using the characteristics of the electrical part mounted on the control-compliant appliance 125, unauthorized modification of the control-compliant appliance 125 becomes easy to detect. Also, in the case of the control-compliant appliance 125 illustrated in FIG. 27, since it is possible to use the characteristics of an electrical part as the fingerprint while switching between a plurality of electrical parts, resistance to eavesdropping or falsification of the fingerprint can be increased by switching the electrical part to be the target of measurement at a predetermined timing. Of course, the electrical part to be the target of measurement may be switched at the time point of detection of eavesdropping or falsification of the fingerprint.

5: Authentication/Registration of Appliance 2 (FIGS. 33 to 38)

Next, an authentication process for the control-compliant appliance 125 or the like by the power management apparatus 11 will be described with reference to FIGS. 33 to 38. The authentication process described below is to enable more reliable detection of unauthorized modification of an appliance or the like or connection of an unauthorized appliance or the like. This authentication process is carried out by using mainly the structural elements of the power management apparatus 11 shown in FIG. 26, the structural elements of the control-compliant appliance 125 shown in FIG. 33, and the structural elements of the manufacturer server 36 shown in FIG. 35.

<5-1: Functional Configuration of Control-Compliant Appliance 125 or the Like>

First, a functional configuration of the control-compliant appliance 125 relating to authentication described here will be briefly described with reference to FIG. 33. Only the control-compliant appliance 125 will be illustrated here for the sake of explanation, but by applying the same configuration to the control-compliant outlet 123, the electric vehicle 124, and the outlet expansion apparatus 127, the same authentication process can be realized.

Figure 33:
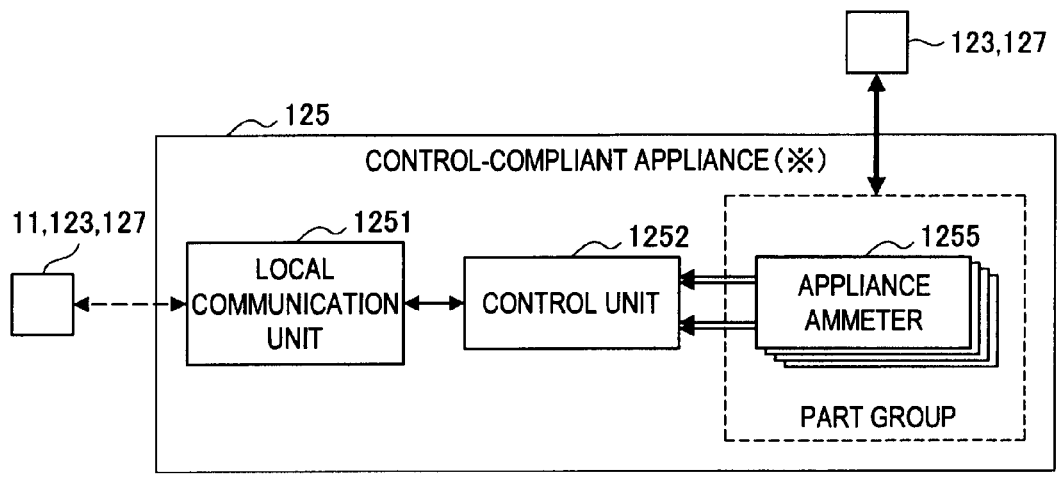

As shown in FIG. 33, the control-compliant appliance 125 includes a local communication unit 1251, a control unit 1252, a part group including a plurality of electrical parts, and an appliance ammeter 1255 installed in each part included in the part group. The local communication unit 1251 is communication means for communicating via a communication network within the local power management system 1. Also, the control unit 1252 is control means for controlling operation of each structural element included in the control-compliant appliance 125. Furthermore, the appliance ammeter 1255 is an ammeter that measures the current flowing through each electrical part.

Based on the control by the control unit 1252, each appliance ammeter 1255 measures the current flowing through each part. Also, the measured values of the current by the appliance ammeters 1255 provided in the part group are input to the control unit 1252. For example, the control unit 1252 makes current flow through a certain part X in a predetermined pattern, and measures the current by the appliance ammeter 1255. Accuracies of electrical parts used by the control-compliant appliance 125 or the like are varied by a few percent for individual pieces. Therefore, if electrical characteristics of the electrical parts can be detected with sufficient accuracy, the part X can be identified from the measured value of the current.

Figure 34:
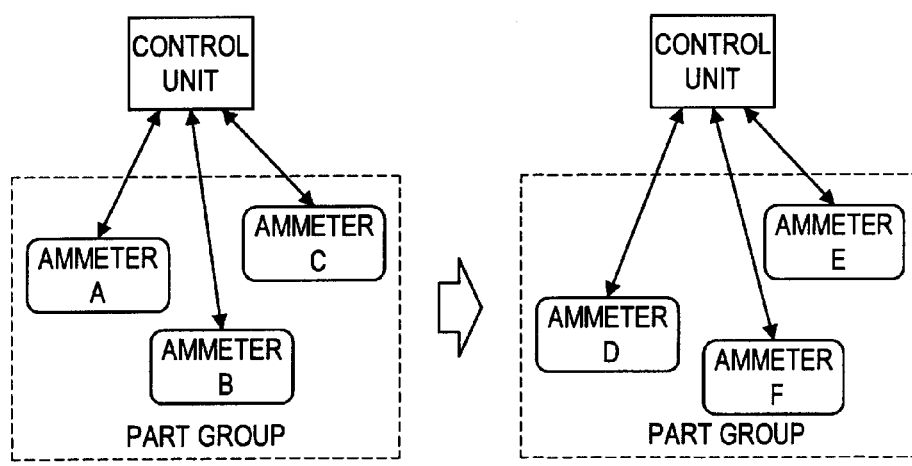
FIG. 34 is an explanatory diagram showing a control operation of a control unit.

Additionally, as shown in FIG. 34, the control unit 1252 can change the combination of the appliance ammeters 1255 used for measurement of current. Thus, it becomes possible to create a fingerprint having three elements: the pattern of passing through a current (hereinafter, current pattern), the combination of electrical parts, and the current characteristics of each electrical part. Furthermore, the current pattern and the combination of electrical parts can be easily changed. Thus, resistance to eavesdropping or falsification of a fingerprint can be increased by frequently changing the fingerprint.

<5-2: Functional Configuration of Manufacturer Server 36>

Next, a functional configuration of the manufacturer server 36 will be described with reference to FIG. 35. In an authentication process described below, an appliance manufacturer (the manufacturer server 36) holding the design of the control-compliant appliance 125 also plays an important role. Accordingly, the functional configuration of the manufacturer server 36 will be described here in detail.

Figure 35:
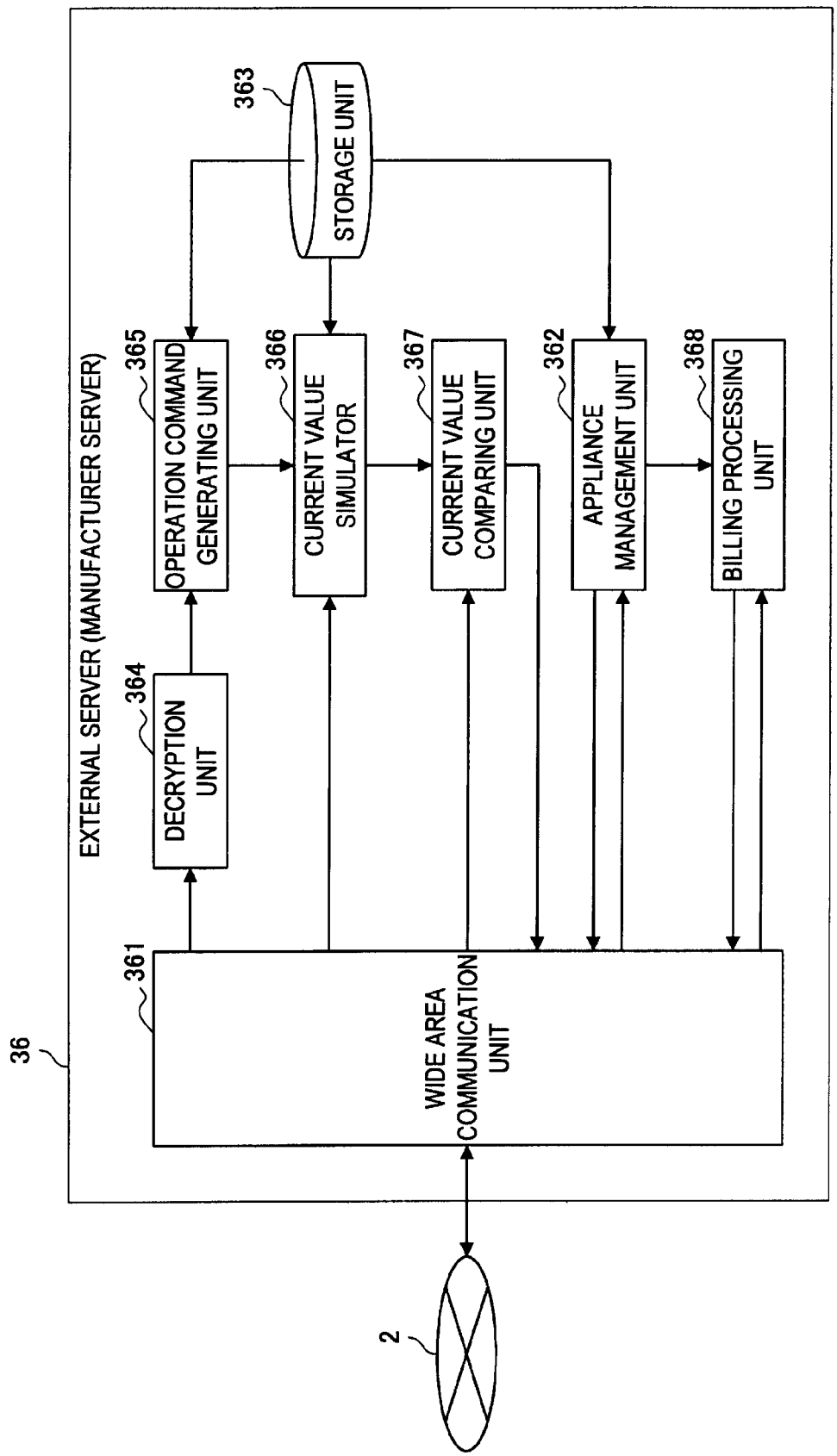
FIG. 35 is an explanatory diagram showing a functional configuration of a manufacturer server.

As shown in FIG. 35, the manufacturer server 36 includes a wide area communication unit 361, an appliance management unit 362, a storage unit 363, a decryption unit 364, an operation command generating unit 365, a current value simulator 366, a current value comparing unit 367, and a billing processing unit 368.

The wide area communication unit 361 is communication means for exchanging information with a system, a server, the power management apparatus 11, and the like, connected to the wide area network 2. The appliance management unit 362 is means for managing information relating to the control-compliant appliance 125 (appliance ID, the design, or the like) manufactured by the manufacturer managing the manufacturer server 36. The storage unit 363 is storage means for holding information relating to the control-compliant appliance 125, a program for generating an operation command for the control-compliant appliance 125, a program defining an operation of a current value simulator described later, key information used at the time of communication, and the like.

The decryption unit 364 is means for decrypting a ciphertext by using the key information. The operation command generating unit 365 is means for generating an operation command for the control-compliant appliance 125 based on information decrypted from the ciphertext by the decryption unit 364. The current value simulator 366 is means for simulating the value of the current that flows when the control-compliant appliance 125 is operated according to a predetermined operation command. The current value comparing unit 367 is means for comparing a current value of the control-compliant appliance 125 acquired via the power management apparatus 11 and the current value simulated by the current value simulator 366. The billing processing unit 368 is means for performing a billing process on a user of the control-compliant appliance 125 as appropriate.

In the foregoing, the functional configuration of the manufacturer server 36 has been briefly described.

<5-3: Operation at the Time of Authentication>

Next, operations of the control-compliant appliance 125, the power management apparatus 11, the manufacturer server 36, and the control-compliant outlet 123 carried out at the time of authentication will be described with reference to FIGS. 36 and 37.

Figure 36:
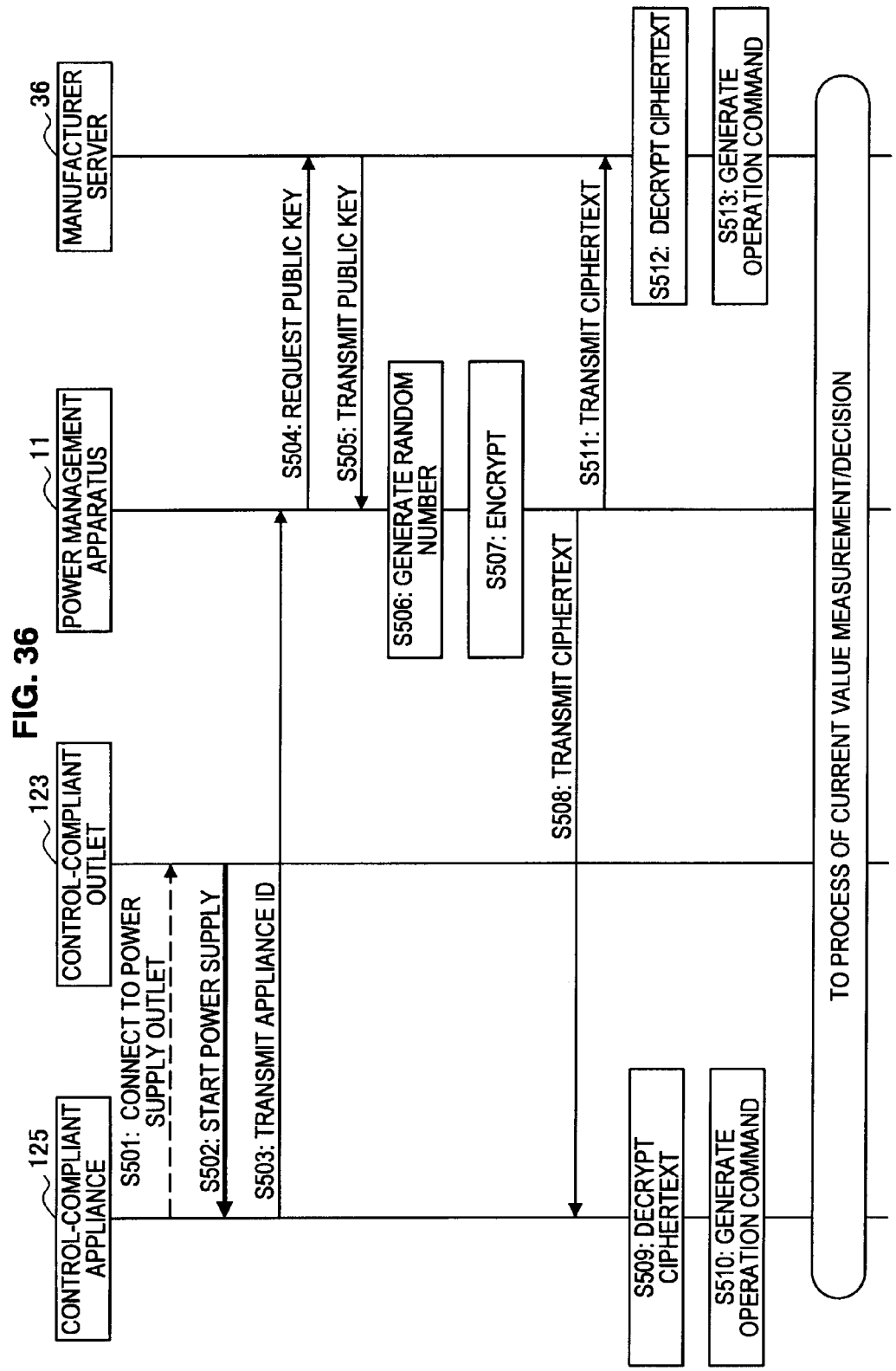
FIG. 36 is an explanatory diagram showing an operation flow relating to authentication of the control-compliant appliance.

As shown in FIG. 36, first, when the control-compliant appliance 125 is connected to the control-compliant outlet 123 (S501), supply of power from the control-compliant outlet 123 to the control-compliant appliance 125 is started (S502). The control-compliant appliance 125 that is supplied with power transmits the appliance ID of itself to the power management apparatus 11 (S503). The power management apparatus 11 that received the appliance ID transmitted from the control-compliant appliance 125 requests the manufacturer server 36 for a public key (S504). The manufacturer server 36 that received this request transmits, by the function of the appliance management unit 362, the public key of itself stored in the storage unit 363 to the power management apparatus 11 (S505).

The power management apparatus 11 that received the public key generates a random number by the function of the information management unit 112 (S506). Then, by the function of the information management unit 112, the power management apparatus 11 encrypts the generated random number and generates a ciphertext (S507). Next, by the function of the local communication unit 111, the power management apparatus 11 transmits the ciphertext to the control-compliant appliance 125 (S508). The control-compliant appliance 125 that received the ciphertext decrypts the ciphertext by using a secret key that was given at the time of manufacture and restores the random number (S509). The control-compliant appliance 125 that restored the random number generates an operation command based on the random number (S510).

Furthermore, the power management apparatus 11 that generated the ciphertext in step S507 transmits the ciphertext to the manufacturer server 36 by using the function of the wide area communication unit 114 (S511). The manufacturer server 36 that received the ciphertext decrypts, by the function of the decryption unit 364, the ciphertext by using a secret key and restores the random number (S512). The manufacturer server 36 that restored the random number generates an operation command based on the restored random number (S513). The manufacturer server 36 and the control-compliant appliance 125 will be in a state of holding the operation command based on the random number at a stage the processes of steps S510 and S513 are completed.

Figure 37:
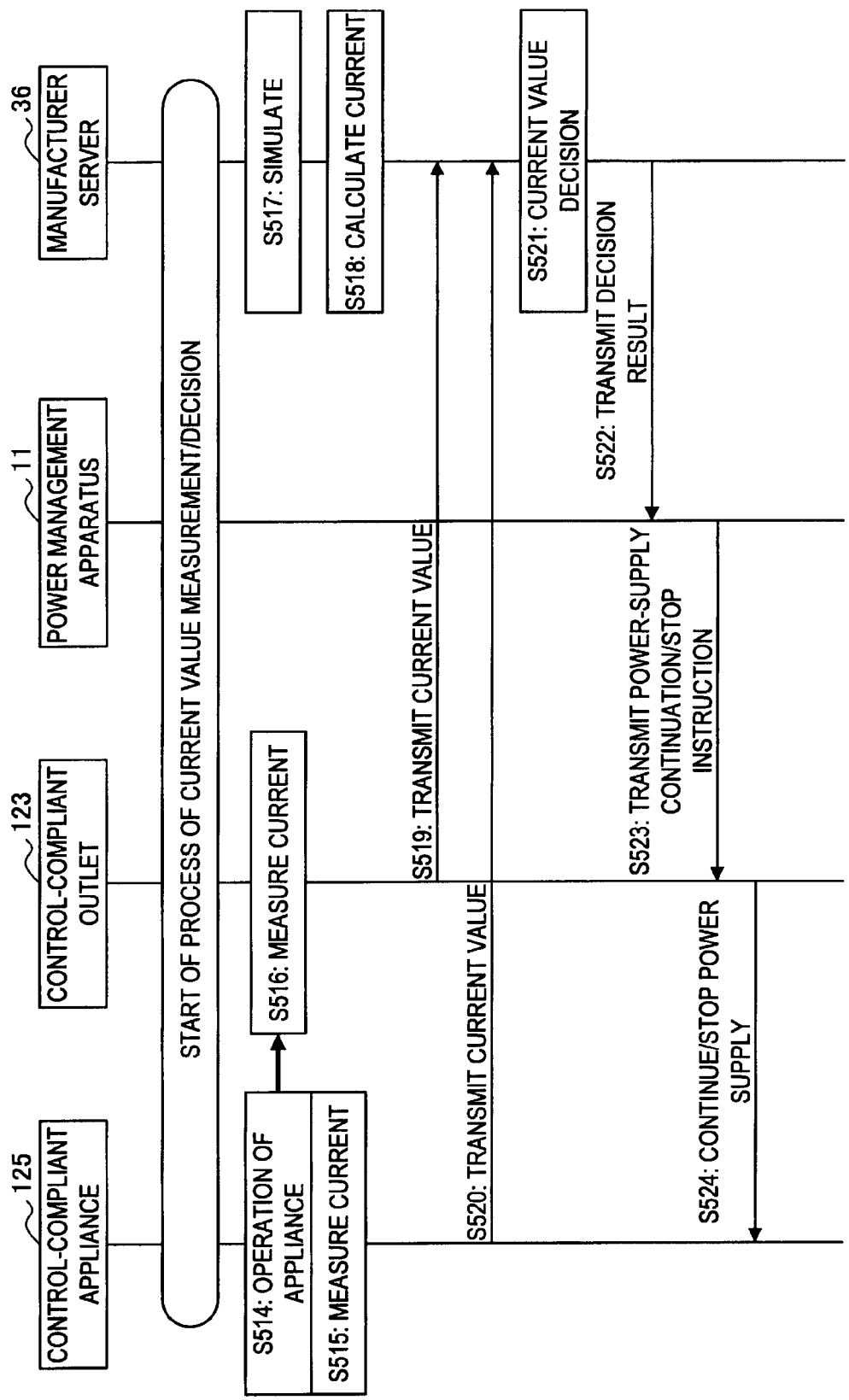
FIG. 37 is an explanatory diagram showing an operation flow relating to authentication of the control-compliant appliance.

When the processes of steps S510 and S513 are complete, the process proceeds to the step of FIG. 37. As shown in FIG. 37, first, the control-compliant appliance 125 operates according to the generated operation command (S514), and measures the current value by the appliance ammeter 1255 (S515). At this point, the control-compliant outlet 123 measures the current supplied at the time of the operation of the control-compliant appliance 125 (S516). Also, by the function of the current value simulator 366, the manufacturer server 36 simulates the operation of the control-compliant appliance 125 based on the generated operation command (S517), and calculates the current value measured at the time of the operation (S518).

The control-compliant outlet 123 transmits the current value measured in step S516 to the manufacturer server 36 (S519). Also, the control-compliant appliance 125 transmits the current value measured in step S515 to the manufacturer server 36 (S520). The manufacturer server 36 that received the current values from the control-compliant appliance 125 and the control-compliant outlet 123 compares the current value calculated in step S518 and the current values measured by the control-compliant appliance 125 and the control-compliant outlet 123 and determines whether they match or not (S521).

The determination result above is transmitted from the manufacturer server 36 to the power management apparatus 11 (S522). The power management apparatus 11 that received the determination result transmits to the control-compliant outlet 123, according to the determination result, an instruction that power supply to the control-compliant appliance 125 be continued or stopped (S523). The control-compliant outlet 123 that received the instruction that power supply be stopped stops power supply to the control-compliant appliance 125 (S524). On the other hand, the control-compliant outlet 123 that received the instruction that power supply be continued continues power supply to the control-compliant appliance 125 (S524).

In the foregoing, the operations of the control-compliant appliance 125, the control-compliant outlet 123, the power management apparatus 11, and the manufacturer server 36 relating to the authentication process have been described.

<5-4: Billing Method>

Here, a billing method for a case an appliance or the like owned by another user is used within the local power management system 1 that one manages will be described with reference to FIG. 38. As has already been briefly described with reference to FIG. 6, even in the case of using one's appliance or the like in the local power management system 1 of another user, the appliance information and the user information are gathered by the system management server 33 and an appropriate billing process is performed by using these pieces of information. Incidentally, the manufacturer server 36 also manages the appliance ID and the like, and thus the function of the system management server 33 may also be assumed by the manufacturer server 36.

Figure 38:
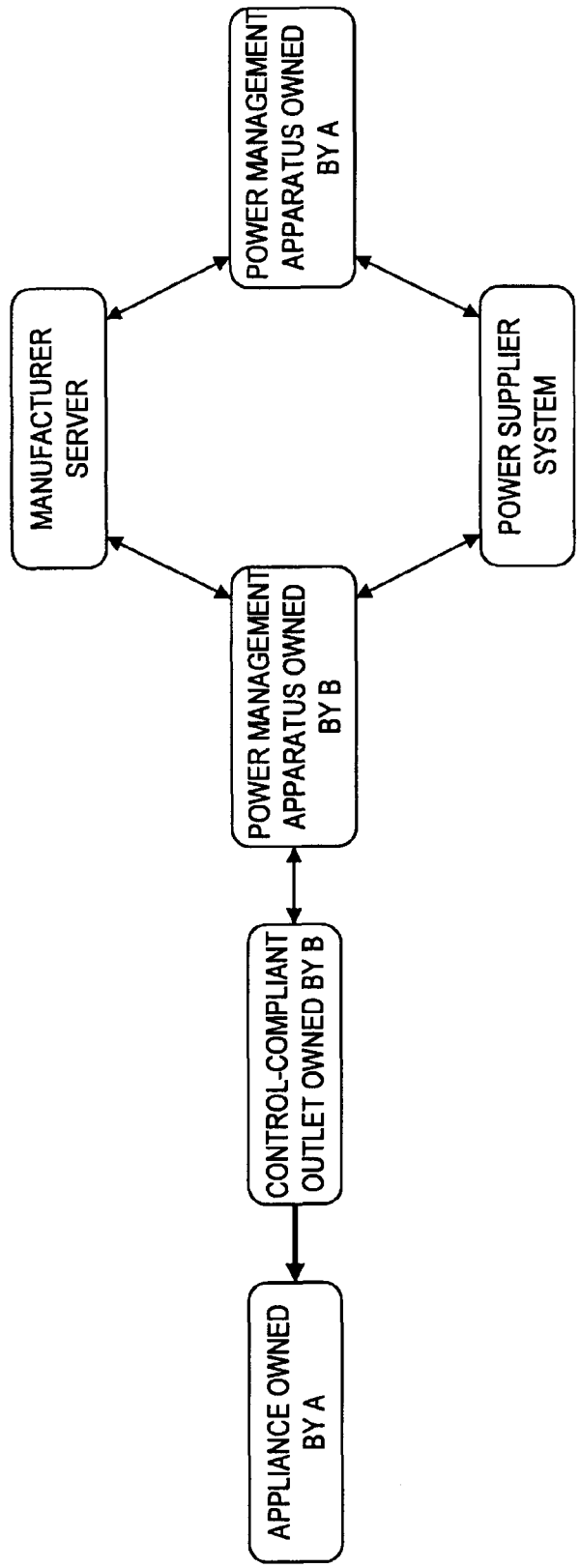
FIG. 38 is an explanatory diagram showing a billing flow based on authentication by the manufacturer server.

For example, as shown in FIG. 38, in the case of using an appliance owned by a user A by connecting the same to the control-compliant outlet 123 owned by a user B, the appliance ID acquired via the control-compliant outlet 123 owned by the user B is transmitted from the power management apparatus 11 to the manufacturer server 36, and the user A to be billed is identified. The identification of the user A by the manufacturer server 36 is performed by the function of the appliance management unit 362. Also, the billing process is performed by the billing processing unit 368. The billing processing unit 368 transmits, together with transmitting billing information to the power management apparatus 11 owned by the user A, the billing information relating to the user A to the power supplier system 5 or the billing server 32. By using such mechanism, the usage fee can be billed to an appropriate subject to be billed.

6: Display Contents/Display Method of Display Unit 116 (FIGS. 39 to 46)

Display contents to be displayed on the display unit 116 and a display method will be described here with reference to FIGS. 39 to 46. As described above, the power management apparatus 11 manages various types of information relating to a system, a server, an appliance, and the like, within and outside the local power management system 1. Accordingly, a display method is desired that enables a user to quickly but surely grasp necessary information when information is displayed on the display unit 116 provided to the power management apparatus 11. Thus, a display method that enables a user to easily grasp the configuration or state of an appliance or the like provided in the local power management system 1, and a display method that enables a user to easily grasp the power consumption will be proposed here.

<6-1: Display of System Configuration or the Like>

First, a display method that enables a user to easily grasp the configuration or state of an appliance or the like provided in the local power management system 1 will be described with reference to FIGS. 39 to 42.

Figure 39:
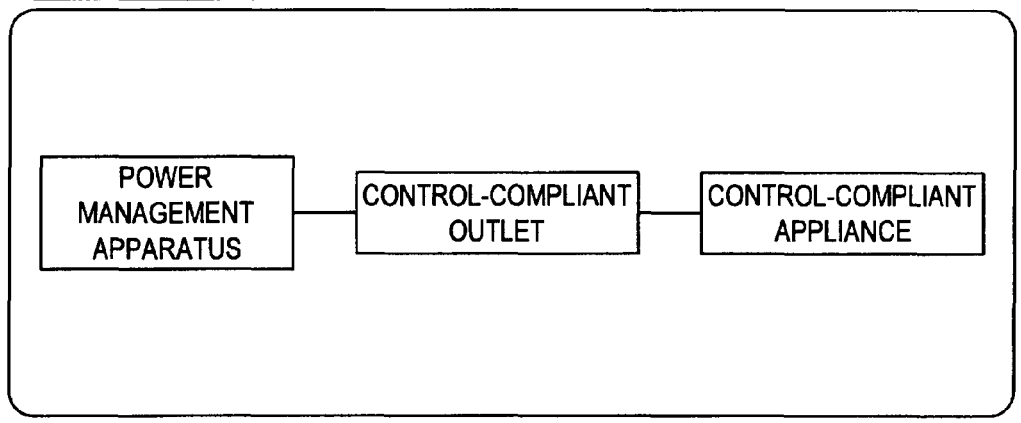
FIG. 39 is an explanatory diagram showing contents to be displayed on a display unit and a display method.
Figure 40:
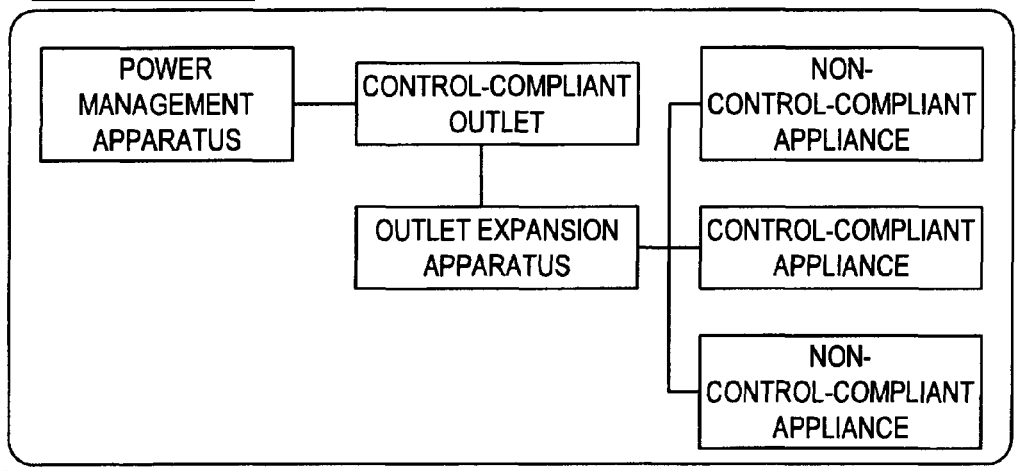
FIG. 40 is an explanatory diagram showing contents to be displayed on the display unit and a display method.

The display configuration of FIG. 39 shows a state where the control-compliant appliance 125 is physically connected to the control-compliant outlet 123 and the control-compliant appliance 125 is already authenticated. Also, the display configuration of FIG. 40 shows a state where the outlet expansion apparatus 127 is physically connected to the control-compliant outlet 123 and the outlet expansion apparatus 127 is already authenticated. Furthermore, in the example of FIG. 40, a state is shown where two non-control-compliant appliances 126 and one control-compliant appliance 125 are connected to the outlet expansion apparatus 127.

The non-control-compliant appliance 126 does not possess an authentication function, but in the case delegate authentication is performed by the outlet expansion apparatus 127, even the non-control-compliant appliance 126 is displayed on the display unit 116, as shown in FIG. 40. Furthermore, the display configuration of FIG. 41 shows a connection configuration of appliances or the like grouped for each room. Furthermore, the display configuration of FIG. 42 displays in such a way that, in addition to the connection configuration of the appliances or the like, the authentication state of each appliance or the like can be grasped, by refining the display style of an object representing each appliance or the like. In the example of FIG. 42, five types of authentication states are shown, i.e. authentication success (authentication OK), waiting for connection of appliance or the like (standby), authentication failure (authentication NG), unknown, and in the process of authenticating.

With the authentication state clearly indicated in this manner, it becomes possible to swiftly detect an unauthorized appliance or the like. Furthermore, since grouping is performed for each installation location, the installation location of an unauthorized appliance or the like can be swiftly recognized, and the unauthorized appliance or the like can be swiftly removed. Furthermore, in the case a certain appliance or the like is in an unusable state, whether the appliance is broken down or whether it is just that authentication is not possible can be easily grasped.

<6-2: Display of Power Consumption or the Like>

Next, the display method of enabling a user to easily grasp the power consumption of an appliance or the like provided within the local power management system 1 will be described with reference to FIGS. 43 to 46. Additionally, a display configuration that displays an authentication state together with the power consumption will also be described.

The display configuration of FIG. 43 shows in a graph the power consumption of each appliance or the like installed in the local power management system 1. In the example of FIG. 43, the appliance ID, the appliance type, and the power consumption are shown for each appliance or the like. Incidentally, regarding the outlet expansion apparatus 127, information relating to the outlet expansion apparatus 127 is shown in a hierarchical manner. The power consumption of all the appliances or the like connected to the outlet expansion apparatus 127 is shown in the higher level hierarchy (main display). Also, information on the power consumption of each appliance or the like connected to the outlet expansion apparatus 127 is shown in the lower level hierarchy (sub display). In this manner, by preventing complication of display by displaying in an hierarchical manner, a user is enabled to easily perceive an appliance or the like whose power consumption is large or whose power consumption is small.

The display configuration of FIG. 44 shows the authentication state in addition to the power consumption. Incidentally, information relating to a non-authenticated appliance or the like may be hidden. The display configuration of FIG. 45 displays a usage location and a billed amount in addition to the power consumption. As has been described with reference to FIG. 6, even in the case of using one's appliance or the like in the local power management system 1 of another user, billing information is transmitted to the power management apparatus 11 of oneself by the function of the system management server 33. Furthermore, by using together the function of the map DB server 37, information on a usage location can be acquired. Accordingly, as in the display configuration illustrated in FIG. 45, the power consumption and the billed amount may be displayed for each usage location. Also, as with the display configuration illustrated in FIG. 46, a graph display enabling one to grasp at a glance the power consumed in one's local power management system 1 and the power consumed in another user's local power management system 1 is also possible.

Figure 47:
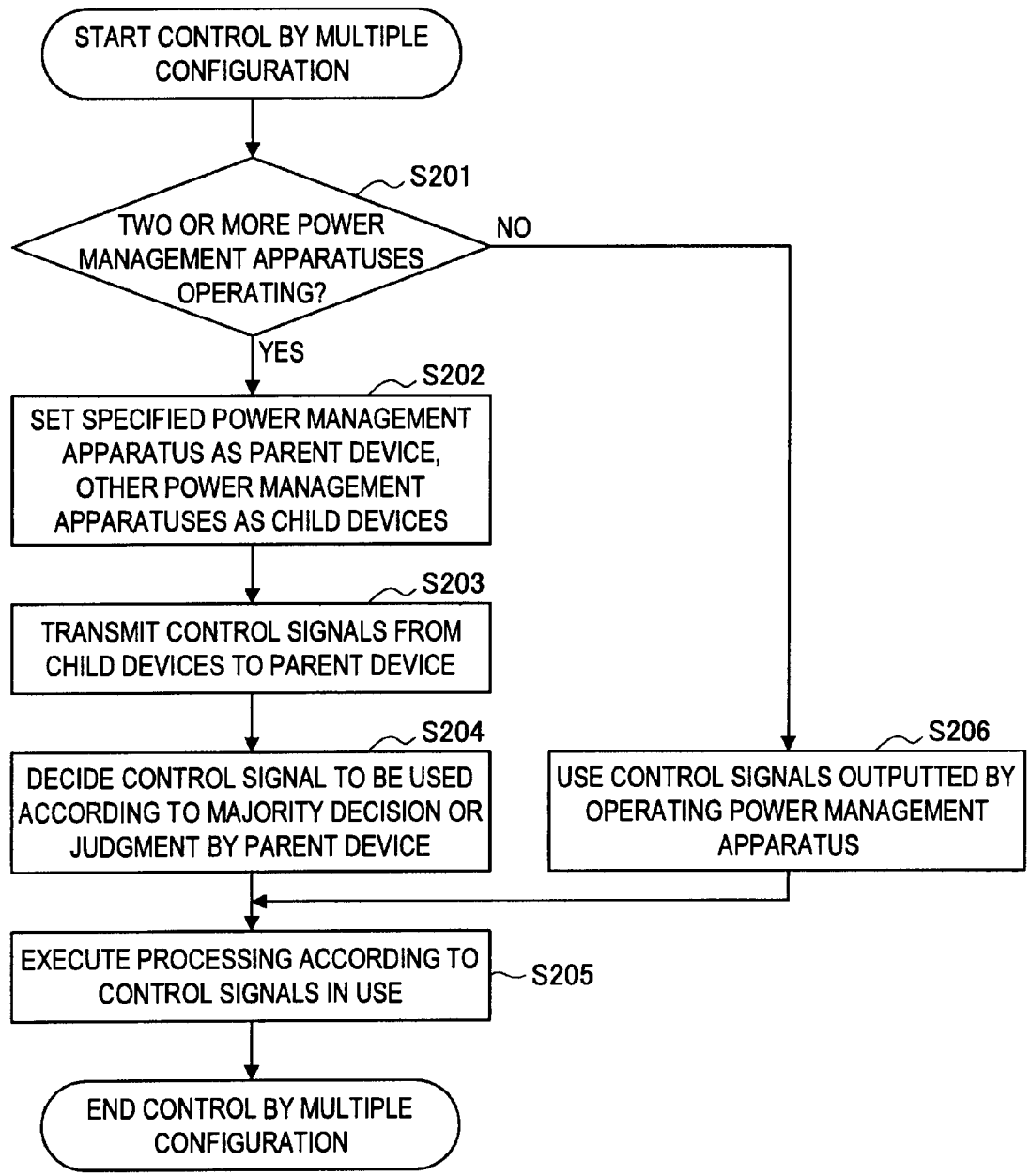
FIG. 47 is an explanatory diagram showing an operation flow of multiple power management apparatuses.
Figure 48:
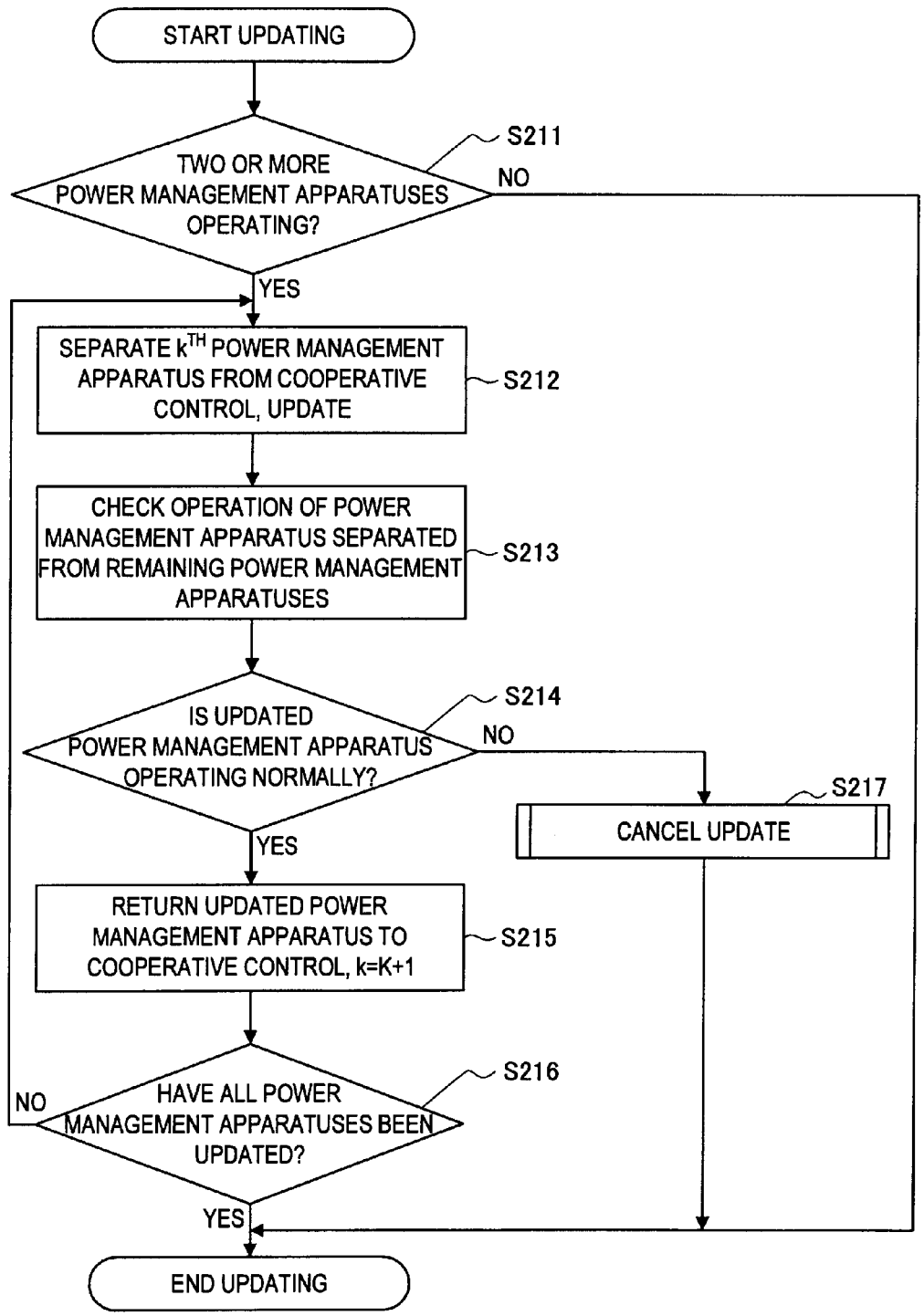
FIG. 48 is an explanatory diagram showing an operation flow of multiple power management apparatuses.

7: Use of Multiple Power Management Apparatuses 11 (FIGS. 47 to 49)

Here, use of multiple power management apparatuses 11 will be described with reference to FIGS. 47 to 49. As described above, a power management apparatus 11 acts as an overall manager over the supplying of power to appliances and the like in the local power management system 1. This means that if the power management apparatus 11 fails or stops due to a software update, it becomes no longer possible to use the appliances and the like in the local power management system 1. In readiness for such situation, it is preferable to use multiple power management apparatuses 11. However, a power management apparatus 11 acts as an overall manager for information relating to power and controls the various appliances and the like in the local power management system 1. This means that certain measures are wanted to cause a plurality of power management apparatuses 11 to safely and efficiently carry out complex management and control. One conceivable measure is the method shown in FIGS. 47 to 49.

<7-1: Control Operation>

First, a method of controlling the appliances and the like using multiple power management apparatuses 11 will be described with reference to FIG. 47. Note that cooperative operation by a plurality of power management apparatuses 11 is realized by the functions of the system management unit 1125 included in the information management unit 112.

As shown in FIG. 47, first, the system management unit 1125 checks whether two or more power management apparatuses 11 are operating (step S201). When doing so, the system management unit 1125 uses the functions of the local communication unit 111 to enquire to the system management units 1125 of other power management apparatuses 11 and check whether such power management apparatuses 11 are operating. When two or more power management apparatuses 11 are operating, the processing of the system management unit 1125 proceeds to step S202. Meanwhile, when no other power management apparatuses 11 are operating, the processing of the system management unit 1125 proceeds to step S206.

When the processing has proceeded to step S202 from step S201, the system management unit 1125 sets a specified power management apparatus 11 as a parent device and sets the remaining power management apparatuses 11 as child devices (step S202). For example, when a priority-based order for setting power management apparatuses as the parent device has been decided in advance, the power management apparatus 11 with the highest priority ranking is set as the parent device. Note that the expressions "parent device" and "child device" used here refer to an attribute of a power management apparatus 11. By setting this attribute, a power management apparatus 11 with a "child device" attribute transmits a control signal to a power management apparatus 11 with a "parent device" attribute when controlling an appliance or the like (step S203).

When control signals have been transmitted from a plurality of child devices to the parent device, the system management unit 1125 of the parent device decides the control signal to be transmitted to an appliance or the like based on a majority decision or a judgment by the parent device (randomly or according to a predetermined condition) (step S204). Once the control signal has been decided, the control unit 115 transmits the control signal decided by the system management unit 1125 to the appliance or the like to cause the appliance or the like to carry out processing according to the control signal (step S205) and ends the series of processes. Meanwhile, when the processing has proceeded to step S206 from step S201, the control unit 115 transmits a self-created control signal to the appliance or the like to cause the appliance or the like to carry out processing according to the control signal (step S206) and ends the series of processes.

In this way, the system management unit 1125 has a function for setting the attribute of each power management apparatus 11 and a function for selecting a control signal. The system management unit 1125 is capable of efficiently controlling appliances and the like using such functions. It is also possible, when one or more power management apparatuses 11 have broken down or have stopped for updating purposes, to have another power management apparatus 11 continue power management and thereby avoid a situation where appliances and the like become unusable.

<7-2: Operation During Updating>

Next, a method of updating the software (or "firmware") that defines the fundamental operation of the power management apparatus 11 will be described with reference to FIGS. 48 and 49. Note that the updating process for the firmware is realized by a function of the system management unit 1125.

Here, it is assumed that N power management apparatuses 11 are operating within the local power management system 1.

As shown in FIG. 48, the system management unit 1125 first checks whether two or more power management apparatuses 11 are operating (step S211). When two or more power management apparatuses 11 are operating, the processing of the system management unit 1125 proceeds to step S212. Meanwhile, when no other power management apparatus 11 is operating, the system management unit 1125 ends the series of processes relating to updating.

When processing has proceeded to step S212, the system management unit 1125 removes the first power management apparatus 11 to be updated from the cooperative operation and carries out updating (step S212). When doing so, the system management unit 1125 of the power management apparatus 11 that has been removed from the cooperative operation acquires the latest firmware from the system management server 33 and updates the old firmware to the latest firmware. When the updating of the firmware has been completed, the remaining power management apparatuses 11 that are operating cooperatively check the operation of the power management apparatus 11 whose updating has been completed (steps S213, S214).

If the power management apparatus 11 is operating normally, the processing proceeds to step S215. Meanwhile, if the updated power management apparatus 11 is not operating normally, the processing proceeds to step S217. When the processing has proceeded to step S215, the system management units 1125 of the plurality of power management apparatuses 11 that include the updated power management apparatus 11 return the updated power management apparatus 11 to the cooperative operation (step S215), and change the power management apparatus 11 to be updated. At this time, it is checked whether the updating has been completed for all N power management apparatuses 11 (step S216), and when the updating of N apparatuses is complete, the updating process ends.

Meanwhile, when the updating has not been completed for all N power management apparatuses 11, the processing returns to step S212 and the updating process is carried out on the next power management apparatus 11 to be updated. In this way, the processing in steps S212 to S215 is repeatedly executed until the updating of all N power management apparatuses 11 has been completed. However, when the processing has proceeded from step S214 to step S217, an updating cancelling process is carried out (step S217), and the series of processes relating to updating is completed.

Here, the updating cancelling process will be described with reference to FIG. 49.

As shown in FIG. 49, when the updating cancelling process is commenced, the system management unit 1125 of the updated power management apparatus 11 returns the firmware of the updated power management apparatus 11 to the state before updating (step S221). After this, the system management units 1125 of the remaining power management apparatuses 11 that are operating cooperatively check whether the power management apparatus 11 that has been returned to the state before updating is operating normally (steps S222, S223).

If the power management apparatus 11 that has been returned to the state before updating is operating normally, the processing proceeds to step S224. Meanwhile, if the power management apparatus 11 that has been returned to the state before updating is not operating normally, the updating cancelling process ends in this state. When the processing has proceeded to step S224, the system management units 1125 of the plurality of power management apparatuses 11 that include the power management apparatus 11 that has been returned to the state before updating return the power management apparatus 11 that has been returned to the state before updating to the cooperative operation (step S224) and the updating cancelling process ends.

In this way, during updating, processes that separate a power management apparatus 11 to be updated from cooperative operation and return the power management apparatus 11 to cooperative operation when normal operation has been confirmed after updating are carried out. If the updating has failed, a process is also carried out that checks for normal operation after the power management apparatus has been returned to the state before updating and then returns the power management apparatus 11 to cooperative control if normal operation has been confirmed. By using this configuration, the updating can be carried out without affecting the power management apparatuses 11 that are operating cooperatively and ensures safe operation of the power management apparatuses 11.

8: Example Hardware Configuration of Power Management Apparatus 11 (FIG. 50)

The function of each structural element of the power management apparatus 11 described above can be realized by using, for example, the hardware configuration of an information processing apparatus illustrated in FIG. 50. That is, the function of each structural element can be realized by controlling the hardware shown in FIG. 50 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 50, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

9: Summary

Lastly, technical contents according to an embodiment of the present invention will be summarized.

The outlet expansion apparatus according to the embodiment described above can be expressed as follows. The outlet expansion apparatus includes a first connection outlet, a second connection outlet, and a delegate authentication unit. The first connection outlet is for being connected with an electronic appliance. The second connection outlet is for connecting to a power supply outlet that is to be a supply source of power. Furthermore, the delegate authentication unit is for carrying out, in a case the electronic appliance not having a function of carrying out authentication with a power management apparatus managing an amount of power to be supplied to the electronic appliance is connected to the first connection outlet and the power supply outlet is connected to the second connection outlet, authentication to be carried out on the power management apparatus by the electronic appliance connected to the first connection outlet on behalf of the electronic appliance.

As described, if an electronic appliance connected to the first connection outlet is not compliant with authentication by the power management apparatus, the outlet expansion apparatus carries out authentication on behalf of such electronic appliance. As a result, even if, in the smart grid initiative, supply of power to an electronic appliance not compliant with authentication by the power management apparatus is restricted, using the outlet expansion apparatus mentioned above will enable to use such electronic appliance with no restriction. As a result, a user does not have to replace existing electronic appliances, and can cut unnecessary spending. Also, since the existing electronic appliances do not have to be discarded, environmental degradation that will be caused by discarding the existing electronic appliances, which will be a matter of concern if the smart grid initiative is realized, can be avoided.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-013586 filed in the Japan Patent Office on Jan. 25, 2010, the entire content of which is hereby incorporated by reference.

What is claimed is:

1. An outlet expansion apparatus comprising:
a first connection outlet to for connecting an electronic appliance;
a second connection outlet for connecting power supply outlet a supply source of power; and
a delegate authentication unit operable to perform authentication of the electronic appliance with a power management apparatus on behalf of the electronic appliance, wherein the power management apparatus manages an amount of power to be supplied to the electronic appliance connected to the first connection outlet and the power supply outlet connected to the second connection outlet, and wherein the authentication delegation unit receives an instruction from the power management apparatus to set a maximum current according to an operation mode of electronic appliance;
wherein, when there are a plurality of the first connection outlets, the delegate authentication unit carries out authentication with the power management apparatus, on behalf of the electronic appliance connected to each of the first connection outlets; and
wherein the delegate authentication unit comprises a power receiving unit receiving power for authentication supplied from the power supply outlet based on control by the power management apparatus, and an authentication processing unit that carries out an authentication process on the power management apparatus by using the power received by the power receiving unit.

2. The outlet expansion apparatus according to claim 1, wherein the authentication processing unit comprises a random number receiving unit for receiving a random number from the power management apparatus, a consumption pattern calculating unit for calculating a time-series pattern of power consumption based on the received random number, and a power consumption unit that consumes the power received by the power receiving unit in such a way that the time-series pattern of power consumption calculated by the consumption pattern calculating unit is observed by the power management apparatus.

3. The outlet expansion apparatus according to claim 2, wherein, in case the electronic appliance connected to the first connection outlet is capable of carrying out authentication on the power management apparatus, the delegate authentication unit does not carry out, authentication on the power management apparatus on behalf of the electronic appliance.

4. The outlet expansion apparatus according to claim 3, further comprising: a power-supply control unit operable to supply power via the second connection outlet to the electronic appliance via the first connection outlet when the authentication of the power management apparatus is completed by the delegate authentication unit or the electronic appliance connected to the first connection outlet.

5. A delegate authentication method performed by an outlet expansion apparatus comprising a first connection outlet for connecting an electronic appliance and a second connection outlet for connecting power supply outlet to a supply source of power, comprising:
performing authentication of the electronic appliance with a power management apparatus on behalf of the electronic appliance wherein the power management apparatus manages an amount of power to be supplied to the electronic appliance connected to the first connection outlet and the power supply outlet connected to the second connection outlet, and wherein the delegate authentication unit receiving an instruction from the power management apparatus to set a maximum current according to an operation mode of the electronic appliance;
wherein, when there are a plurality of the first connection outlets, the delegate authentication unit carries out authentication with the power management apparatus, on behalf of the electronic appliance connected to each of the first connection outlets; and
wherein the delegate authentication unit comprises a power receiving unit receiving power for authentication supplied from the power supply outlet based on control by the power management apparatus, and an authentication processing unit that carries out an authentication process on the power management apparatus by using the power received by the power receiving unit.

6. The outlet expansion apparatus according to claim 1, wherein the outlet expansion apparatus receives another instruction from power management apparatus to supply power to the electronic appliance after setting the maximum current.

7. The outlet expansion apparatus according to claim 1, wherein the power management apparatus requests a user to input information indicating whether or not the electronic appliance is being used.

8. The outlet expansion apparatus according to claim 7, wherein the input information comprises appliance information and the operation mode of the electronic appliance.

9. The delegate authentication method according to claim 5, wherein the outlet expansion apparatus receives another instruction from power management apparatus to supply power to the electronic appliance after setting the maximum current.

10. The delegate authentication method according to claim 5, wherein the power management apparatus requests a user to input information indicating whether or not the electronic appliance is being used.

11. The outlet expansion apparatus according to claim 10, wherein the input information comprises appliance information and the operation mode of the electronic appliance.

12. A method of managing power supplied to an electronic appliance, the method comprising:
in a power management apparatus communicatively coupled to an outlet expansion apparatus:
receiving a notification from an outlet expansion apparatus when the electronic appliance is connected to the outlet expansion apparatus;
receiving appliance information and information indicating an operation mode of the electronic appliance; and
instructing the outlet expansion apparatus to set a maximum current according to the operation mode of the electronic appliance;
wherein, when there are a plurality of the first connection outlets, a delegate authentication unit carries out authentication with the power management apparatus, on behalf of the electronic appliance connected to each of the first connection outlets; and
wherein the delegate authentication unit comprises a power receiving unit receiving power for authentication supplied from the power supply outlet based on control by the power management apparatus, and an authentication processing unit that carries out an authentication process on the power management apparatus by using the power received by the power receiving unit.

13. The power management apparatus according to claim 12, wherein the power management apparatus requests a user to input information indicating whether or not the electronic appliance is being used.

14. The power management apparatus according to claim 12, further comprising sending another instruction to the outlet expansion apparatus to supply power to the electronic appliance after setting the maximum current.

* * * * *